United States Patent
Yi et al.

(10) Patent No.: US 12,309,098 B2
(45) Date of Patent: May 20, 2025

(54) FEEDBACK FOR WIRELESS COMMUNICATIONS

(71) Applicant: Comcast Cable Communications, LLC, Philadelphia, PA (US)

(72) Inventors: Yunjung Yi, Vienna, VA (US); Esmael Dinan, McLean, VA (US); Hyukjin Chae, Reston, VA (US); Ali Cirik, Herndon, VA (US); Hua Zhou, Herndon, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 403 days.

(21) Appl. No.: 17/061,929

(22) Filed: Oct. 2, 2020

(65) Prior Publication Data

US 2021/0105126 A1   Apr. 8, 2021

Related U.S. Application Data

(60) Provisional application No. 62/909,662, filed on Oct. 2, 2019.

(51) Int. Cl.
| | |
|---|---|
| *H04L 5/00* | (2006.01) |
| *H04L 1/18* | (2023.01) |
| *H04L 1/1812* | (2023.01) |
| *H04L 1/1829* | (2023.01) |
| *H04W 72/04* | (2023.01) |
| *H04W 72/12* | (2023.01) |
| *H04W 72/21* | (2023.01) |

(Continued)

(52) U.S. Cl.
CPC .......... *H04L 5/0055* (2013.01); *H04L 1/1812* (2013.01); *H04L 1/1854* (2013.01); *H04W 72/21* (2023.01); *H04W 72/569* (2023.01); *H04W 76/27* (2018.02)

(58) Field of Classification Search
None
See application file for complete search history.

(56) References Cited

U.S. PATENT DOCUMENTS

| | | | |
|---|---|---|---|
| 2020/0267597 A1 | 8/2020 | Huang et al. | |
| 2020/0404684 A1* | 12/2020 | Lee | ........................ H04L 5/0053 |
| 2021/0022184 A1* | 1/2021 | Hosseini | ............... H04W 72/30 |

(Continued)

FOREIGN PATENT DOCUMENTS

| | | |
|---|---|---|
| WO | 2017171528 A1 | 10/2017 |
| WO | 2021006672 A1 | 1/2021 |

(Continued)

OTHER PUBLICATIONS

Jan. 13, 2022—European Office Action—EP 20199792.1.

(Continued)

*Primary Examiner* — Steve R Young
(74) *Attorney, Agent, or Firm* — Banner & Witcoff, Ltd.

(57) ABSTRACT

Wireless devices may communicate with each other, for example, via sidelink communication. A wireless device may receive downlink messages from a base station, and the wireless device may receive sidelink messages from another wireless device. Acknowledgment messages to the base station may be prioritized, based on an indication of a priority, such that a sidelink message may be prioritized over acknowledgment feedback for a downlink message.

20 Claims, 35 Drawing Sheets

(51) Int. Cl.
*H04W 72/566* (2023.01)
*H04W 76/27* (2018.01)

(56) References Cited

U.S. PATENT DOCUMENTS

| | | | | |
|---|---|---|---|---|
| 2022/0141846 A1* | 5/2022 | Lee | ................... | H04W 72/1263 370/329 |
| 2022/0225341 A1* | 7/2022 | Li | ...................... | H04W 72/569 |
| 2022/0295504 A1* | 9/2022 | Lee | ..................... | H04L 1/1887 |

FOREIGN PATENT DOCUMENTS

| | | |
|---|---|---|
| WO | 2021007852 A1 | 1/2021 |
| WO | 2021021892 A1 | 2/2021 |

OTHER PUBLICATIONS

3GPP TS 38.213 V15.5.0 (Mar. 2019), Technical Specification, 3rd Generation Partnership Project; Technical Specification Group Radio Access Network; NR; Physical layer procedures for control (Release 15).
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15).
R1-1905388 3GPP TSG RAN WG1 Meeting #96bis, Xi'an, China, Apr. 8-12, 2019, Source: Sequans Communications, Title: On HARQ procedure for NR sidelink.
R1-1907135 3GPP TSG-RAN WG1 Meeting #97, Reno, USA, May 13-17, 2019, Source: Ericsson, Title: Uu-based sidelink resource allocation.
R1-1907655 3GPP TSG-RAN WG1 Meeting #97, Reno, USA, May 13-17, 2019, Source: Ericsson, Title: Feature lead summary on Resource allocation for NR sidelink Mode 1.
R1-1907854 3GPP TSG-RAN WG1 Meeting #97, Reno, USA, May 13-17, 2019, Source: Ericsson, Title: Feature lead summary #3 on Resource allocation for NR sidelink Mode 1.
R1-1907905 3GPP TSG-RAN WG1 Meeting #97, Reno, USA, May 13-17, 2019, Source: RAN1, Title: Reply LS to RAN2 on mode-1 retransmission indication.
R1-1908149 3GPP TSG RAN WG1 Meeting #98, Prague, Czech Republic, Aug. 26-30, 2019, Source: vivo, Title: Discussion on mode 1 resource allocation mechanism.
R1-1908219 3GPP TSG RAN WG1 Meeting #98, Prague, Czech Republic, Aug. 26-30, 2019, Source: Fujitsu, Title: Discussion on mode 1 resource allocation for NR V2X.
R1-1908362 3GPP TSG RAN WG1 Meeting #98, Prague, Czech Republic, Aug. 26-30, 2019, Source: OPPO, Title: Mode 1 resource allocation for NR SL.
R1-1908397 3GPP TSG RAN WG1 Meeting #98, Prague, Czech Republic, Aug. 26-30, 2019, Source: MediaTek Inc., Title: Discussion on Mode-1 resource allocation for NR SL.
R1-1908476 3GPP TSG RAN WG1 Meeting #98, Prague, Czech Republic, Aug. 26-30, 2019, Source: Samsung, Title: On Resource Allocation for NR V2X Mode 1.
R1-1908634 3GPP TSG RAN WG1 Meeting #98, Prague, Czech Republic, Aug. 26-30, 2019, Source: Intel Corporation, Title: NR V2X Sidelink Communication Under gNB Control.
R1-1908851 3GPP TSG RAN WG1 Meeting #98, Prague, Czech Republic, Aug. 26-30, 2019, Source: NEC, Title: Mode 1 resource allocation mechanism for NR sidelink.
R1-1908912 3GPP TSG RAN WG1 Meeting #98, Prague, Czech Republic, Aug. 26-30, 2019, Source: Ericsson, Title: Uu-based sidelink resource allocation.
R1-1908948 3GPP TSG RAN WG1 Meeting #98, Prague, Czech Republic, Aug. 26-30, 2019, Source: Spreadtrum Communications, Title: Consideration on NR sidelink mode 1 resource allocation.
R1-1909186 3GPP TSG RAN WG1 Meeting #98, Prague, Czech Republic, Aug. 26-30, 2019, Source: NTT Docomo, Inc., Title: NR Sidelink Resource Allocation Mechanism Mode 1.
R1-1909487 3GPP TSG RAN WG1 Meeting #98, Prague, Czech Republic, Aug. 26-30, 2019, Source: Ericsson, Title: Feature lead summary#1 on Resource allocation for NR sidelink Mode 1.
R1-1909797 3GPP TSG RAN WG1 Meeting #98, Prague, Czech Republic, Aug. 26-30, 2019, Source: Ericsson, Title: Feature lead summary#2 on Resource allocation for NR sidelink Mode 1.
R1-1909839 3GPP TSG RAN WG1 Meeting #98, Prague, Czech Republic, Aug. 26-30, 2019, Source: Samsung, Title: Feature lead summary#3 for agenda item 7.2.4.1 Physical layer structure for sidelink.
R2-1908716 3GPP TSG RAN WG2 Meeting #107, Prague, Czech Republic, Aug. 26-30, 2019, Source: OPPO, Title: Left issues on HARQ for NR-V2X.
R2-1908718 3GPP TSG RAN WG2 Meeting #107, Prague, Czech Republic, Aug. 26-30, 2019, Source: OPPO, Title: Left issues on UL/SL prioritization for NR-V2X.
R2-1908747 3GPP TSG RAN WG2 Meeting #107, Prague, Czech Republic, Aug. 26-30, 2019, Source: CATT, Title: Prioritization between UL and SL for NR V2X.
R2-1908750 3GPP TSG RAN WG2 Meeting #107, Prague, Czech Republic, Aug. 26-30, 2019, Source: CATT, Title: HARQ Feedback Configuration for Groupcast.
R2-1908817 3GPP TSG RAN WG2 Meeting #107, Prague, Czech Republic, Aug. 26-30, 2019, Source: Samsung, Title: BWP Aspects of SL and Uu Prioritisation.
R2-1909070 3GPP TSG RAN WG2 Meeting #107, Prague, Czech Republic, Aug. 26-30, 2019, Source: ZTE, Title: Discussion on HARQ feedback enable and disable.
R2-1909280 3GPP TSG RAN WG2 Meeting #107, Prague, Czech Republic, Aug. 26-30, 2019, Source: Nokia, Nokia Shanghai Bell, Title: SL/UL prioritization for NR V2X.
R2-1911068 3GPP TSG RAN WG2 Meeting #107, Prague, Czech Republic, Aug. 26-30, 2019, Source: Huawei, HiSilicon, Title: HARQ related identifier assignment for Option2 groupcast mechanism.
R2-1911071 3GPP TSG RAN WG2 Meeting #107, Prague, Czech Republic, Aug. 26-30, 2019, Source: Huawei, HiSilicon, Title: Discussion on HARQ feedback enable and disable.
R2-1911125 3GPP TSG RAN WG2 Meeting #107, Prague, Czech Republic, Aug. 26-30, 2019, Source: MediaTek Inc., Title: On SL HARQ.
R2-1911437 3GPP TSG RAN WG2 Meeting #107, Prague, Czech Republic, Aug. 26-30, 2019, Source: LG Electronics Inc., Title: Discussion on HARQ enable and disable in NR SL.
Vivo: "Discussion on mode 1 resource allocation mechanism", 3GPP TSG RAN WG1 #98, Prague, CZ; Aug. 17, 2019.
Ericsson: "Coexistence Between Sidelink and Uplink Transmission", 3GPP TSG-RAN WG2 #97, Athens, Greece; Feb. 12, 2017.
Feb. 26, 2021—European Search Report—EP 20199792.1.

* cited by examiner

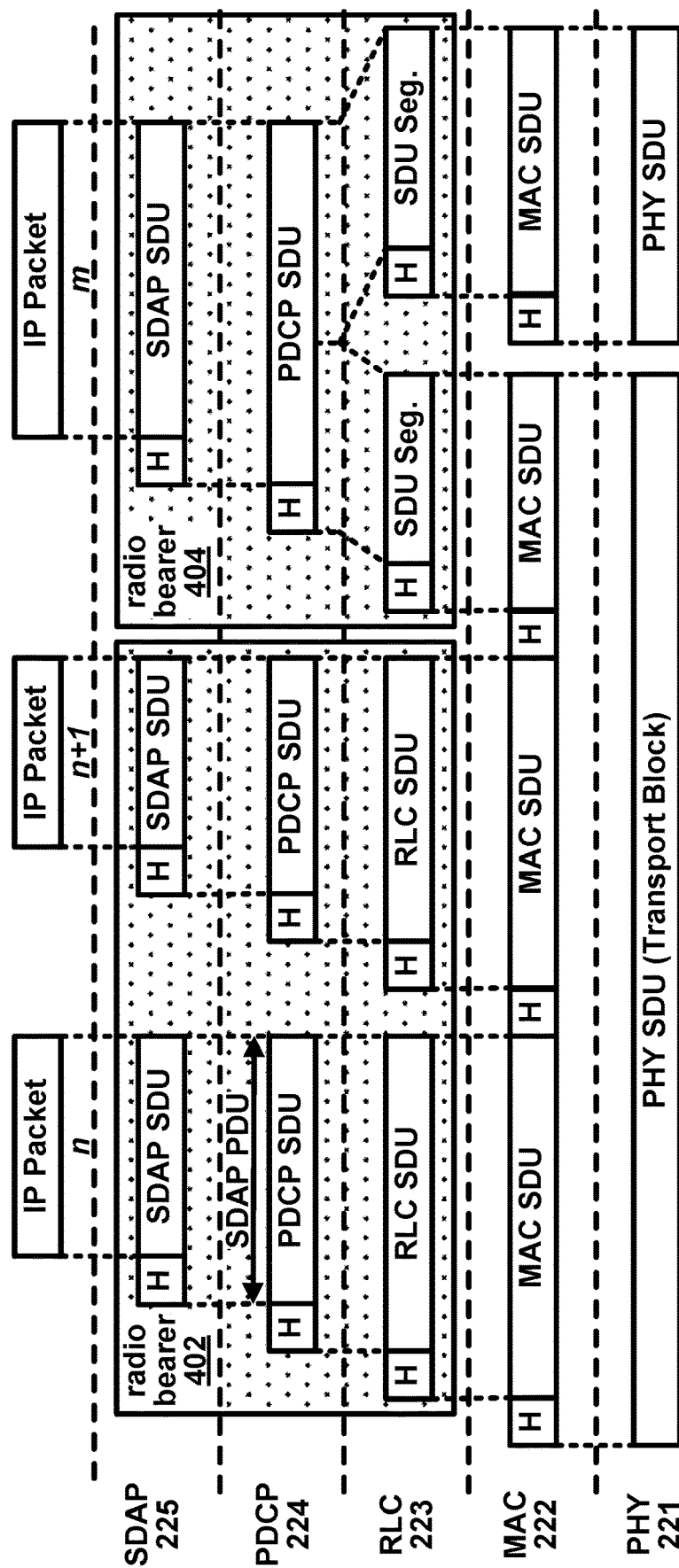
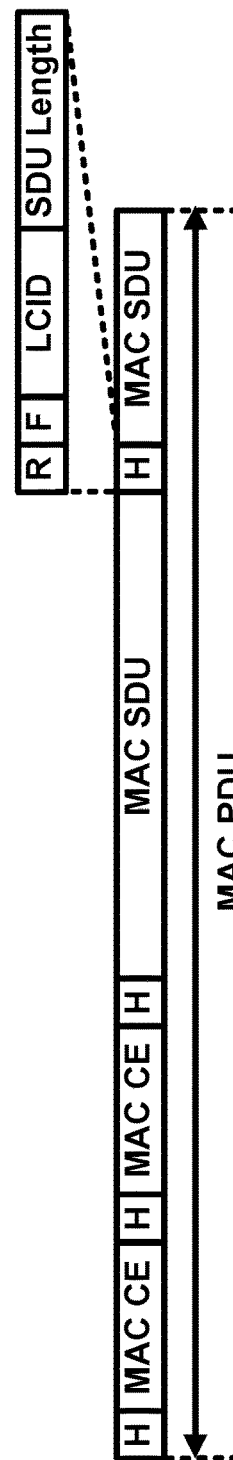
FIG. 4A
FIG. 4B

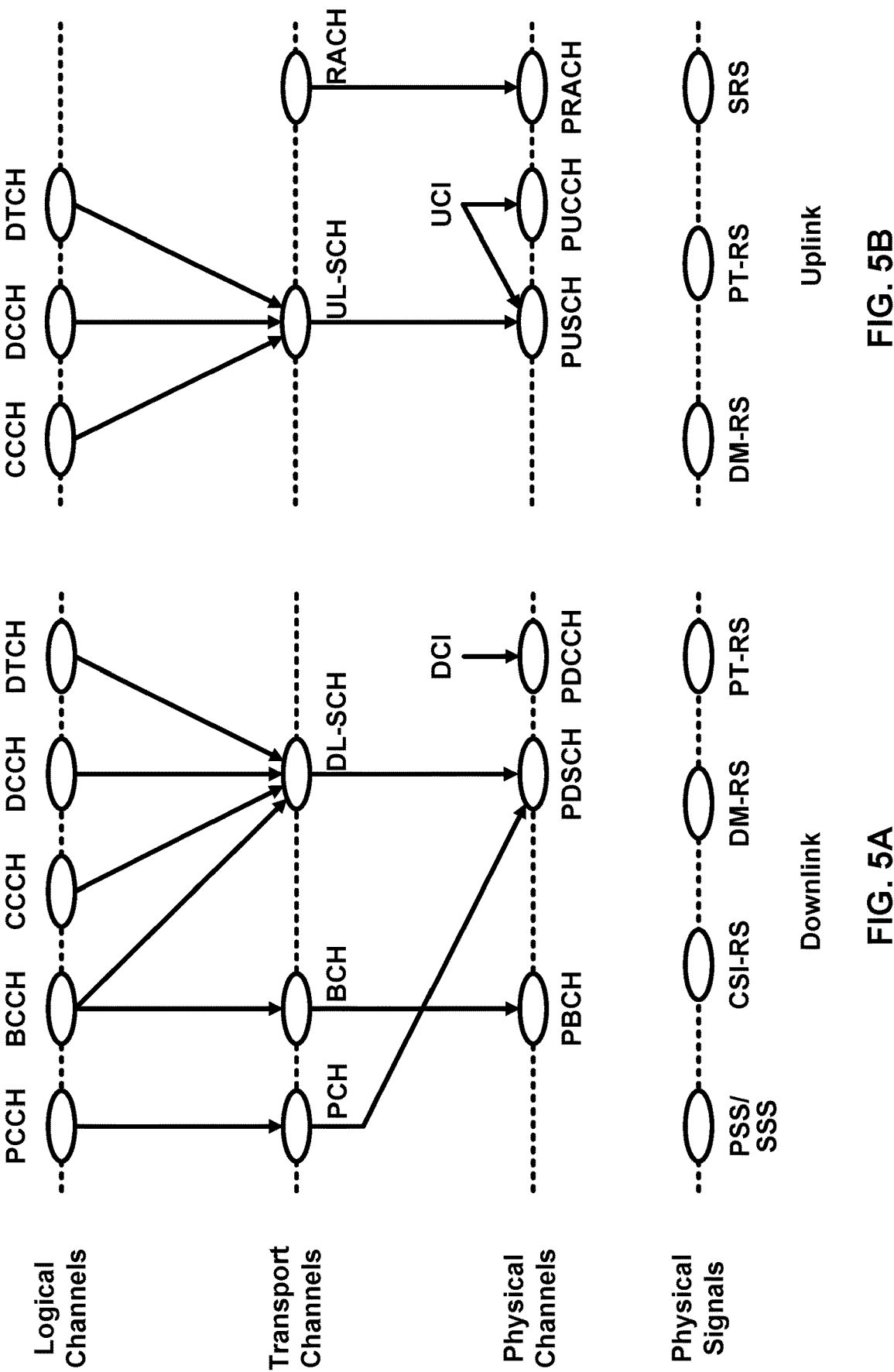

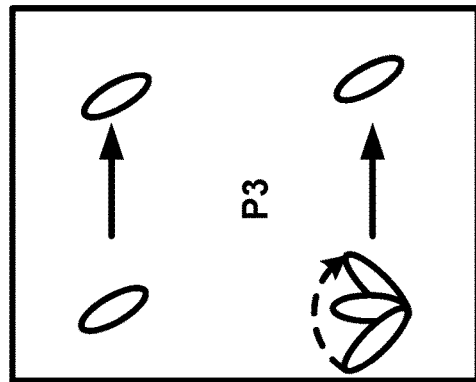
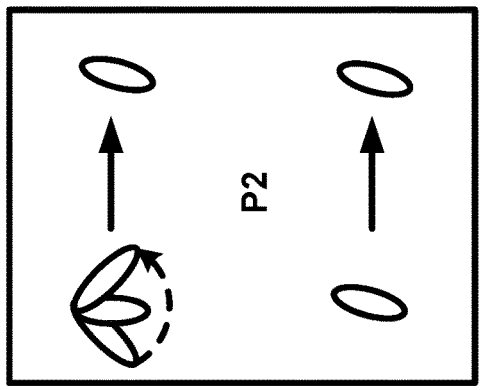
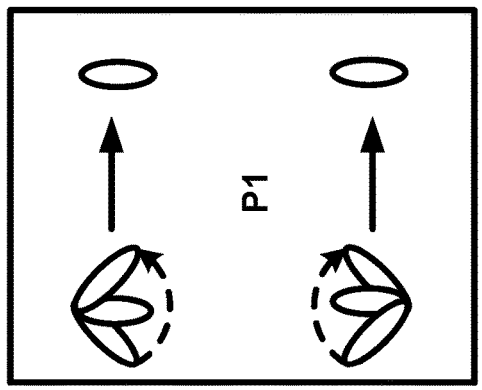
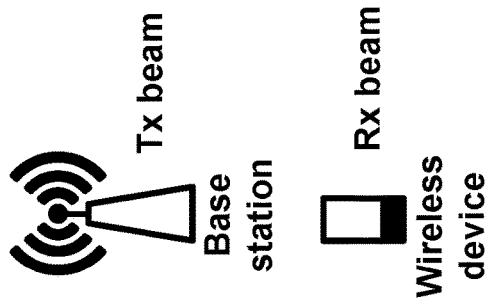
FIG. 12A
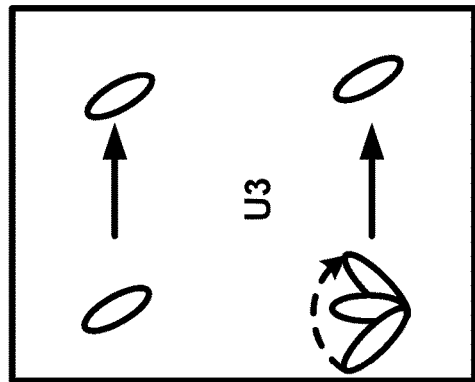
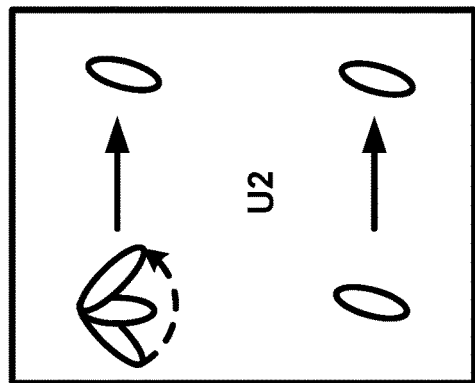
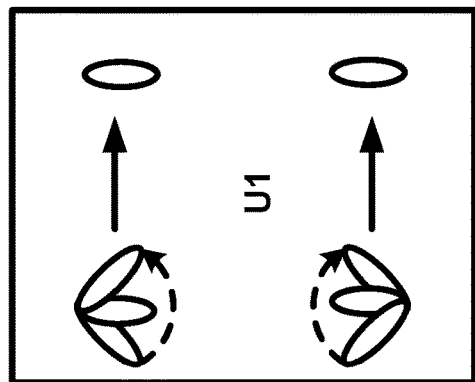
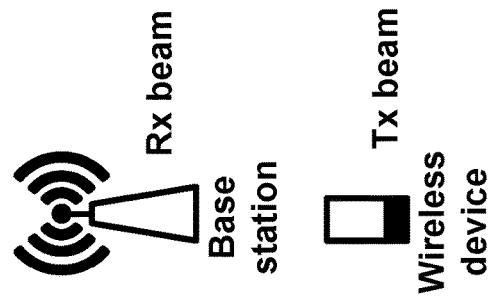
FIG. 12B

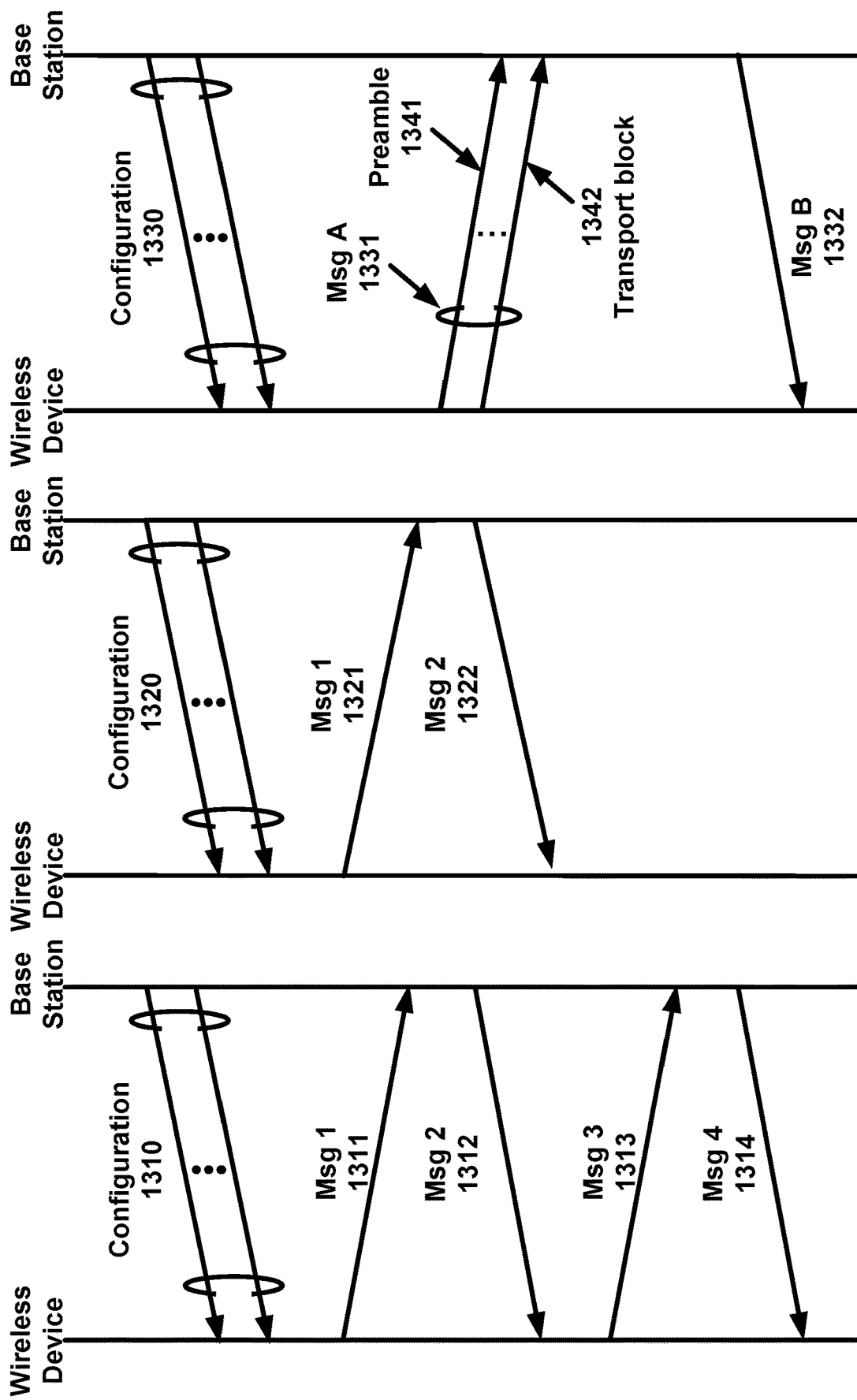

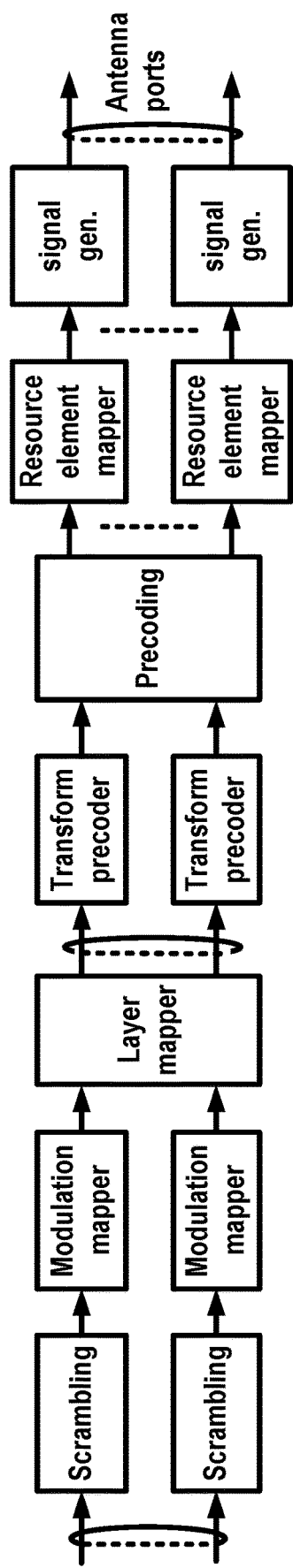
FIG. 16A
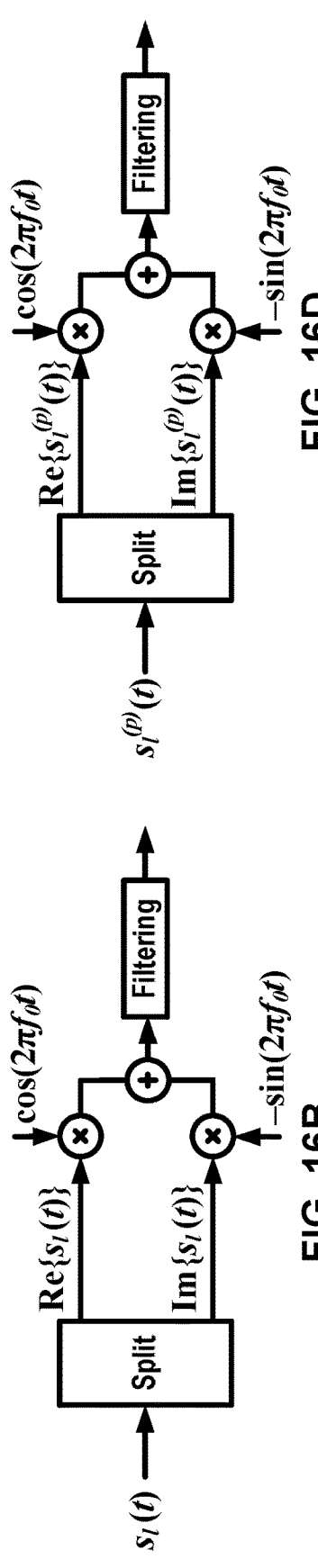
FIG. 16B
FIG. 16D
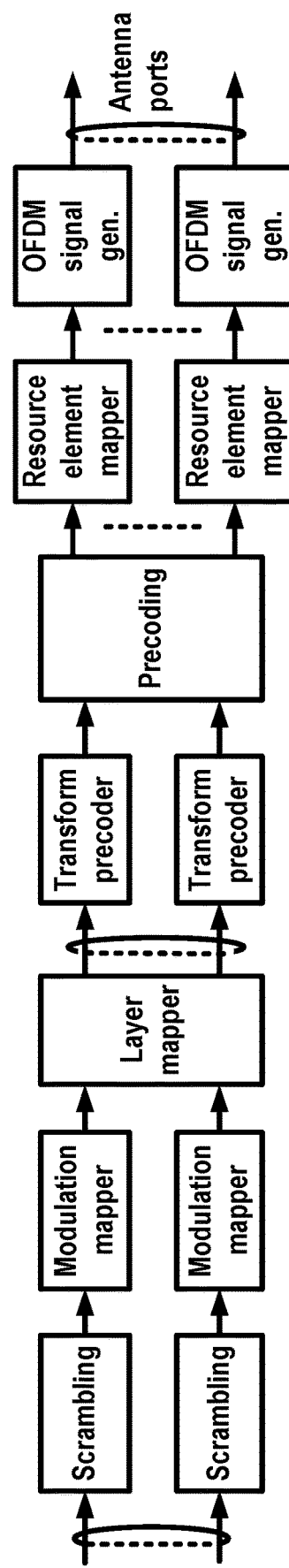
FIG. 16C

US 12,309,098 B2

FEEDBACK FOR WIRELESS COMMUNICATIONS

CROSS-REFERENCE TO RELATED APPLICATIONS

This application claims the benefit of U.S. Provisional Application No. 62/909,662, filed on Oct. 2, 2019. The above-referenced application is hereby incorporated by reference in its entirety.

BACKGROUND

A base station and a wireless device communicate via uplink and/or downlink communication. A wireless device communicates with some devices (e.g., other wireless devices) via sidelink communications.

SUMMARY

The following summary presents a simplified summary of certain features. The summary is not an extensive overview and is not intended to identify key or critical elements.

Wireless devices may communicate with each other via a communication link (e.g., a sidelink). A wireless device may receive downlink messages from a base station, and the wireless device may receive sidelink messages from another wireless device. Wireless communications may use an acknowledgment feedback to enable a communication device to determine whether a transmission was successfully received. For example, acknowledgment feedback from a wireless device may be used for downlink messages and/or for sidelink messages. Acknowledgment feedback for sidelink communications may be multiplexed with acknowledgment feedback for downlink communications or sent via different channel resources. Acknowledgment feedback for sidelink communications may be prioritized over acknowledgment feedback of downlink communications based on one or more indications. For example, if an acknowledgment for a sidelink message is associated with a resource that overlaps in time with a resource associated with an acknowledgment for a downlink message, a priority indicator may determine which acknowledgment will be sent. Various examples described herein may enable efficient scheduling of resources for acknowledgment feedbacks and reduce probability of collisions between different acknowledgment feedbacks.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A shows an example downlink data flow for a user plane configuration.

FIG. 4B shows an example format of a Medium Access Control (MAC) subheader in a MAC Protocol Data Unit (PDU).

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

DETAILED DESCRIPTION

Figure 1A:
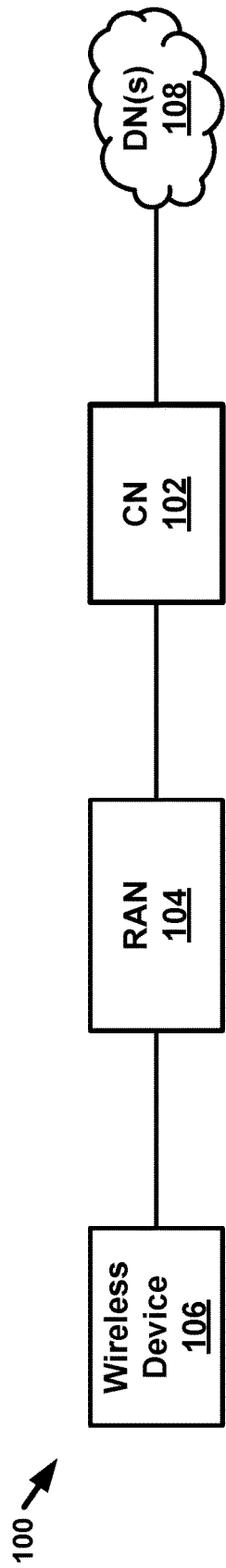
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to sidelink communications between wireless devices.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hot-spots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
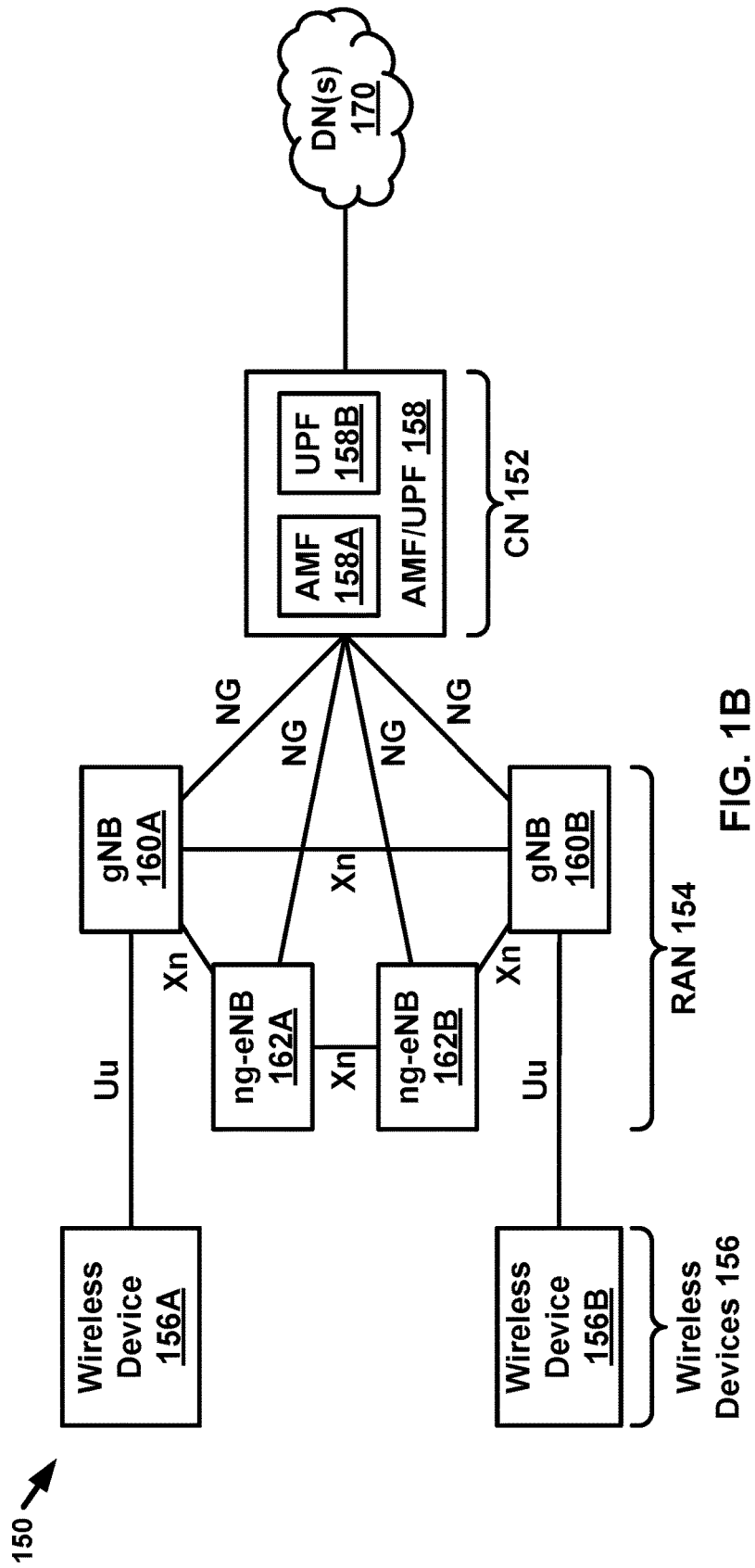

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
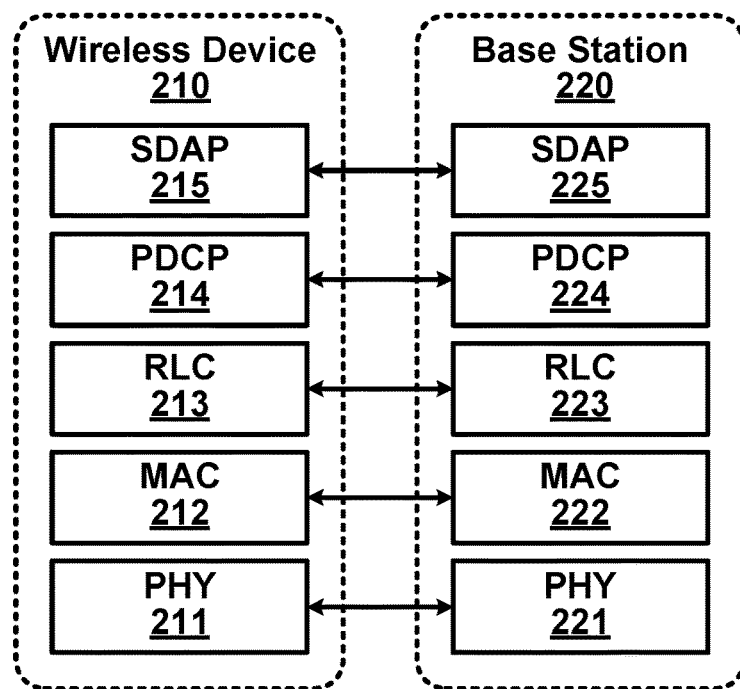
FIG. 2A shows an example user plane.
Figure 2B:
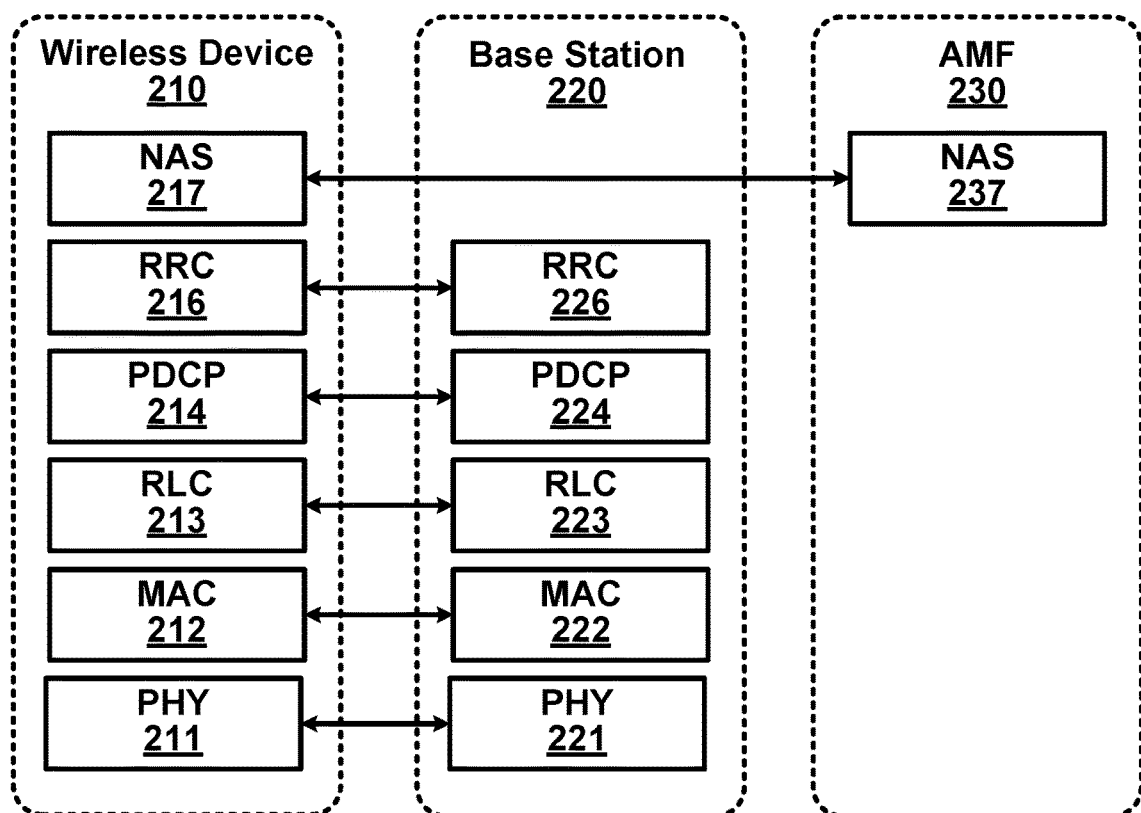
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
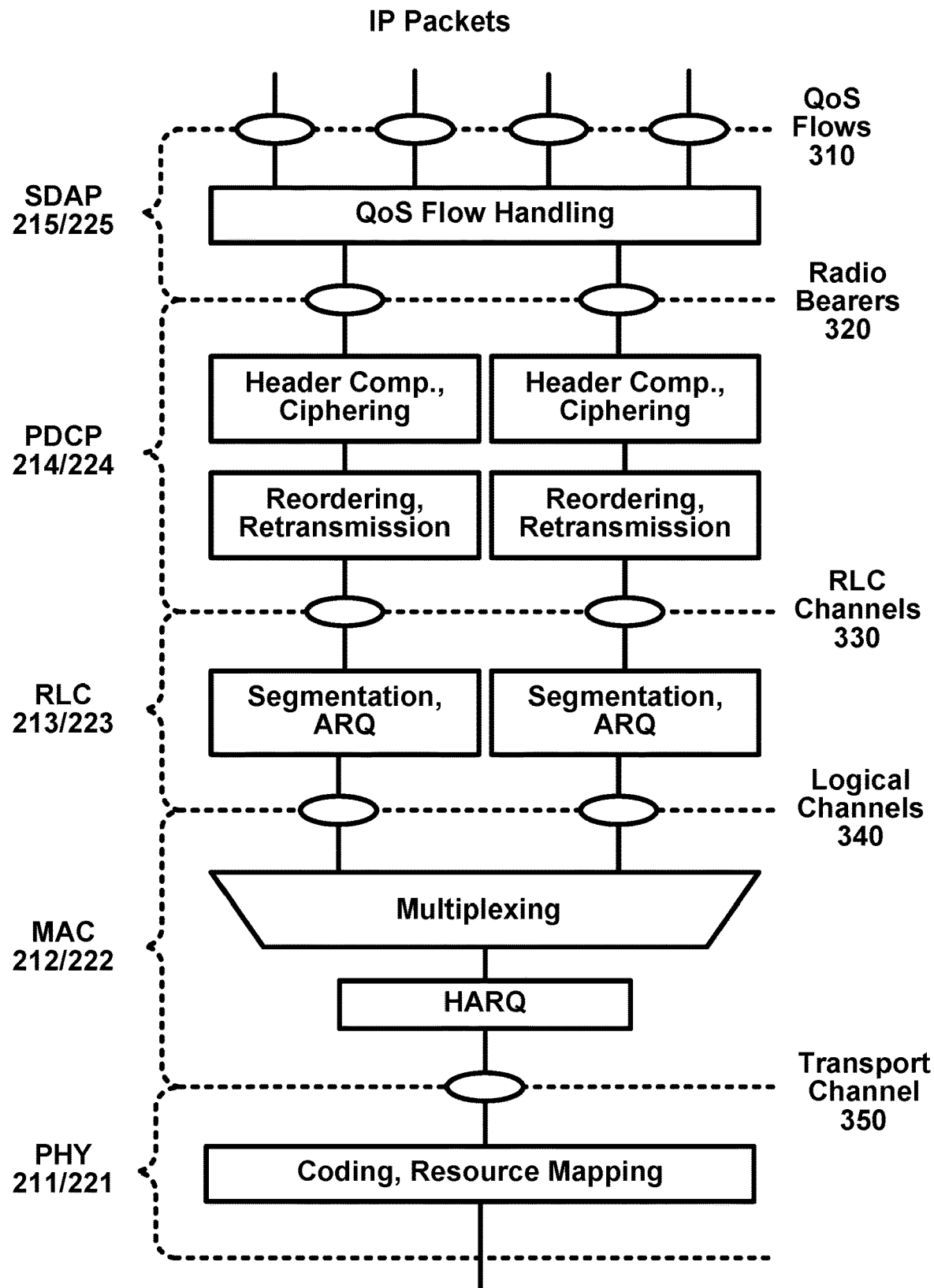
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be sent/transmitted over the air interface, ciphering/deciphering to prevent unauthorized decoding of data sent/transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink and/or uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions;

QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
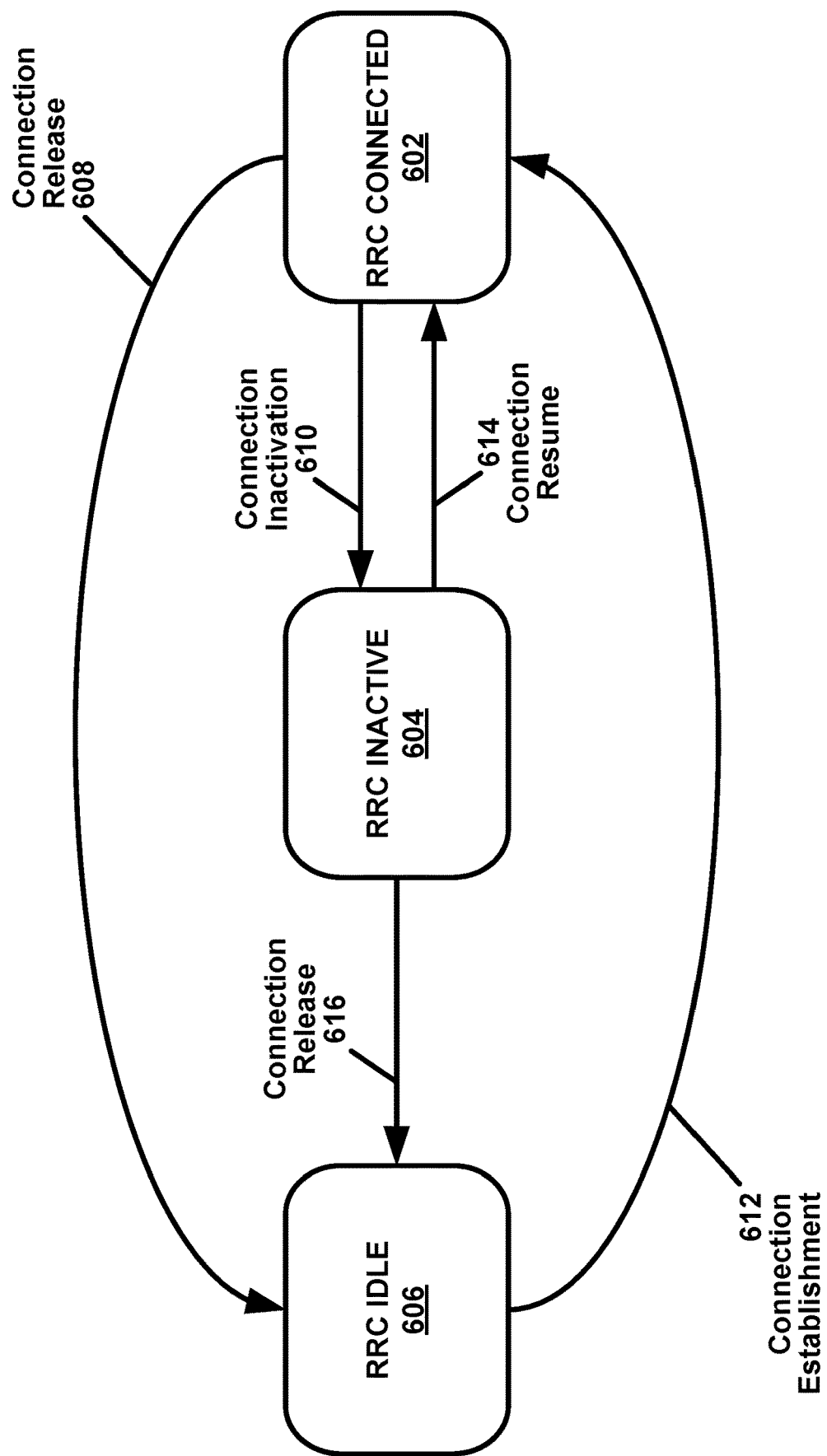
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
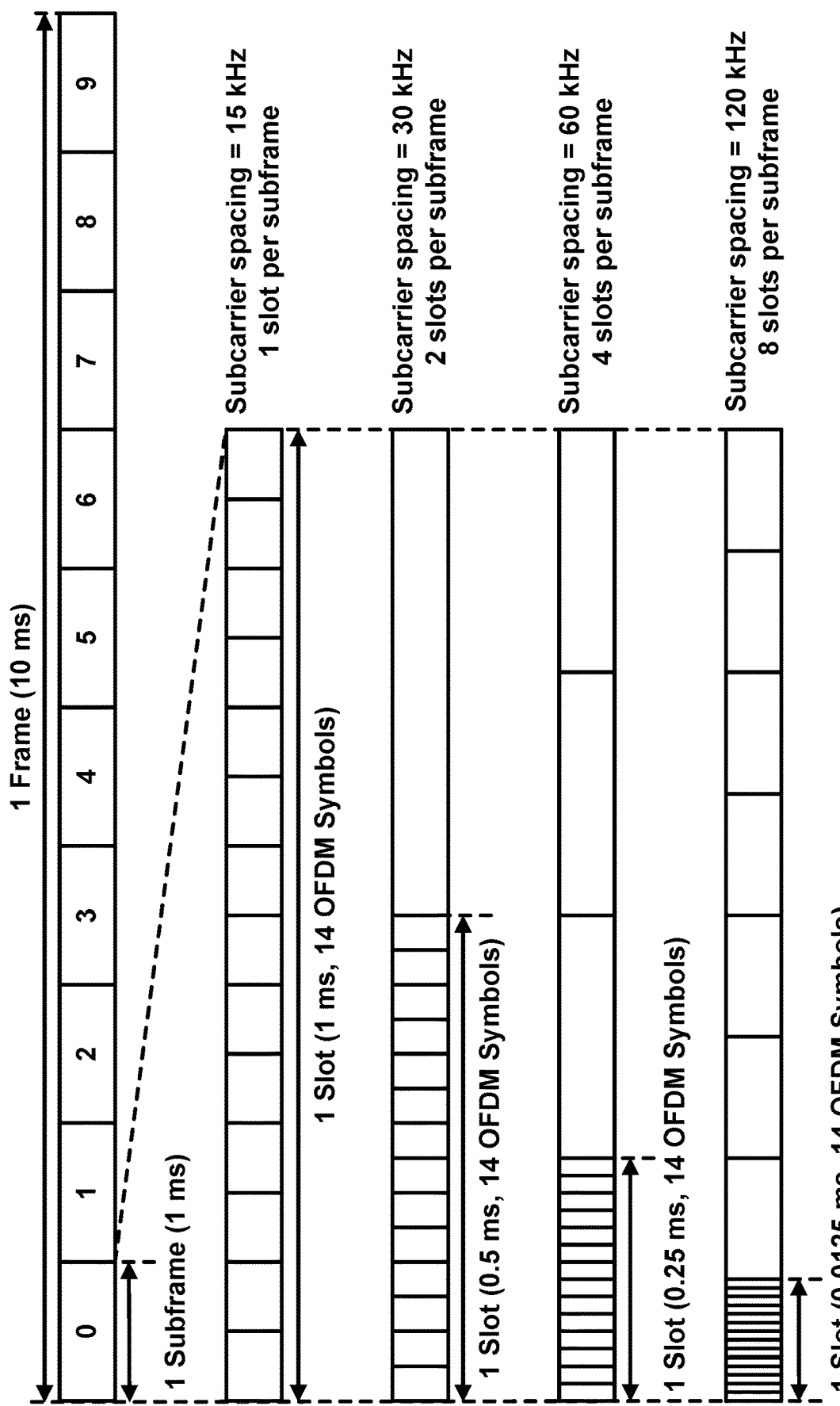
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
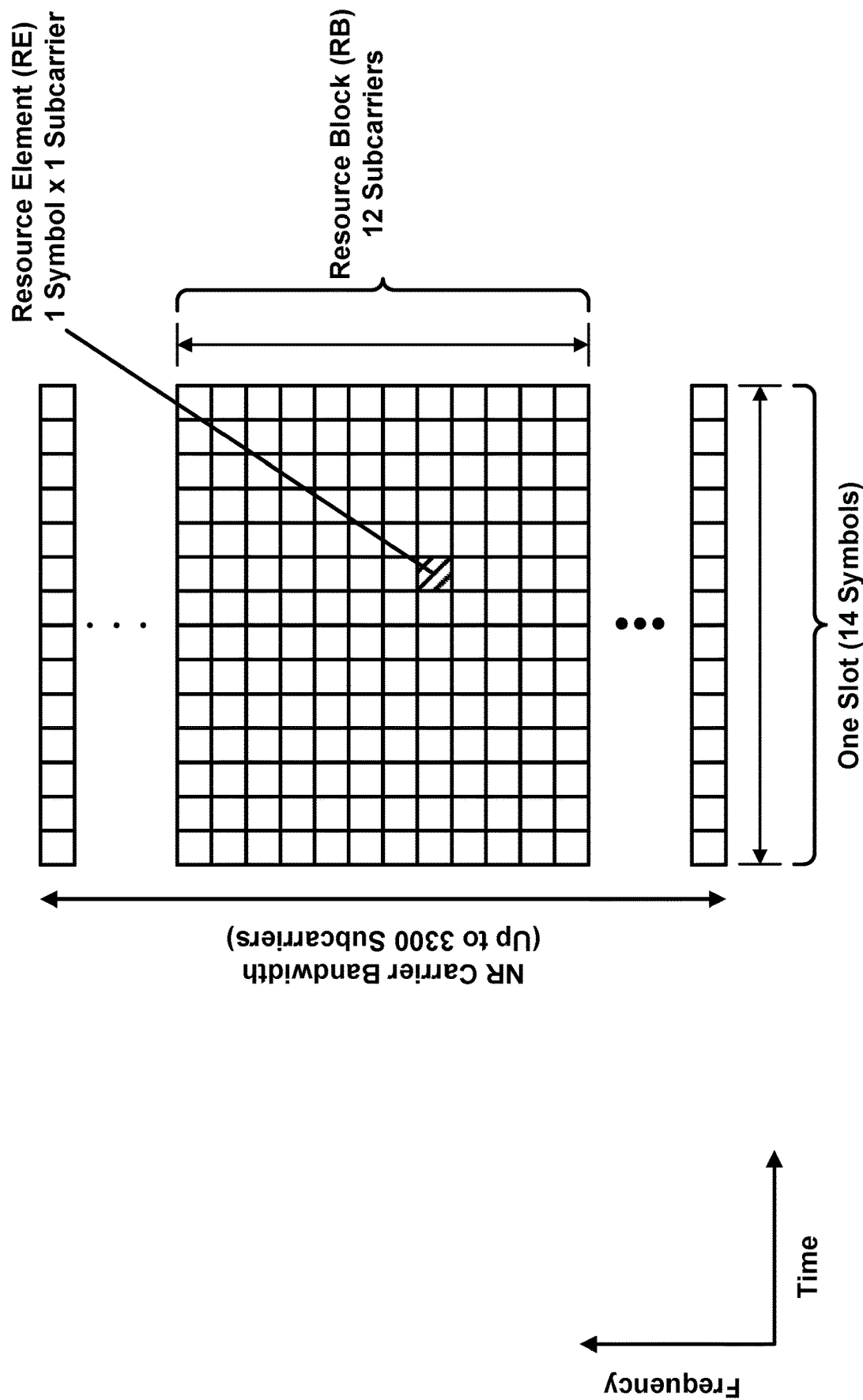
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESTS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
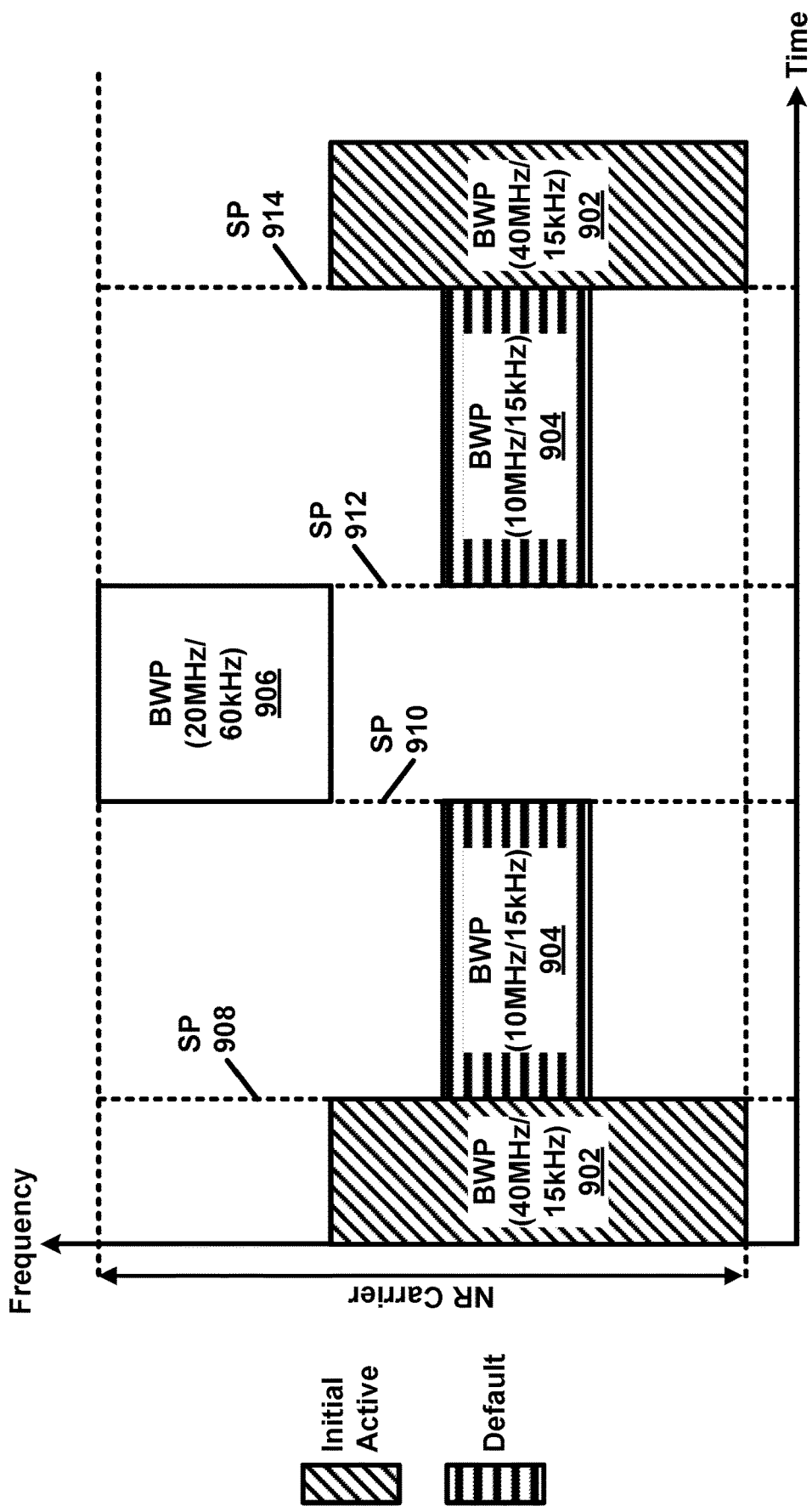
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
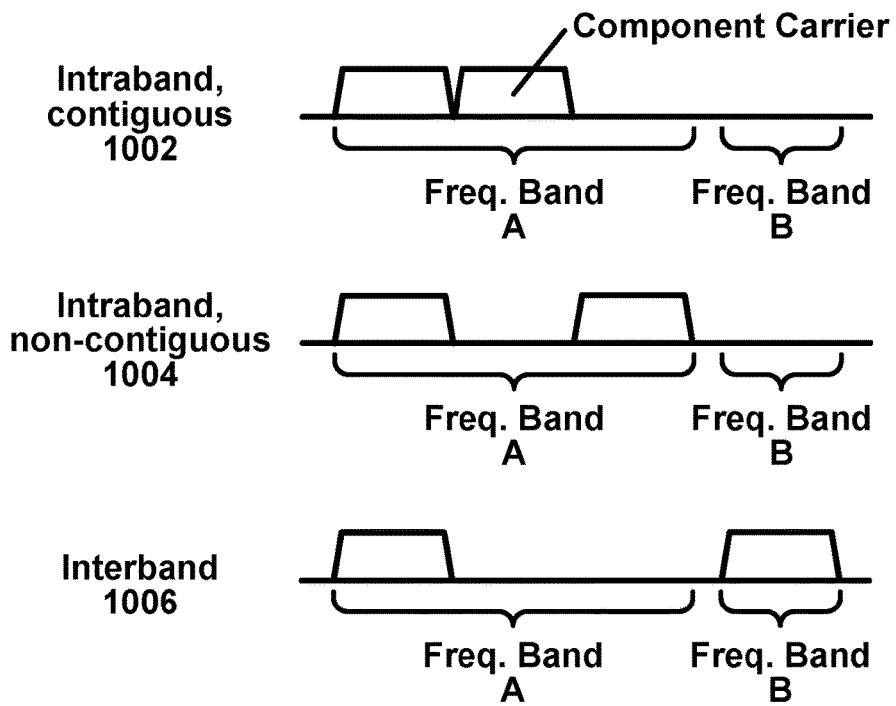
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
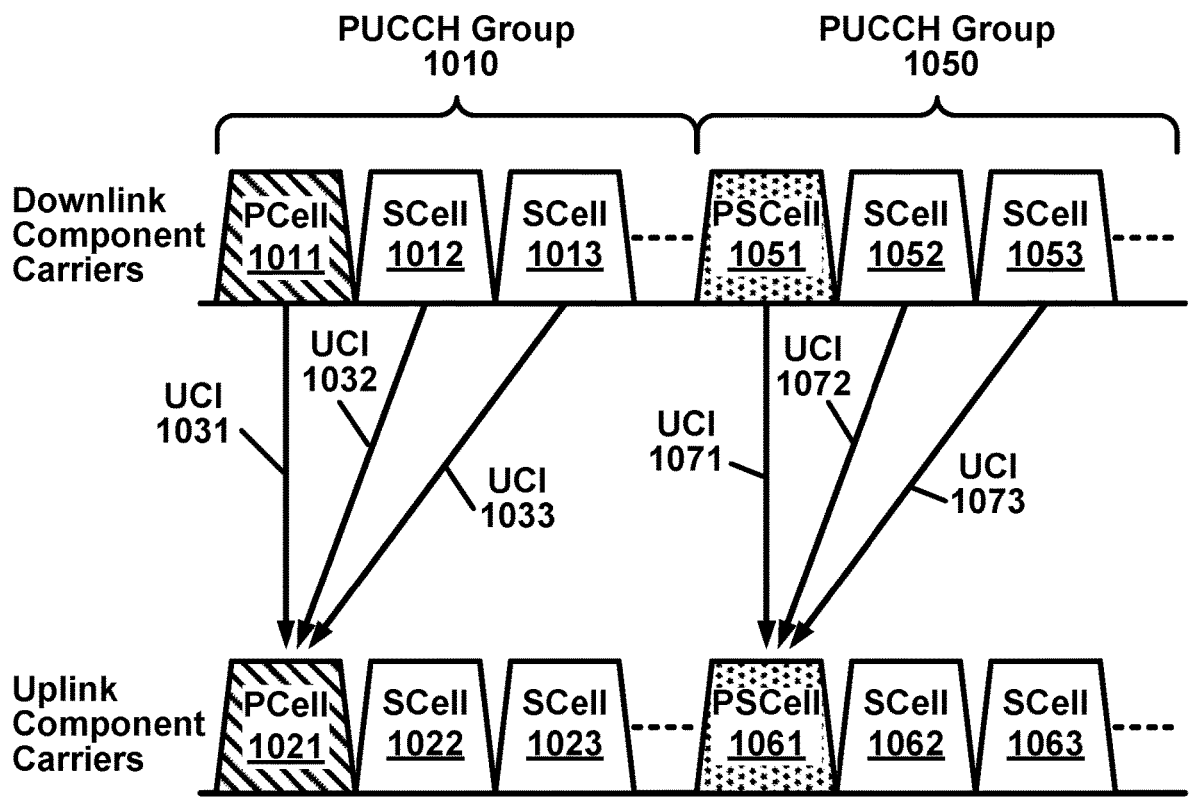
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
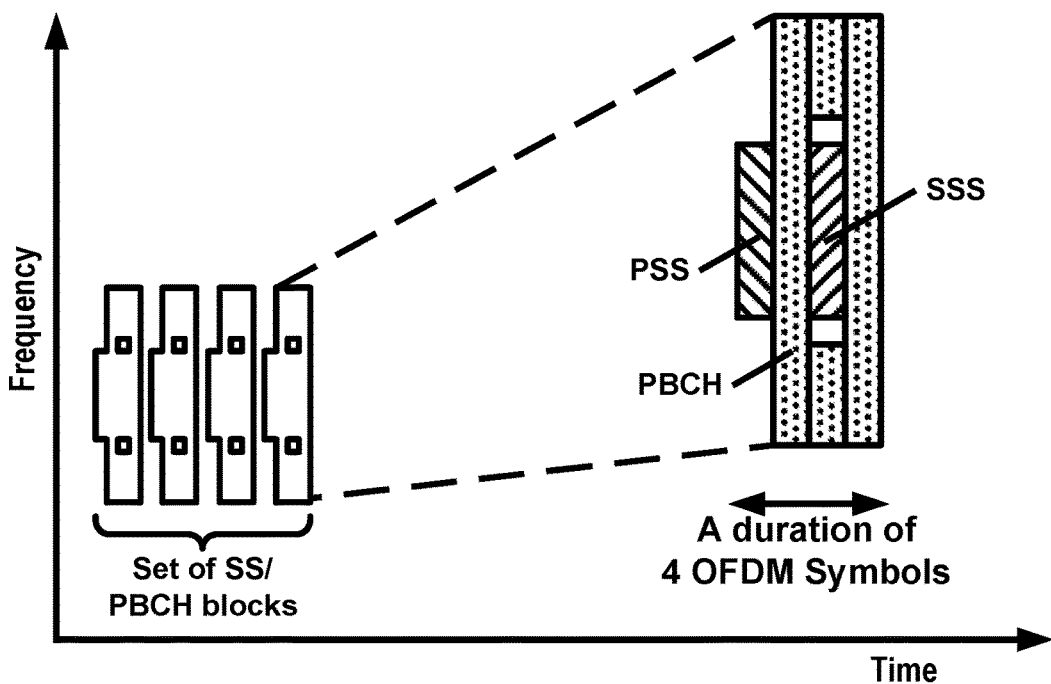
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DM-RSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DM-RSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions.

The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
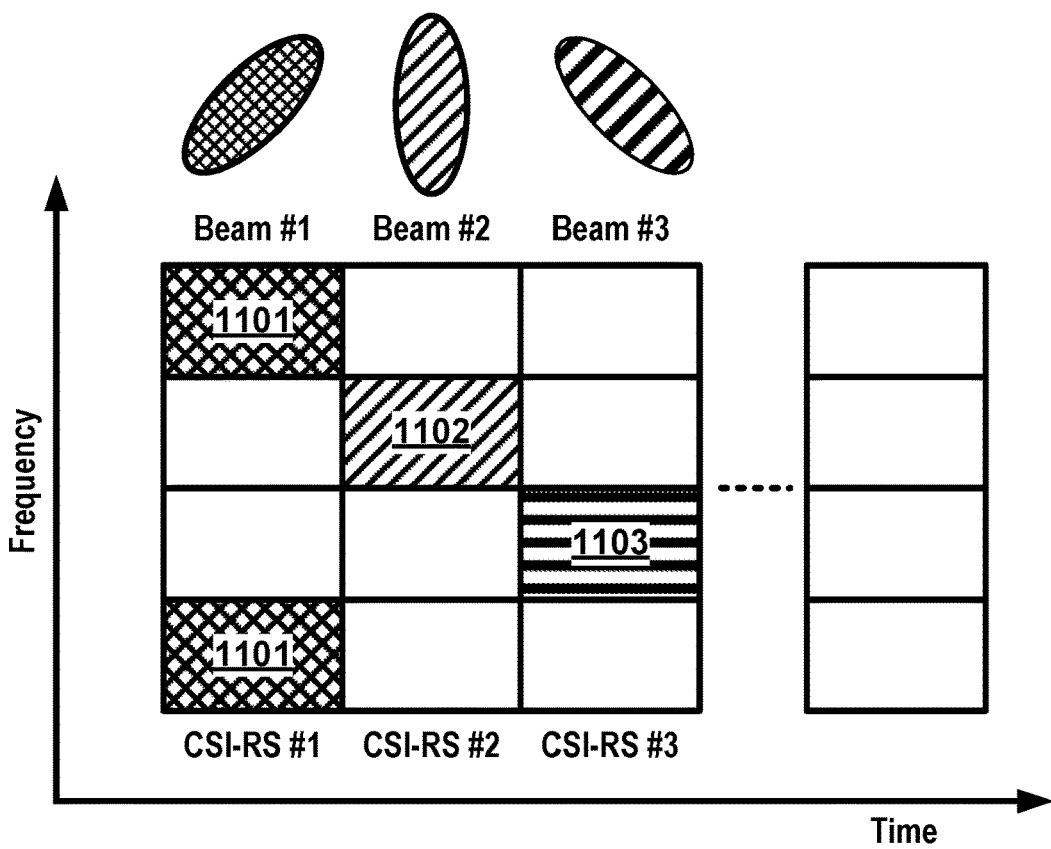
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

RA-RNTI=1+*s*_id+14×*t*_id+14×80×*f*_id+14×80×8× ul_carrier_id where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgment for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
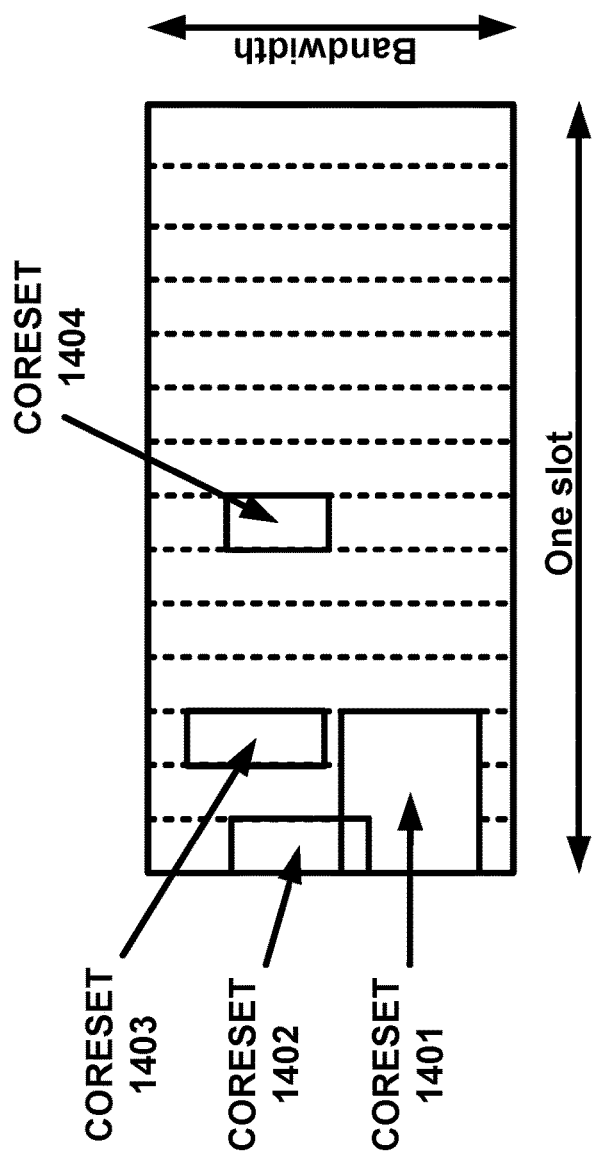
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
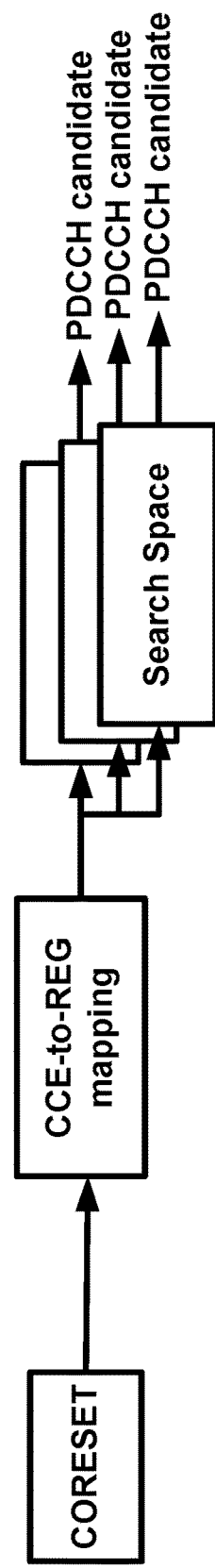
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgments for received DL-SCH transport blocks. The wireless device may send/transmit the HARQ acknowledgments, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgments (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
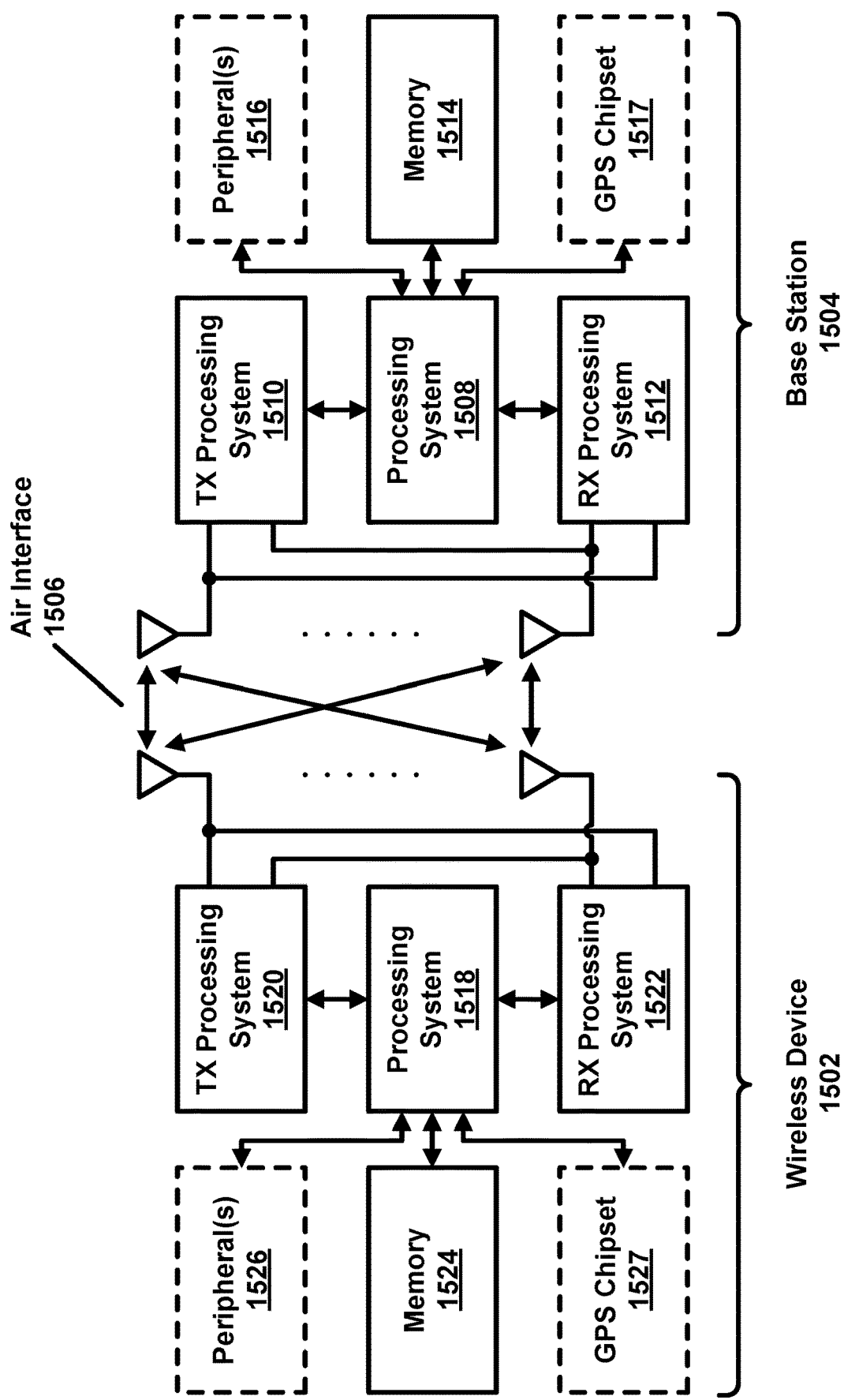
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
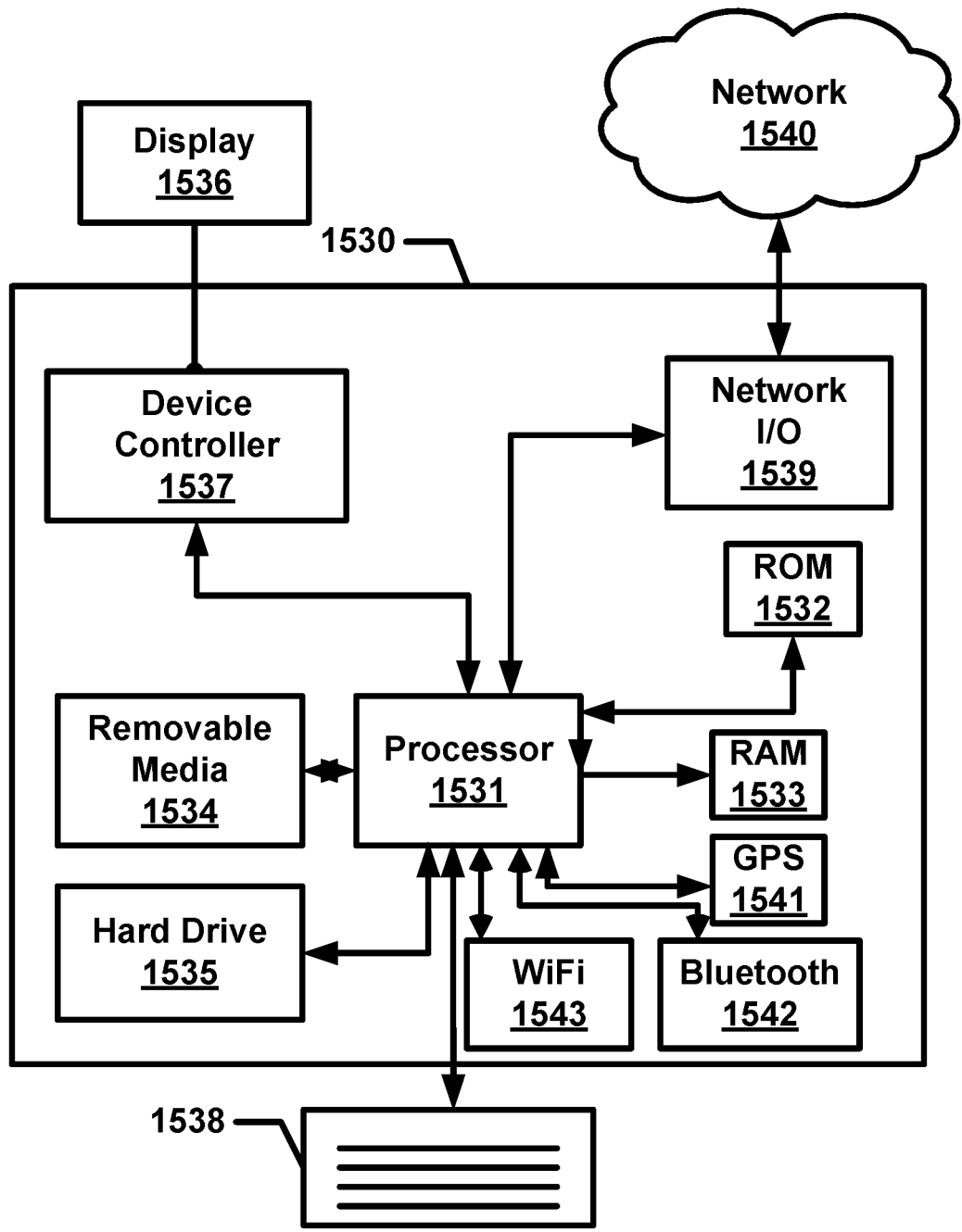
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Figure 17:
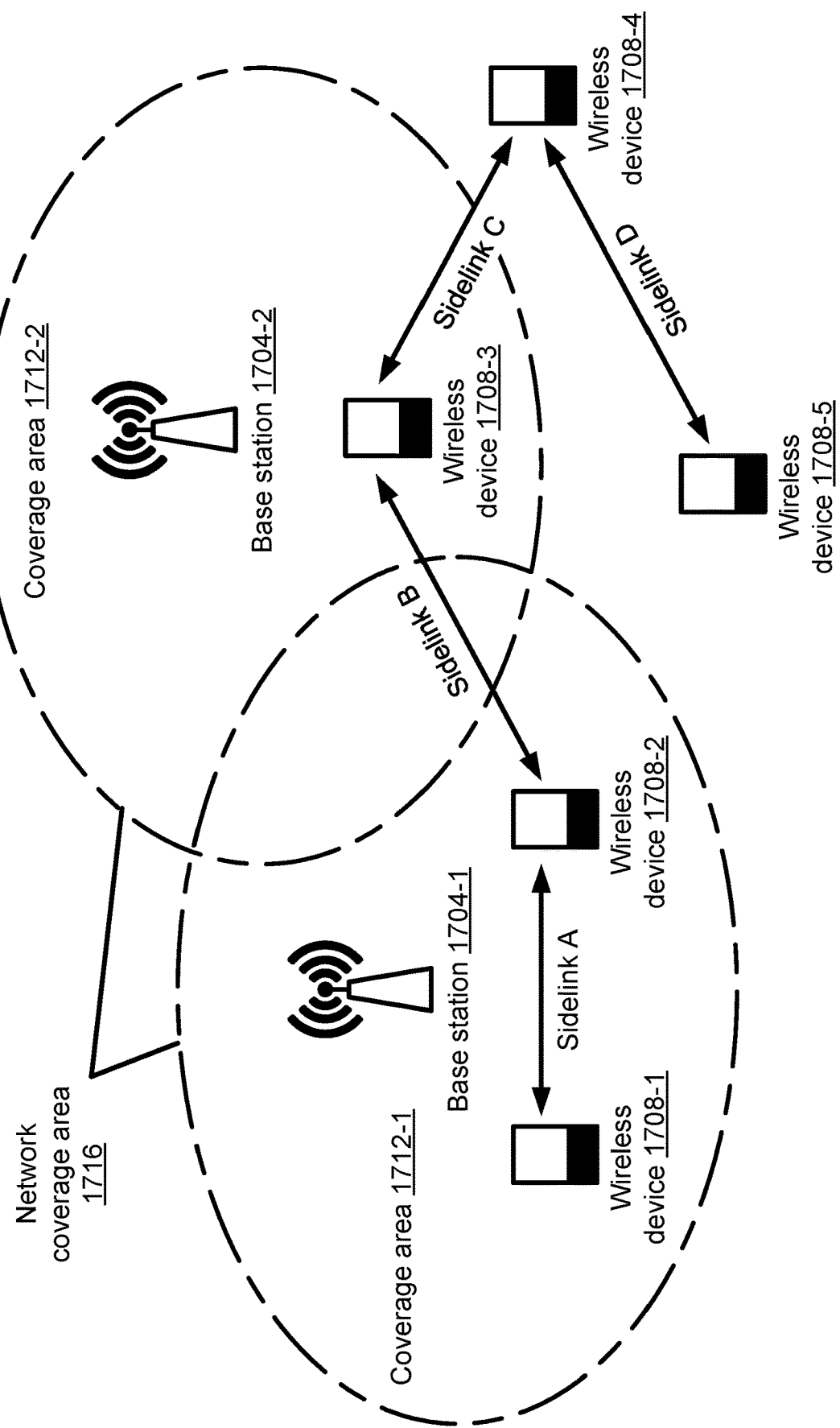
FIG. 17 shows examples of device-to-device (D2D) communications.

FIG. 17 shows examples of device-to-device (D2D) communications. D2D communication may comprise direct communication between wireless devices 1708. D2D communication may be performed via a communication channel (e.g., sidelink (SL) communication channel, sidelink A, B, C, and/or D, as shown in FIG. 17). The wireless devices 1708 may exchange sidelink communications via a sidelink interface (e.g., a PC5 interface). A sidelink communication channel may differ from an uplink communication channel (via which a wireless device may communicate with a base station) and a downlink communication channel (via which a base station may communicate with a wireless device). A wireless device and a base station may exchange uplink and/or downlink communications via a user plane interface (e.g., a Uu interface). Even though various examples described herein refer to sidelink, sidelink communications, and/or sidelink communication channels, one skilled in the art may appreciate that the various examples described herein may apply to any form of communication between communication devices.

A wireless device 1708-1 and a wireless device 1708-2 may be in a coverage area 1712-1 of a base station 1704-1. Both wireless device 1708-1 and wireless device 1708-2 may communicate with the base station 1708-1, for example, via a Uu interface. A wireless device 1708-3 may be in a coverage area 1712-2 of a base station 1704-2. The base station 1704-1 and the base station 1704-2 may share a network and may jointly service a network coverage area 1716. A wireless device 1708-4 and a wireless device 1708-5 may be outside of the network coverage area 1716.

In-coverage D2D communication may be performed, for example, if two wireless devices share a network coverage area. The wireless device 1708-1 and the wireless device 1708-2 may both be in the coverage area 1712-1 of the base station 1704-1. The wireless device 1708-1 and the wireless device 1708-2 may perform an in-coverage intra-cell D2D communication (e.g., via sidelink A). The wireless device 1708-2 and the wireless device 1708-3 may be in the coverage areas of different base stations, but share the same network coverage area 1716. The wireless device 1708-2 and the wireless device 1708-33 may perform an in-coverage inter-cell D2D communication (e.g., via sidelink B). Partial-coverage D2D communications may be performed, for example, if one wireless device is within the network coverage area 1716 and the other wireless device is outside the network coverage area. The wireless device 1708-3 and the wireless device 1708-4 may perform a partial-coverage D2D communication (e.g., via sidelink C). Out-of-coverage D2D communications may be performed, for example, if both wireless devices are outside of the network coverage area. The wireless device 1708-4 and the wireless device 1708-5 may perform an out-of-coverage D2D communication (e.g., via sidelink D).

Sidelink communications may be configured using physical channels. Physical channels may comprise, for example, a physical sidelink broadcast channel (PSBCH), a physical sidelink feedback channel (PSFCH), a physical sidelink discovery channel (PSDCH), a physical sidelink control channel (PSCCH), and/or a physical sidelink shared channel (PSSCH). PSBCH may be used by a first wireless device to send broadcast information to a second wireless device. PSBCH may be similar (or substantially similar) in at least some aspects to PBCH. The broadcast information may comprise, for example, a slot format indication, resource pool information, a sidelink system frame number (SFN), and/or any other suitable broadcast information. PSFCH may be used by a first wireless device to send feedback information to a second wireless device. The feedback information may comprise, for example, HARQ feedback information. PSDCH may be used by a first wireless device to send discovery information to a second wireless device. The discovery information may be used by a wireless device to signal its presence and/or availability of services to other wireless devices in an area. PSCCH may be used by a first wireless device to send sidelink control information (SCI) to a second wireless device. PSCCH may be similar (or substantially similar) in at least some aspects to PDCCH and/or PUCCH. The SCI may comprise, for example, time/frequency resource allocation information (e.g., resource block size, a quantity of retransmissions, etc.), demodulation related information (e.g., DM-RS, MCS, RV, etc.), identifying information for a transmitting wireless device and/or a receiving wireless device, a process indicator/identifier (HARQ identifier, etc.), or any other suitable control information. The PSCCH may be used to allocate, prioritize, and/or reserve sidelink resources for sidelink transmissions. PSSCH may be used by a first wireless device to send and/or relay data and/or network information to a second wireless device. PSSCH may be similar (or substantially similar) in at least some aspects to PDSCH and/or PUSCH. Each of the sidelink channels may be associated with one or more DM-RSs. Sidelink operations may utilize sidelink synchronization signals to establish a timing of sidelink operations. Wireless devices configured for sidelink operations may send sidelink synchronization signals, for example, via the PSBCH. The sidelink synchronization signals may comprise primary sidelink synchronization signals (PSSS) and/or secondary sidelink synchronization signals (SSSS).

Sidelink resources may be configured for a wireless device in any suitable manner A wireless device may be pre-configured for sidelink communications (e.g., pre-configured with sidelink resource information indicating sidelink resources). Additionally, or alternatively, a network may broadcast system information relating to a resource pool for sidelink communications. Additionally, or alternatively, a network may configure a particular wireless device with a dedicated sidelink configuration. The configuration may indicate/identify sidelink resources (e.g., a sidelink band combination) to be used for sidelink operations.

The wireless device may operate in different modes. The wireless device may operate in an assisted mode (e.g., mode 1) and/or an autonomous mode (e.g., mode 2). Mode selection may be based on a coverage status of the wireless device, a radio resource control status of the wireless device, information and/or instructions from the network, and/or any other suitable factors. The wireless device may determine a mode of operation. The wireless device may determine to operate in an autonomous mode, for example, if the wireless device is idle or inactive, or if the wireless device is outside of a network coverage area. The wireless device may determine to operate (or be instructed by a base station to operate) in an assisted mode, for example, if the wireless device is in a connected mode (e.g., connected to the base station). The network (e.g., a base station) may instruct a connected wireless device to operate in a particular mode.

The wireless device, in an assisted mode (e.g., mode 1, network-assisted mode, gNB-assisted mode, or base station-assisted mode), may request scheduling from the network. The wireless device may send a scheduling request (SR) to the network and the network may allocate sidelink resources (e.g., via sidelink DCI) to the wireless device. The base station, in the assisted mode, may allocate one or more configured grant sidelink resources. The wireless device, in an autonomous mode (e.g., mode 2), may determine/select sidelink resources based on measurements within one or more resource pools (for example, pre-configured or network-assigned resource pools), sidelink resource selections made by other wireless devices, and/or sidelink resource usage of other wireless devices.

A wireless device (e.g., in autonomous mode) may monitor/observe a sensing window and a selection window for selection of sidelink resources. The wireless device may monitor/observe SCI sent/transmitted by other wireless devices via the sidelink resource pool in the sensing window. The SCIs may indicate/identify resources that may be used and/or reserved for sidelink transmissions. The wireless device may select resources within the selection window, for example, based on the resources indicated by the SCIs as sent/transmitted in the sensing window. The wireless device may select resources within the selection window, for example, that are different from the resources indicated by the SCIs. The wireless device may communicate via the selected sidelink resources.

Figure 18:
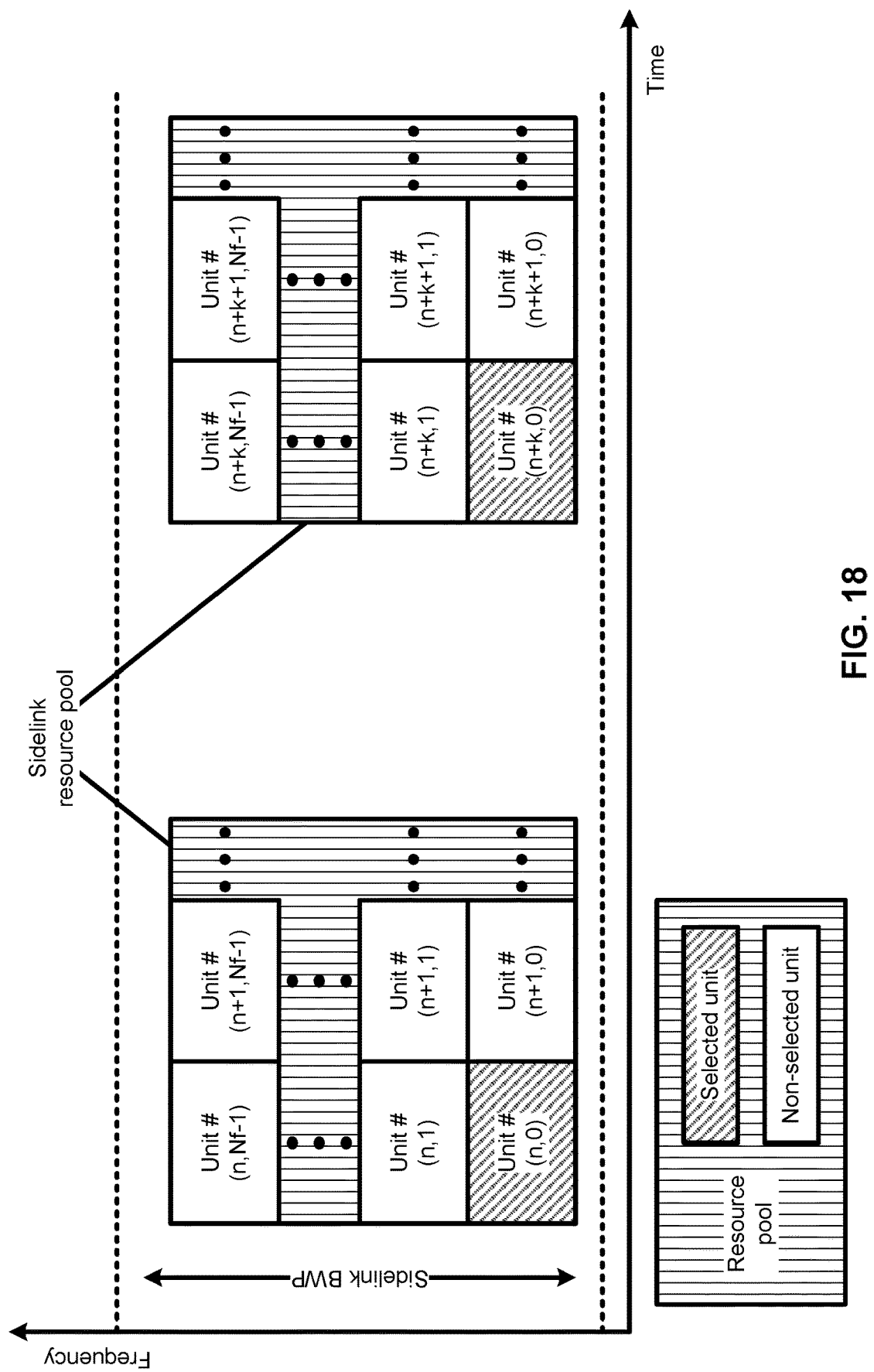
FIG. 18 shows an example of a resource pool for sidelink operations.

FIG. 18 shows an example of a resource pool for sidelink operations. A wireless device may operate using one or more sidelink cells. A sidelink cell may comprise one or more resource pools. Each resource pool may be configured to operate in accordance with a particular mode (e.g., assisted mode or autonomous mode). The resource pool may be divided into resource units (e.g., units as shown in FIG. 18). Each resource unit may comprise, for example, one or more resource blocks (referred herein as sub-channels) in the frequency domain. Each resource unit, in the time domain, may comprise, for example, one or more slots, one or more subframes, and/or one or more OFDM symbols. The resource pool may be continuous or non-continuous in the frequency domain and/or the time domain. For example, the resource pool may comprise contiguous resource units and/or non-contiguous resource units. The resource pool may be divided into repeating resource pool portions. The resource pool may be shared among one or more wireless devices. Each wireless device may attempt to send/transmit signals via different resource units, for example, to avoid collisions.

Sidelink resource pools may be arranged in any suitable manner. An example resource pool (e.g., the resource pool shown in FIG. 18) may be non-contiguous in the time domain and/or confined to a single sidelink BWP. The frequency resources in the example resource pool may be divided into Nf resource units per unit of time (e.g., numbered from 0 to Nf−1). The example resource pool may comprise a plurality of portions (e.g., non-contiguous as shown in FIG. 18) that repeat every k units of time. With reference to FIG. 18, the time resources may be numbered as n, n+1 n+k, n+k+1 . . . , etc.

The wireless device may determine/select, for transmission, one or more resource units from the resource pool. The wireless device may select/determine resource unit (n,0) for sidelink transmission. The wireless device may select/determine periodic resource units in later portions of the resource pool (e.g., resource unit (n+k,0), resource unit (n+2k,0), resource unit (n+3k,0), etc). The selection may be based on, for example, a determination that a transmission using resource unit (n,0) will not (or is not likely to) collide with a sidelink transmission of a wireless device that may share the sidelink resource pool. The determination may be based on, for example, behavior of (e.g., transmissions corresponding to) other wireless devices that may share the sidelink resource pool. The wireless device may select resource unit (n,0), resource (n+k,0), etc., for example, if no sidelink transmissions are detected in resource unit (n−k,0). The wireless device may avoid selection of resource unit (n,1), resource (n+k,1), etc., for example, if a sidelink transmission from another wireless device is detected in resource unit (n−k,1).

Different sidelink physical channels may use different resource pools. A PSCCH may use a first resource pool and a PSSCH may use a second resource pool (e.g., different from the first resource pool). Different resource priorities may be associated with different resource pools. Data associated with a first QoS, service, priority, and/or other characteristic may use a first resource pool and data associated with a second QoS, service, priority, and/or other characteristic may use a second resource pool. A network (e.g., a base station) may configure a priority level for each resource pool, a service to be supported by each resource pool, etc. A network (e.g., a base station) may configure a first resource pool for use by unicast wireless devices, a second resource pool for use by groupcast wireless devices, etc. A network (e.g., a base station) may configure a first resource pool for transmission of sidelink data, a second resource pool for transmission of discovery messages, etc.

Vehicular communication services (e.g, V2X services), may comprise one or more of the following different types: vehicle-to-vehicle (V2V), vehicle-to-infrastructure (V2I), vehicle-to-network (V2N), and/or vehicle-to-pedestrian (V2P). A first vehicle may, for example, communicate with a second vehicle via V2V vehicle communications. A vehicle may, for example, communicate with a base station via V2I communications. A vehicle may, for example, communicate with a network via V2N communications. A vehicle may, for example, communicate with a pedestrian via V2P communications. V2X services may be provided by a PC5 interface (or any sidelink interface) and/or a Uu interface (or any wireless device to base station interface). For example, V2V/V2P communication type may be based on a PC5 interface. For example, V2I/V2N communication type may be based on a Uu interface. Support of V2X services via PC5 interface may be provided by V2X sidelink communication that may enable wireless devices to communicate with each other directly via the PC5 interface.

A wireless device may provide wireless device assistance information to a base station. A base station may send/transmit one or more configuration messages (e.g., RRC messages) to configure reporting of the wireless device assistance information. The wireless device assistance information may comprise parameters related to a semi-persistent scheduling (SPS) configuration and/or a configured grant resource (CG) configuration. Triggering of wireless device assistance information transmission may be based on wireless device implementation, such that a wireless device may determine whether to trigger assistance information transmission. The wireless device may report the wireless device assistance information, for example, if estimated periodicity and/or timing offset of packet arrival changes.

The wireless device may send/transmit traffic associated with multiple V2X services, which may require different periodicity and packet sizes. The SPS/CG TB size and period may be adapted for different V2X services. Multiple parallel SPS/CG processes may be activated at/by the wireless devices. The SPS/CG processes may differ in the quantity of resource blocks allocated and/or SPS/CG period and may correspond to different types of V2X packets.

A base station may provide (e.g., via RRC signaling) one or more SPS and/or configured grant resource configurations for the wireless device. Multiple SPSs and/or multiple configured grants may be activated in parallel (or substantially in parallel). A new service may be triggered, for example, during an ongoing (e.g., previously triggered) service. The wireless device may send/transmit an assistance message to the base station indicating new information about new messages (e.g., SPS traffic) for transmission. The base station may provide a second SPS/configured grant configuration for the new service/message(s).

A wireless device configured with multiple cells may be configured with a single cell for transmission of UCI. The single cell for UCI transmission may be determined/selected by the base station. The base station may send/transmit one or more DCIs comprising resource assignments and HARQ-ACK feedback resource indications for downlink communications. The base station may send/transmit one or more sidelink (SL) DCI messages comprising resource assignment and SL HARQ-ACK feedback resource indication for sidelink communications. The HARQ-ACK feedback messages for downlink communications and/or sidelink communications may be sent/transmitted via PUCCHs. The base station may schedule the resources such that the wireless device may not transmit HARQ-ACK feedback messages for downlink communications and sidelink communications via a same time resource. The base station may schedule the HARQ-ACK feedback resources and/or the SL HARQ-ACK feedback resources in a time-domain manner Collisions between transmissions via the HARQ-ACK feedback resources and the SL HARQ-ACK feedback resources may be minimized/reduced, for example, based on the base station scheduling the HARQ-ACK feedback resources and the SL HARQ-ACK feedback resources. The base station may configure one or more CSI feedback messages, from the wireless device (e.g., in addition to configuring HARQ-ACK feedback). The CSI feedbacks may be sent/transmitted periodically or may be triggered dynamically.

The wireless device and/or the base station may attempt to prevent overlap between a first PUCCH transmission for downlink and/or uplink operation (e.g., SR transmission, HARQ-ACK transmission, CSI feedback, etc.) and a second PUCCH transmission for sidelink operation (e.g., SL SR transmission, SL HARQ-ACK transmission, sidelink related CSI/measurement reports/feedbacks, etc.). Relying on one or more RRC configurations and/or dynamic scheduling may not be effective for ensuring that the first PUCCH transmission and the second PUCCH transmission do not overlap (e.g., if the wireless device is activated with a plurality of cells and/or operating with a high data rate on downlink/uplink with high feedback overhead). A semi-static split of time resources between the first PUCCH transmission and the second PUCCH transmission may be inefficient because load on each PUCCH transmission may dynamically change depending on traffic load on downlink/uplink and sidelink. Efficient resource sharing for the first PUCCH transmission and the second PUCCH transmission may be necessary for effective utilization resources and to support coexistence between downlink/uplink communications and sidelink communications.

A wireless device may send/transmit first UCI for downlink and/or uplink operation (e.g., SR transmission, HARQ-ACK transmission, CSI feedback, etc.) and a second UCI for sidelink operation (e.g., SL SR transmission, SL HARQ-ACK transmission, sidelink related CSI/measurement reports/feedbacks, etc.) based on shared resources (e.g., PUCCH resources). Multiplexing the first UCI and the second UCI (e.g., in shared PUCCH resources and/or in a single PUCCH transmission and/or in a single HARQ-ACK feedback) may increase wireless device and/or base station complexity. Fields (e.g., downlink assignment indicator/index (DAI) fields, sidelink assignment index (SAI) fields) in DCIs or SL DCIs sent by a base station may indicate a quantity of transmissions (e.g., downlink transmissions and/or sidelink transmissions). A quantity of bits in a HARQ-ACK feedback may vary based on the fields and a quantity of transmissions received at/by the wireless device. The bits in the HARQ-ACK feedback may need to be shared between downlink operation and sidelink operation. The base station may need to accommodate HARQ-ACK bits for both downlink transmissions and sidelink transmissions by appropriately indicating DAI values/SAI values in the DCI/SL DCI, which may increase base station complexity. The wireless device may be unable to determine which of the DCI and/or the SL DCI has not been received, for example, if one of the DCI messages or SL DCI messages are not received at/by the wireless device. An order of HARQ-ACK bits and/or a quantity of the HARQ-ACK bits may be different in an uplink transmission based on which one of the DCI and/or the SL DCI is not received. Differences in an order of HARQ-ACK bits may lead ambiguity at the base station, for example, in decoding the received HARQ-ACK feedback.

As described herein, a base station may configure a first set of PUCCH resources for first UCI transmission (e.g., HARQ-ACK transmission) corresponding to downlink/uplink operation. The base station may configure a second set of PUCCH resources for second UCI transmission (e.g., SL HARQ-ACK transmission) corresponding to sidelink operation. The first set of PUCCH resources may overlap with the second set of PUCCH resources in time/frequency domain. The base station may indicate a first PUCCH resource of the first set of PUCCH resources for the first UCI and a second PUCCH resource of the second set of PUCCH resources for the second UCI. A wireless device may determine/generate the first UCI separately/independently from the second UCI. The wireless device may determine/select the first UCI or the second UCI for transmission and drop an unselected UCI, for example, if the first PUCCH resource and the second PUCCH resource overlap. The wireless device may determine/select the first UCI or the second UCI based on a priority of the second UCI and a priority threshold. The wireless device may determine/select the second UCI, for example, based on/in response to the priority being higher than the priority threshold. The wireless device may determine/select the first UCI, for example, based on/in response to the priority being lower than or equal to the priority threshold. Various examples described herein may reduce complexity in handling UCI for downlink/uplink and sidelink operation and/or allow flexible configuration/scheduling, by the base station, on/via PUCCH resources. Various examples described herein may allow increased quality of service by transmitting UCIs with a high priority (e.g., if an overlap occurs between different UCIs), and reduce network complexity. Various examples described herein may allow flexible management of prioritization between the first UCI and the second UCI, by the base station, based on a configuration of a priority threshold.

A wireless device may perform downlink/uplink operations and/or sidelink operations (e.g., mode 1, assisted mode). The wireless device may send/transmit first PUCCH transmissions (e.g., one or more UCIs) corresponding to downlink/uplink operation via a first PUCCH. The wireless device may send/transmit second PUCCH transmissions (e.g., one or more UCIs) corresponding to sidelink operation via a second PUCCH. The wireless device may transmit the first PUCCH transmission and the second PUCCH transmission via overlapping time resources (e.g., in a same slot) and different frequency resources. The wireless device may transmit the first PUCCH transmission and the second PUCCH transmission, for example, on different cells (e.g., a first cell and a second cell). The first cell may be a primary cell (PCell), a primary cell of a master cell group (PCell) or a primary cell of a secondary cell group (SPCell) or a PUCCH SCell. The second cell may be an SPCell, a PUCCH SCell, or a special SCell for the second PUCCH transmission.

A wireless device may receive one or more RRC messages. The one or more RRC messages may configure a first PUCCH for transmissions via a first cell. The one or more RRC messages may configure a second PUCCH for transmissions via a second cell (and/or any quantity of PUCCHs for transmissions via a corresponding quantity of cells). The one or more RRC messages may indicate one or more first PUCCH resources on the first cell used for the first PUCCH. The one or more RRC messages may indicate one or more second PUCCH resources on the second cell used for the second PUCCH. The wireless device may receive DCI from a base station. The wireless device may select/determine the first PUCCH or the second PUCCH based on an RNTI of the DCI. The wireless device may select/determine the first PUCCH based on the RNTI of the DCI corresponding to one of first RNTIs. The wireless device may select/determine the second PUCCH based on the RNTI of the DCI corresponding to one of second RNTIs. The first RNTIs may comprise C-RNTI, SPS-C-RNTI, and/or RNTIs used for scheduling downlink and/or uplink operations. The second RNTIs may comprise an SL RNTI and/or a new RNTI used for SL DCI comprising resource assignment(s) for one or more sidelink cells. The wireless device may use the first cell to transmit, via the first PUCCH, one or more UCIs associated with downlink and/or uplink operations. The wireless device may use the second cell to transmit, via the second PUCCH, one or more UCIs associated with sidelink operations.

Figure 19:
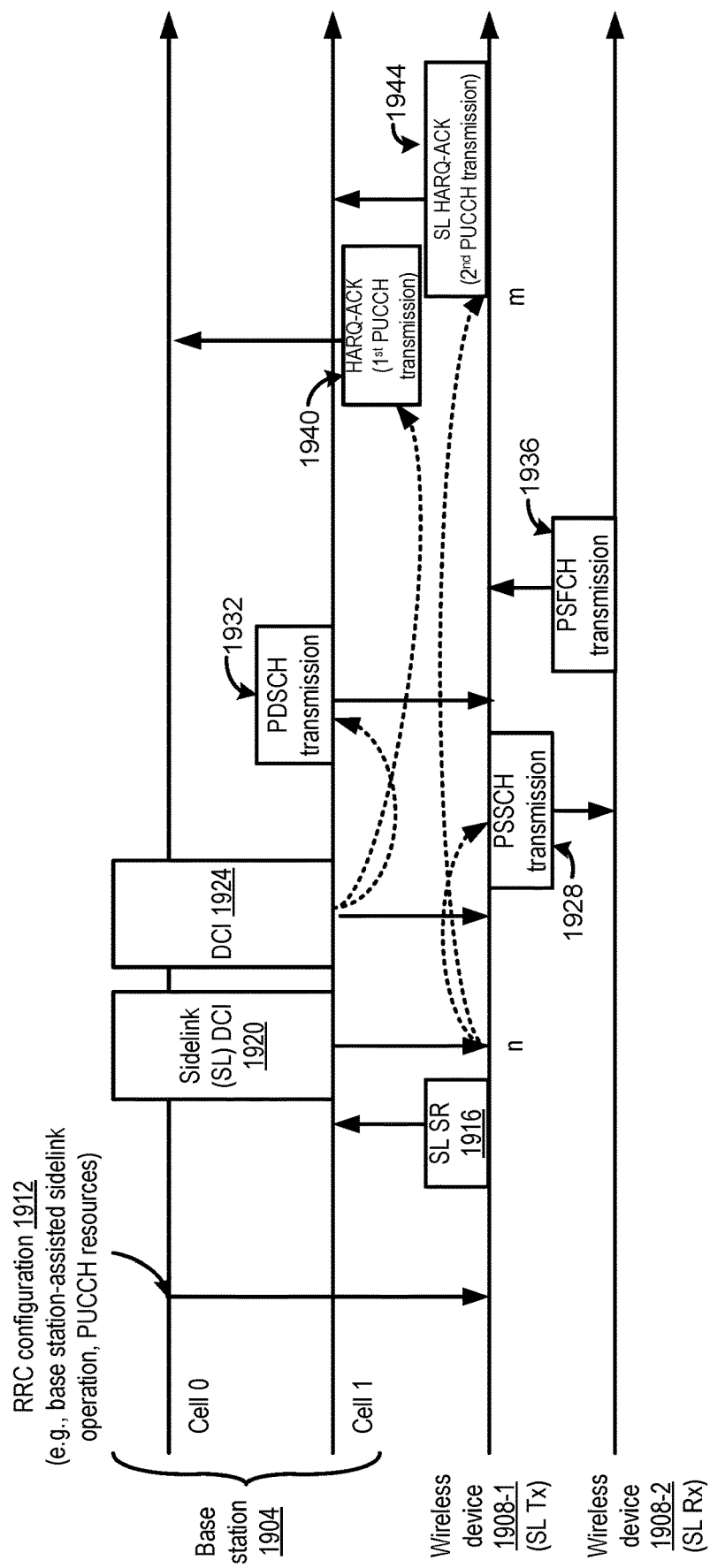
FIG. 19 shows an example communication comprising sidelink operation and uplink/downlink operation.

FIG. 19 shows example communications comprising sidelink operation and uplink/downlink operation. The example communication may be used for allocating resources for feedback messages (e.g., HARQ-ACKs) from a wireless device. A base station may configure separate cells and/or PUCCH resources for transmission of feedback messages for uplink/downlink communications and sidelink communications.

A base station 1904 may configure, for a first wireless device 1908-1, (e.g., via RRC configuration messages 1912) a base station-assisted (e.g., mode 1) operation for one or more sidelink cells. The first wireless device 1908-1 (e.g., SL Tx) may be configured (e.g., via the RRC configuration messages 1912) with a first cell (cell 0) and a second cell (cell 1). The base station 1904 may configure (e.g., via the RRC configuration messages 1912) one or more first PUCCH resources on/via the first cell for a first PUCCH transmission. The base station 1904 may configure (e.g., via the RRC configuration messages 1912) one or more second PUCCH resources on/via the second cell for a second PUCCH transmission. The one or more sidelink cells may comprise the second cell.

The first wireless device 1908-1 may send, to the base station 1904, an SL SR 1916 requesting resource assignment(s) for one or more sidelink transmissions, via the one or more sidelink cells, to the second wireless device 1908-2. The base station 1904 may send/transmit SL DCI 1920 comprising resource assignment(s) (e.g., resource assignment(s) for PSSCH transmission(s) 1928) for the one or more sidelink cells. The SL DCI 1920 may indicate a timing offset (e.g., or a timing information) that may be used, by the first wireless device 1908-1, to determine a time of a HARQ-ACK feedback (e.g., SL HARQ-ACK feedback 1944) corresponding to the resource assignment for the one or more sidelink cells. The SL DCI 1920 may indicate a resource assignment for the SL HARQ-ACK feedback 1944. The resource assignment for the SL HARQ-ACK feedback 1944 may comprise a second PUCCH resource among the one or more second PUCCH resources. The first wireless device 1908-1 may receive, from the base station 1904, the SL DCI 1920 indicating a first timing for resource(s) for the PSSCH transmission(s) 1928 and/or a second timing for an SL HARQ-ACK feedback 1944. The SL DCI 1920 may comprise a third timing which indicates a time for reception, at the first wireless device 1908-1, of a PSFCH transmission 1936 from a second wireless device 1908-2 (e.g., UE2, SL Rx).

The base station 1904 may send/transmit DCI 1924 comprising a resource assignment for a PDSCH transmission 1932 and a resource assignment for a HARQ-ACK feedback (e.g., HARQ-ACK 1940) for the PDSCH transmission 1932. The resource assignment for a HARQ-ACK 1940 may comprise a first PUCCH resource among the one or more first PUCCH resources. The resource assignment for a HARQ-ACK 1940 may comprise a timing offset between the PDSCH transmission 1932 and the HARQ-ACK 1940. The wireless device may send/transmit the first PUCCH transmission (e.g., the HARQ-ACK 1940) based on the timing offset indicated in the DCI 1924 and/or based on whether the PDSCH transmission 1932 was received. The first wireless device 1908-1 may send/transmit the first PUCCH transmission via the first cell (e.g., cell 0).

The first wireless device 1908-1 may send/transmit the second PUCCH transmission (the SL HARQ-ACK feedback 1944) to indicate whether the allocated sidelink transmission (s) (e.g., the PSSCH transmission(s) 1928) have been successful or unsuccessful. The first wireless device 1908-1 may determine whether the allocated sidelink transmission (s) (e.g., the PSSCH transmission(s) 1928) have been successfully received at the second wireless device 1908-2 based on the PSFCH transmission 1936 from the second wireless device 1936. The PSFCH transmission 1936 may comprise an ACK/NACK indication. The first wireless device 1908-1 may transmit the second PUCCH transmission (e.g., the SL HARQ-ACK feedback 1944) comprising one or more SL HARQ-ACK bits based on the second timing information (e.g., the resource assignment for the SL HARQ-ACK feedback 1944) indicated in the SL DCI 1924. The SL HARQ-ACK feedback 1944 may be based on (e.g., comprise) the ACK/NACK indication as received in the PSFCH transmission 1936. The first wireless device 1908-1 may transmit the second PUCCH transmission via the second cell (e.g., cell 1). The first wireless device 1908-1 may send/transmit the first PUCCH transmission and the second PUCCH transmission at a same time (or substantially the same time) based on a capability of the first wireless device 1908-1. For example, the first wireless device 1908-1 may support simultaneous transmission of the first PUCCH transmission via the first cell and the second PUCCH transmission via the second cell.

Transmission of first UCIs (e.g., UCIs for downlink/ uplink operation, HARQ-ACK) via a first PUCCH on a first cell and second UCIs (e.g., UCIs for sidelink operation, SL HARQ-ACK) via a second PUCCH on a second cell may allow consistent operation of downlink/uplink, for example, regardless of activation/deactivation of a wireless device-assisted sidelink operation. A quantity of SL HARQ-ACK bits and/or second UCIs may not be always known to a base station. Multiplexing the second UCIs for the sidelink operation in the first UCIs may lead an ambiguity in terms of a total bit size of the multiplexed UCIs (e.g., due to potentially contents of second UCI). The ambiguity may lead performance degradation of the system. Various examples described herein may allow efficient coexistence between mode 1 sidelink operation and downlink/uplink operation without increasing wireless device and base station complexity and without incurring performance degradation.

A wireless device may generate a first HARQ-ACK codebook corresponding to one or more HARQ-ACK bits for downlink operation (e.g., HARQ-ACK feedback for resources allocated for PDSCH transmissions). The wireless device may generate a second HARQ-ACK codebook corresponding to one or more HARQ-ACK bits for sidelink operation (e.g., SL HARQ-ACK feedback for resources allocated for PSSCH transmissions). A base station may configure a first PUCCH cell for sending/transmitting the first HARQ-ACK codebook via a PUCCH. The first PUCCH cell may be used for sending a PUCCH transmission comprising other UCIs for downlink/uplink operation (e.g., CSI feedback, SR transmissions, etc). The base station may configure a second PUCCH cell for sending/transmitting the second HARQ-ACK codebook. The second PUCCH cell may be used for sending/transmitting a PUCCH with other UCIs for sidelink operation (e.g., SL SR transmissions).

The wireless device may send/transmit a first PUCCH transmission (e.g., the first HARQ-ACK codebook) via the first cell, and a second PUCCH transmission (e.g., the second HARQ-ACK codebook) via the second cell at a same time (or substantially the same) time. The first PUCCH transmission and the second PUCCH transmission may overlap in time (e.g., partially or fully overlap in time). The wireless device may send/transmit the second PUCCH transmission via the second cell and a PUSCH transmission via the first cell at a same (or substantially the same) time. The wireless device may transmit, via the first cell, a first PUCCH transmission comprising UCIs (e.g., HARQ-ACK, CSI and/ or SR) for downlink/uplink communications. The wireless device may transmit, via the second cell, a second PUCCH comprising UCIs (e.g., SL HARQ-ACK and/or SL SR) for sidelink communications. The first cell may be different from the second cell. The first cell may be a primary cell of a cell group. The second cell may not be the primary cell of the cell group. The first cell and the second cell may belong to the cell group.

A wireless device may receive SL DCIs from a primary cell of a cell group (e.g., PCell of the first cell group, SPCell of the second cell group), for example, if the wireless device is activated with a base station-assisted operation (e.g., a mode 1 sidelink operation) for sidelink communication on the cell group. The wireless device may use the primary cell as a first PUCCH cell with or without additional configuration. The wireless device may receive one or more RRC messages indicating a second PUCCH cell which may be different from the primary cell. The wireless device may determine the first PUCCH cell or the second PUCCH cell to send/transmit a PUCCH transmission corresponding to DCI, for example, based on/in response to receiving the DCI via the primary cell of the cell group. The wireless device may select/determine the first PUCCH cell for the PUCCH transmission, for example, if the DCI is associated with one of first RNTIs used for scheduling downlink/uplink data. The wireless device may select/determine the second PUCCH cell for the PUCCH transmission, for example, if the DCI is associated with one of second RNTIs used for scheduling sidelink resources/data. A wireless device may send/transmit a PUCCH transmission via a non-primary cell (e.g., an SCell) for SL DCIs received via a primary cell. A wireless device may send/transmit a PUCCH transmission via a primary cell for SL DCIs received via a secondary cell.

A wireless device may be configured with a plurality of cell groups. A first cell group may operate using a first RAT (e.g., LTE, LTE-A, 5G, NR, or any other RAT). A second cell group may operate using second RAT (e.g., LTE, LTE-A, 5G, NR, or any other RAT). The wireless device may perform sidelink operations based on the second RAT. The wireless device may receive, via the first cell group (e.g., via a PCell), SL DCIs comprising assignments/configurations/activations of resources used/configured/scheduled for sidelink transmissions. The wireless device may or may not send/transmit SL HARQ-ACK feedback based on/in response to receiving SL DCIs (e.g., via the PCell) for the second RAT, for example, if the first RAT and the second RAT are different. The wireless device may send/transmit (e.g., if configured) SL HARQ-ACK feedback using the first RAT via the first cell group. A second PUCCH cell may be configured for the first cell group. The wireless device may send/transmit a PUCCH transmission comprising SL HARQ-ACK and/or SL SR via the second PUCCH cell. The second PUCCH cell may or may not be the PCell. The wireless device may send/transmit, via the PCell, a first PUCCH transmission comprising UCIs for downlink/uplink operations on the first cell group. The wireless device may send/transmit, via an SCell of the first cell group, the second PUCCH transmission comprising UCIs for sidelink operations for one or more sidelink cells (e.g., that use the second RAT).

The wireless device may receive one or more RRC messages. The base station may configure one or more parameters to support mode 1 operation for a sidelink cell and/or for a resource pool. The one or more parameters may comprise scheduling cell information. The scheduling cell information may indicate a cell via which the wireless device may receive SL DCIs (e.g., comprising resource assignments for the sidelink cell and/or the resource pool and/or a sidelink BWP). The one or more parameters may comprise PUCCH cell information. The PUCCH cell information may indicate a PUCCH cell via which wireless device may transmit SL SRs and/or other PUCCH transmissions (e.g., SL SR, SL HARQ-ACK, UCIs) for supporting sidelink operation for the sidelink cell and/or the resource pool. The one or more parameters may comprise one or more PUCCH resources and/or one or more search spaces for the sidelink cell and/or the resource pool. The wireless device may send, to the base station, wireless device capability information. The wireless device capability information may indicate whether the wireless device may support multiple PUCCH transmissions via multiple cells and/or PUCCH-PUSCH simultaneous transmission. The wireless device may use uplink carrier aggregation to send/transmit a PUSCH transmission and the second PUCCH transmission simultaneously. The wireless device may use a PUSCH for a HARQ-ACK feedback (e.g., instead of a PUCCH). For example, the second PUCCH transmission may be sent/transmitted via a PUSCH.

With reference to FIG. 19, the base station 1904 may configure the first cell (cell 0) and the second cell (cell 1) for the first wireless device 1908-1 (SL Tx). The first wireless device 1908-1 may send/transmit the SL SR 1916 for a sidelink mode 1 operation. The base station 1904 may configure the second cell as a scheduling cell for the sidelink mode 1 operation. The base station 1904 may send/transmit, to the first wireless device 1908-1, the SL DCI 1920 (e.g., at or after time n). The SL DCI 1916 may allocate one or more of resources for a PSSCH transmission (e.g., the PSSCH transmission 1928), resources for a PSFCH transmission from the second wireless device 1908-2 (UE2, SL Rx), and/or a first PUCCH resource for a SL HARQ-ACK feedback (e.g., the SL HARQ-ACK 1944). The SL DCI 1916 may indicate a time (e.g., time m) at which the SL HARQ_ACK 1944 may be sent/transmitted by the first wireless device 1908.

The base station 1904 may send/transmit, to the first wireless device 1908-1, the DCI 1924. The DCI 1924 may comprise a resource assignment for a PDSCH transmission (e.g., the PDSCH transmission 1932) and/or a second PUCCH resource for HARQ-ACK feedback (e.g., the HARQ-ACK 1940). The first PUCCH resource may at least partially overlap the second PUCCH resource in a time domain. The base station 1904 may configure the first cell as a PUCCH cell for a second PUCCH transmission (e.g., UCI feedback for downlink/uplink, the HARQ-ACK 1940) via the second PUCCH resource, and the second cell as a PUCCH cell for a first PUCCH transmission (e.g., UCI feedback for sidelink, the SL HARQ-ACK 1944) via the first PUCCH resource. The first cell and the second cell may be different. The first PUCCH resource and the second PUCCH resource may or may not overlap in a frequency domain.

The first wireless device 1908-1 may send/transmit the first PUCCH transmission and the second PUCCH transmission independently at similar/same (or substantially similar/same) slots/OFDM symbols, for example, based on non-overlapping frequency resources of the first PUCCH transmission and the second PUCCH transmission and/or non-overlapping uplink cells of the first PUCCH transmission and the second PUCCH transmission. The first wireless device 1908-1 may send/transmit the first PUCCH transmission and the second PUCCH transmission independently, for example, depending on wireless device capability (e.g., if the first wireless device 1908-1 supports multiple PUCCH transmissions).

The first wireless device 1908-1 may piggyback the first PUCCH transmission on a first PUSCH transmission via the second cell, for example, if the first wireless device 1908-1 is scheduled to send/transmit the first PUSCH transmission and send/transmit the first PUCCH transmission via the second cell at a same time (or substantially the same time). The same time may correspond to a same set of OFDM symbols or a same slot if scheduled resources for the first PUSCH transmission and the first PUCCH transmission overlap in time (e.g., partially or fully overlap). The wireless device may send/transmit one or more HARQ-ACK bits corresponding to one or more configured grant sidelink resources.

The wireless device (e.g., the first wireless device 1908-1) may send/transmit the one or more HARQ-ACK bits, for example, based on/in response to receiving ACK-NACK feedbacks (e.g., via PSFCH transmissions) from one or more receivers (e.g., other wireless devices) corresponding to sidelink operation. The wireless device may not send/transmit any HARQ-ACK feedback to the base station, for example, if the wireless device has not performed any sidelink transmissions. The base station may not be aware of sidelink transmissions utilizing the one or more sidelink configured grant resources. The base station may not be able to estimate/determine whether SL HARQ-ACK feedback for sidelink operation may be received, via the first PUSCH transmission, from the wireless device. The base station may assign a fixed size/quantity of HARQ-ACK bits that may be multiplexed with (e.g., piggyback on) a PUSCH transmission. Assigning a fixed size/quantity of HARQ-ACK bits may reduce ambiguity of the SL HARQ-ACK feedback multiplexed with (e.g., piggybacked on) the PUSCH transmission. The wireless device may assume/determine that the wireless device may need to send/transmit an SL HARQ-ACK corresponding to a sidelink configured grant resource (e.g., if configured to send the SL HARQ-ACK feedback) regardless of actual transmission of sidelink PSSCH transmissions via the sidelink configured grant resource. For example, the wireless device may send an ACK or discontinuous transmission (DTX) indication, in the SL HARQ-ACK, for an unused/skipped resource. A DTX indication may indicate that the wireless device does not have any HARQ feedback for a resource/TB (e.g., neither ACK nor NACK). The wireless device may drop transmission of the SL HARQ-ACK feedbacks corresponding to sidelink resources not used/skipped by the wireless device for sidelink transmission, for example, if the wireless device may send/transmit the SL HARQ-ACK feedbacks via a PUCCH resource (e.g., no piggybacking to or overlapping with a PUSCH transmission). For example, the wireless device may not transmit a HARQ-ACK feedback for an unused sidelink resource if the HARQ-ACK feedback may be scheduled via a PUCCH resource. The wireless device may send/transmit the SL HARQ-ACK UCI corresponding to sidelink resources not used/skipped by the wireless device for sidelink transmission, for example, if the wireless device may transmit the SL HARQ-ACK feedbacks by piggybacking on/multiplexing to a PUSCH transmission. Transmitting the SL HARQ-ACK UCI may reduce an ambiguity in a number of UCI bits, for sidelink transmissions, piggybacked on a PUSCH transmission.

The base station may transmit one or more RRC messages comprising/indicating configuration parameters. The configuration parameters may comprise/indicate configured grant resources (e.g., a configured grant resource configuration) for a sidelink transmission associated with one or more logical channels. The wireless device may or may not have available sidelink data for a sidelink transmission in each configured resource of the configured grant resources. The base station may not be aware of the sidelink transmission by the wireless device. Not transmitting an SL HARQ-ACK feedback for one or more configured grant resources not used for sidelink transmission may increase a complexity of the base station (e.g., the base station may have to determine whether the SL HARQ-ACK feedback has not been sent or has not been successfully received). A size of an SL HARQ-ACK feedback may increase, for example, if the wireless device aggregates a plurality of HARQ-ACK bits corresponding to sidelink resources scheduled by SL DCIs and/or sidelink resources configured via the configured grant resources. The wireless device may generate an SL HARQ-ACK bit (e.g., ACK or DTX) for a sidelink resource configured via the configured grant resources, regardless of whether the wireless device has sent a sidelink transmission via the sidelink resource or not. The wireless device may generate an ACK corresponding to the sidelink resource, for example, and the base station may not schedule retransmission resources based on the ACK. The wireless device may generate a discontinuous transmission (DTX) corresponding to a sidelink resource. The base station may determine that the sidelink resource has not been used based on the DTX. Generating SL HARQ-ACK feedback for resources not used for sidelink transmission may reduce complexity of the base station and may reduce ambiguity between the base station and the wireless device for a HARQ feedback procedure.

Mode 1 assistance by a base station may be performed on a TDD cell in which a limited set of uplink resources are available. One or more HARQ-ACK bits over one or more time units (e.g., multiple slots, multiple sub-slots, etc.) may be aggregated and sent/transmitted at a time. A required quantity of HARQ-ACK bits for an aggregated HARQ-ACK may be determined based on potential errors in receiving SL DCIs, monitoring occasions where SL DCIs may be scheduled, and/or resources (e.g., possible quantity of PSSCHs) based on a resource pool configuration.

A wireless device may send/transmit a first PUCCH transmission via a first cell. The first PUCCH transmission may comprise UCI (e.g., HARQ ACK, SR, CSI, and/or the like). The wireless device may send/transmit a second PUCCH transmission via a second cell. The second PUCCH transmission may comprise sidelink related UCI (e.g., SL HARQ ACK, SL SR, and/or the like). A wireless device capability may determine whether the wireless device may support simultaneous transmission of the first PUCCH transmission and the second PUCCH transmission. The wireless device capability for supporting the simultaneous transmission may be a capability that may be separate/different from a wireless device capability for supporting PUCCH SCell for downlink/uplink operation. The wireless device may report (e.g., to the base station) a set of bands and/or band combinations in/via which the wireless device may support simultaneous transmission of both the first PUCCH transmission and the second PUCCH transmission, for example, if the wireless device may support a mode 1 (base station-assisted operation). The second cell may not be configured as a PUCCH cell for a third cell that may be used for downlink/uplink only (e.g., no monitoring of SL DCIs via the third cell and/or no transmission of sidelink channels on the third cell). The wireless device may send/transmit, via the first cell, one or more HARQ-ACK, CSI, and/or SR for downlink/uplink operations for one or more cells. The wireless device may send/transmit via the second cell, one or more of SL HARQ-ACK and/or SL SR messages for one or more sidelink cells.

The wireless device may not expect to receive a command to deactivate the second cell, for example, if the mode 1 operation is activated and/or HARQ-ACK transmission is activated. A wireless device may send/transmit, via a first cell, a first PUCCH transmission comprising SL SR. The wireless device may send/transmit, via a second cell, a second PUCCH transmission comprising SL HARQ-ACK. The wireless device may be activated (e.g., dynamically, via RRC signaling and/or via MAC CEs/DCIs) for sending/transmitting SL HARQ-ACK to a base station. The wireless device may send/transmit SL SRs, for example, if transmission of SL HARQ-ACK is disabled. The wireless device may use the first cell for sending/transmitting the SL SRs. The wireless device may assume/determine (e.g., regardless of HARQ-ACK activation) that the second cell may be used for a PUCCH transmission comprising UCI related to sidelink operation.

A base station may not activate an uplink cell/carrier of a second cell. A wireless device may operate a sidelink in a same frequency region of the uplink cell/carrier of the second cell. The wireless device may not send/transmit any PUSCH transmissions via the uplink cell/carrier of the second cell. The base station may configure spatial filter information (e.g., via DCI, MAC CEs, and/or RRC signaling) of a PUCCH, for example, if the base station may configure the second cell as a PUCCH cell for sidelink operation. The base station may configure one or more parameters for determining spatial filters (e.g., including one or more SRS resource set configurations). The wireless device may perform SRS transmissions via the second cell regardless of an activated uplink cell. The wireless device may expect/determine that a PUCCH cell for a sidelink operation may be activated.

The wireless device may perform one or more operations, for example, if a wireless device receives a deactivation command on a PUCCH cell for sidelink UCI transmission. The wireless may deactivate mode 1 operation, for example, if the wireless device receives the deactivation command. The wireless device may deactivate HARQ-ACK transmission, and use a PCell or an SPCell for sending/transmitting SL SRs, for example, if the wireless device receives the deactivation command. The wireless device may ignore the deactivation command, for example, if the wireless device receives the deactivation command. The wireless device may perform one or more of the above operations, for example, based on an expiration of a timer (e.g., sCellInactivityTimer).

A base station may schedule a first uplink channel (e.g., comprising UCIs) for downlink/uplink operations that may not overlap with a second uplink channel (e.g., comprising UCI) for sidelink operations. The base station may configure a first set of SR configurations for downlink/uplink operations. The base station may configure a second set of SR configurations for SL SRs. The first set of SR configurations and the second set of SR configurations may not overlap in a time domain. The base station may configure/schedule (e.g., at least for a wireless device that may not support simultaneous transmission via the first uplink channel and the second uplink channel over one or more cells) the first set of SR configurations and the second set of SR configurations in a way that avoids collision (e.g., in a time domain) between the first uplink channel and the second uplink channel. The first uplink channel may be a PUCCH or a PUSCH piggybacked with UCIs. The second uplink channel may be a PUCCH (e.g., comprising SL HARQ-ACK feedback and/or an SL SR)

The base station may attempt to avoid the collisions between the first uplink channel and a first sidelink channel. The first sidelink channel may be a PSSCH, a PSCCH, or a PSFCH. The wireless device (e.g., a transmitter wireless device) may monitor the PSFCH to receive a PSFCH transmission from a receiver wireless device. The wireless device may or may not send/transmit via a first uplink channel on a first cell and a second sidelink channel on a second sidelink cell, for example, if a first timing of a first transmission via the first uplink channel is not aligned with a second timing of a second transmission via the second sidelink channel. The base station may not activate a sidelink operation on the second cell, for example, if the base station and/or the wireless device does not support simultaneous (e.g., or substantially simultaneous) transmission on the first cell and the second sidelink cell. A conflict between a sidelink channel and the first uplink channel may be supported by a wireless device capability (e.g., supporting simultaneous uplink transmissions and sidelink transmissions/receptions) for PSFCH transmissions from a receiver wireless device. The wireless device capability may be sent/transmitted/indicated to the base station for a set of bands and/or band combinations.

A wireless device may or may not support simultaneous PUCCH transmission and PUSCH transmission, for example, if the wireless device may send/transmit the PUCCH transmission via a first cell and the PUSCH transmission via a second cell. The PUCCH transmission may correspond to UCI of SL HARQ-ACK. The wireless device may or may not support simultaneous PUCCH transmission and PSSCH transmission, for example, if the wireless device may send/transmit the PUCCH transmission via the first cell and PSSCH transmission via a second cell. The wireless device may select a channel (e.g., among a PUCCH and a PSSCH, or among a PUCCH and a PUSCH), for example, based on one or more rules, and the wireless device may drop a scheduled/configured transmission(s) via non-selected channel(s). A PUCCH transmission, comprising one or more SL HARQ-ACKs (e.g., SL HARQ-ACK feedbacks), may have a higher priority over a PUSCH transmission, for example, if the one or more SL HARQ-ACKs comprise a NACK (e.g., which may trigger scheduling of one or more resources for PSSCH transmissions). The PUCCH transmission may have a higher priority over the PUSCH transmission, for example, if the one or more SL HARQ-ACKs comprise a NACK corresponding to a HARQ process indicator/ID that has a high priority, or a NACK corresponding to a resource pool for which the HARQ process ID has a high priority (e.g., higher than or equal to a threshold). The PUCCH transmission may have a higher priority over the PUSCH transmission, for example, if the one or more SL HARQ-ACKs comprise a NACK corresponding to a resource pool that is configured with a high priority (e.g., higher than or equal to a second threshold). The wireless device may otherwise drop SL HARQ-ACKs (e.g., the PUCCH transmission).

A wireless device may be configured with a first uplink channel for a PUSCH transmission. The PUSCH transmission may comprise HARQ-ACK feedback messages via UCI piggybacking procedure that combines a PUCCH and PUSCH. The wireless device may use a second uplink channel for a PUCCH transmission. The PUCCH transmission may comprise SL HARQ-ACK feedbacks. The wireless device may prioritize the first uplink channel comprising HARQ-ACK feedback for downlink/uplink operation over the second uplink channel comprising SL HARQ-ACK feedback, for example, if the first uplink channel collides (overlaps) with the second uplink channel. The wireless device may prioritize HARQ-ACK feedback for downlink/uplink operation over SL HARQ-ACK feedback for sidelink operation, for example, if the first uplink channel collides (overlaps) with the second uplink channel. The wireless device may prioritize a first PUCCH transmission with HARQ-ACK feedback for downlink/uplink over a second PUCCH transmission with SL HARQ-ACK feedback for sidelink, for example, if the first PUCCH transmission collides with a second PUCCH transmission.

A first PUCCH transmission and a second PUCCH transmission may collide. The second PUCCH transmission may comprise SL HARQ-ACK. The wireless device may drop the second PUCCH transmission, for example, if the first PUCCH transmission comprises HARQ-ACK UCI (e.g., for downlink transmissions). The wireless device may drop the first PUCCH transmission, for example, if the first PUCCH transmission is for CSI feedback. The network may schedule one or more resources for sidelink retransmissions, for example, if the wireless device drops the second PUCCH transmission (e.g., due to a conflict). The wireless device may transmit ACK feedback, for example, if the retransmission is not necessary allowing allocated resources to be released.

A wireless device may not expect/determine a conflict between a first uplink channel comprising HARQ-ACK feedback for downlink/uplink communications and a second uplink channel comprising SL HARQ-ACK feedback for sidelink communications, for example, based on scheduling by a base station. Based on (e.g., in response to) receiving a conflict, the wireless device may assume/determine that one or more DCI messages indicating the conflict may not be valid and/or may ignore the one or more DCI messages.

Figure 20:
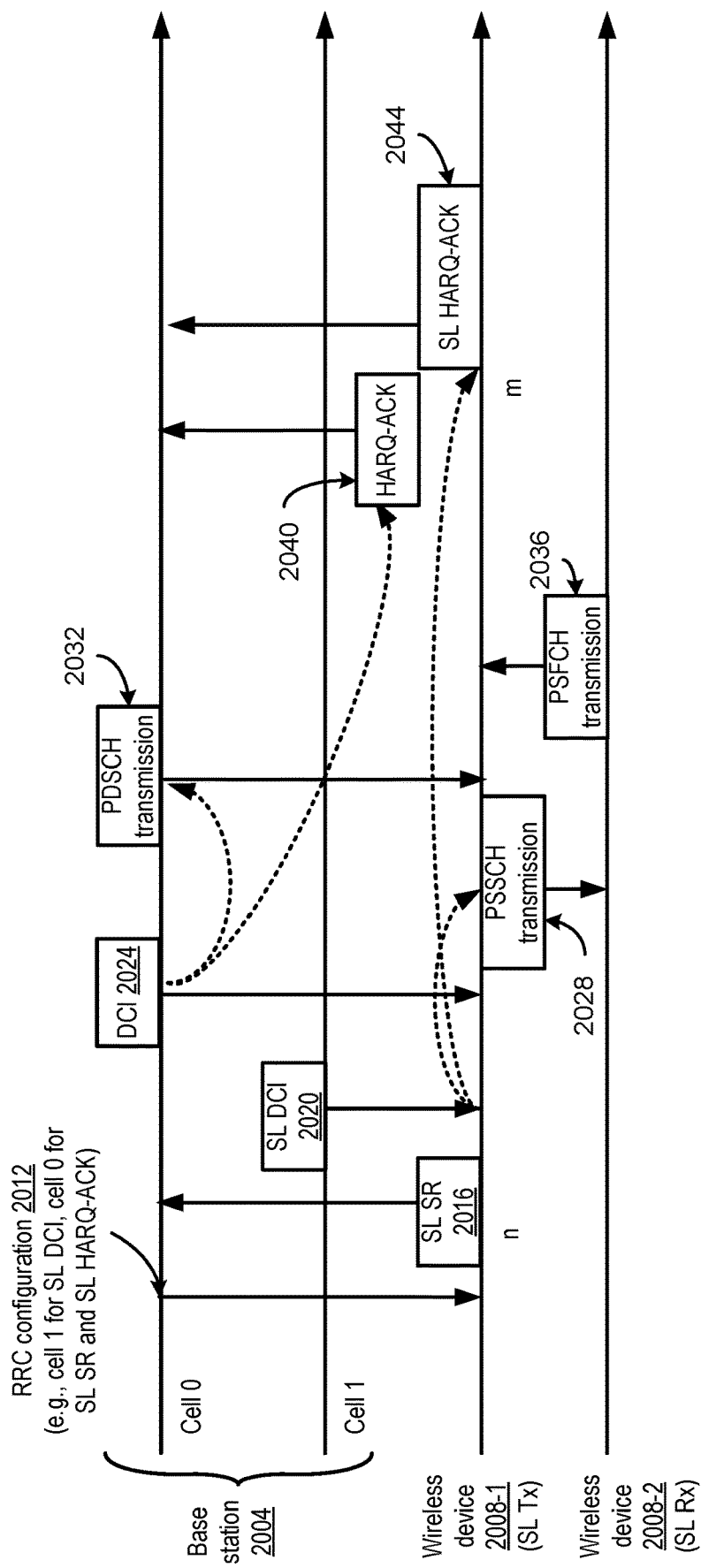
FIG. 20 shows an example communication comprising sidelink operation and uplink/downlink operation.

FIG. 20 shows example communication comprising sidelink operation and uplink/downlink operation. A base station may configure non-overlapping resources (e.g., time resources) for transmission of feedback messages (e.g., HARQ-ACK transmissions) for uplink/downlink communications and sidelink communications. For example, a base station 2004 may configure (e.g., via RRC configuration messages 2012) a first cell (cell 0) for sending/transmitting HARQ-ACK, SL HARQ-ACK, SR, and/or SL SR. The base station 2004 may configure (e.g., via RRC configuration messages 2012) a second cell (cell 1) for sending/transmitting SL DCI. Various operations described with reference to FIG. 20 may be similar to FIG. 19 except, for example, that a wireless device may send a first PUCCH transmission (comprising HARQ-ACK for downlink/uplink) and a second PUCCH transmission (comprising SL HARQ-ACK for sidelink) via the first cell at non-overlapping times. The base station 1904 may configure and/or indicate a first resource of the first PUCCH transmission and a second resource of the second PUCCH transmission that do not overlap in a time domain. An SL SR 2016, SL DCI 2020, DCI 2024, a PSSCH transmission 2028, a PDSCH transmission 2032, a PSFCH transmission 2036, a HARQ-ACK 2040, and/or an SL HARQ-ACK 2044 may be similar (or substantially similar) to the SL SR 1916, the SL DCI 1920, the DCI 1924, the PSSCH transmission 1928, the PDSCH transmission 1932, the PSFCH transmission 1936, the HARQ-ACK 1940, and/or the SL HARQ-ACK 1944 as described with reference to FIG. 19. The base station 2004, a first wireless device 2008-1, and/or a second wireless device 2008-2 may perform one or more operations described with reference to the base station 1904, the first wireless device 1908-1, and/or the second wireless device 1908-2 as described with reference to FIG. 19.

A base station (e.g., the base station 2004) may configure a first set of PUCCH resources for a first PUCCH transmission from a first wireless device (e.g., a first wireless device 2008-1). The base station may configure a second set of PUCCH resources for a second PUCCH transmission from the first wireless device. The first wireless device may send/transmit the first PUCCH transmission comprising one or more UCIs for downlink/uplink (e.g., CSI, SR, HARQ-ACK). The first wireless device may send/transmit the second PUCCH transmission comprising one or more UCIs for sidelink (e.g., SL SR, SL HARQ-ACK). The base station may configure the first set of PUCCH resources that are not overlapped with the second set of PUCCH resources in a time domain. The base station may configure an offset (e.g., a time offset), from the first set of PUCCH resources, for a first OFDM symbol corresponding to the second set of PUCCH resources. The first set of PUCCH resources may occur in one or more last OFDM symbols of a slot. The second set of PUCCH resources may occur in one or more OFDM symbols following/after the offset from the slot.

A base station may configure one or more PUCCH resources and/or one or more PUCCH resource sets to be shared on a cell (e.g., PCell, PUCCH SSCell, SPCell) between uplink/downlink operation and sidelink operation. A wireless device may send/transmit either a first PUCCH transmission or a second PUCCH transmission at a given time. The first PUCCH transmission may comprise one or more UCIs for downlink and/or uplink operation. The second PUCCH transmission may comprise one or more UCIs for sidelink operation. The base station may configure a first set of time durations (e.g., a set of slots, a set of OFDM symbols in a slot or a set of OFDM symbols over one or more slots, etc.) in which the wireless device may prioritize transmission of the second PUCCH transmission, for example, if the first PUCCH transmission and the second PUCCH transmission may collide. The base station may configure the first set of time durations using RRC configuration messages. The wireless device may transmit the second PUCCH transmission via the cell and a PUSCH transmission via a second cell based on a wireless device capability.

The wireless device may prioritize the second PUCCH transmission over the PUSCH transmission in the first set of time durations. The wireless device may prioritize the second PUCCH transmission over the PUSCH transmission in the first set of time durations, for example, if the wireless device does not support simultaneous transmission via a PUCCH and a PUSCH. The wireless device may prioritize one or more uplink transmissions (e.g., the first PUCCH transmission, the PUSCH transmission, an SRS transmission, etc.) in other time durations (e.g., not belonging to the first set of time durations). The first set of time durations may be activated for a certain priority of a sidelink resource pool, a sidelink cell, a sidelink operation, and/or a logical channel (LCH) of a sidelink resource pool. The base station may configure a threshold of the priority along with the first set of time durations. The wireless device may determine a highest priority associated with UCI in the second PUCCH transmission (e.g., based on priorities of corresponding PSSCH transmissions being acknowledged/feedbacked via the second PUCCH transmission, a priority of UCI such as an SR, an LCH triggering an SL SR, and/or the like), for example, if the first PUCCH transmission and the second PUCCH transmission collide. The wireless device may prioritize the second PUCCH transmission in the first set of time durations, for example, based on the highest priority being larger than or equal to the configured threshold of the priority. The wireless device may not prioritize the second PUCCH on the first set of time durations in other cases. For example, the wireless device may drop the second PUCCH transmission.

The wireless device may send/transmit the UCI in the second PUCCH transmission in a next opportunity to send/transmit a PUCCH transmission for sidelink operation. The wireless device may drop the UCI content on the second PUCCH transmission. The wireless device may prioritize an SL SR over a HARQ-ACK, for example, if the second PUCCH transmission comprises the SL SR and the first PUCCH transmission comprises HARQ-ACK for downlink in the first set of time durations. The wireless device may drop the first PUCCH transmission based on prioritizing the SL SR. The wireless device may prioritize SL HARQ-ACK over HARQ-ACK for downlink operation in the first set of time durations, for example, if the SL HARQ-ACK comprises HARQ-ACK information of a sidelink operation with a high priority (e.g., larger than or equal to a threshold). The wireless device may prioritize SL HARQ-ACK over CSI in the first set of time durations. The wireless device may prioritize SL SR over CSI/SRS (e.g., at any time). The first set of time durations may refer to every slot if the first set of time durations is not configured by the base station. A wireless device may (e.g., similarly) prioritize the second PUCCH transmission, for example, if a conflict occurs between the second PUCCH transmission and the PUSCH transmission and if the wireless device does not support simultaneous transmission of the second PUCCH transmission and the PUSCH transmission.

A base station may configure a first set of time durations and a priority threshold to be used/applied for the first set of time durations. The first set of time durations may refer to every slot. The base station may configure a priority threshold used for a slot. First uplink signal via a first uplink channel may comprise UCI (e.g., one or more UCI messages) for downlink/uplink operation and second uplink signal via a second uplink channel may comprise UCI for sidelink operation. A wireless device may select a channel among the first uplink channel and the second uplink channel based on the first set of time durations and the priority threshold. A wireless device may select a channel among the first uplink channel and the second uplink channel based on and the priority threshold. The first uplink channel may be a PUCCH or a UCI-piggybacked PUSCH. The second uplink channel may be a PUCCH or a UCI-piggybacked PUSCH. The first uplink channel and the second uplink channel may collide at a time duration T. The wireless device may select/determine the first uplink channel over the second uplink channel, for example, if T is not within the first set of time durations. The wireless device may select/determine the first uplink channel over the second uplink channel, for example, if a priority of the second uplink channel or a priority of the second uplink signal is lower than the priority threshold. The wireless device may send/transmit (e.g., the UCI for downlink/uplink operation) via the first uplink channel and may drop a transmission (e.g., the UCI for sidelink operation) via the second uplink channel based on selecting the first uplink channel.

The wireless device may determine a priority value of UCI for sidelink operation sent via the second uplink channel, for example, if T is within the first set of time durations. The wireless device may select/determine the second uplink channel, for example, if the priority value of the UCI for sidelink operation is greater than or equal to the priority threshold. The wireless device may send/transmit the second uplink signal (e.g., the UCI for sidelink operation) via the second uplink channel and drop the first uplink signal (e.g., the UCI for downlink/uplink operation) via the first uplink channel, for example, if the priority value of the UCI for sidelink operation is greater than or equal to the priority threshold (e.g., priority of the UCI for sidelink operation is greater than or equal to the priority threshold). The wireless device may send/transmit the first uplink signal (e.g., the UCI for downlink/uplink operation) via the first uplink channel and drop the second uplink signal (e.g., the UCI for sidelink operation) via the second uplink channel, for example, if the priority value of the UCI for sidelink operation is lower than the priority threshold (e.g., priority of the UCI for sidelink operation is lower than the priority threshold). The priority value of UCI for sidelink operation may be determined based on a highest priority among priorities of PSSCH transmissions acknowledged by the UCI for sidelink operation. A highest priority of corresponding PSSCHs or sidelink resources may determine the priority value if the UCI for sidelink operation comprise one or more HARQ-ACK bits. A highest priority of LCH triggering one or more SRs may determine the priority value of the UCI, for example, if the UCI comprise one or more SR bits.

A wireless device may determine a timing for sending/transmitting a PUCCH transmission (e.g., comprising SL HARQ-ACK), for example, based on a time offset indicated in SL DCI and a set of first time durations. The time offset indicated by the SL DCI may correspond to a k-th occasion, of the set of first time durations, from a time of reception of the SL DCI. The wireless device may determine a time of transmission of an SL HARQ-ACK as k-th occasion since SL DCI is received (e.g., k*N slots since the reception of the SL DCI, assuming the SL DCI is received at $1^{st}$ slot), for example, if the set of first time durations comprise one slot in every N slots starting from $1^{st}$ slot of a frame and the SL DCI indicates a timing offset of K. N may be any quantity (e.g., N=2, 3, 5, 10, and/or the like). The base station may aggregate one or more SL HARQ-ACK bits to a set of resources using the timing offset based on the set of first time durations. Using the timing offset may allow better TDM by the base station between first resources used for UCI of downlink/uplink operation and second resources used for UCI of sidelink operation.

Figure 21:
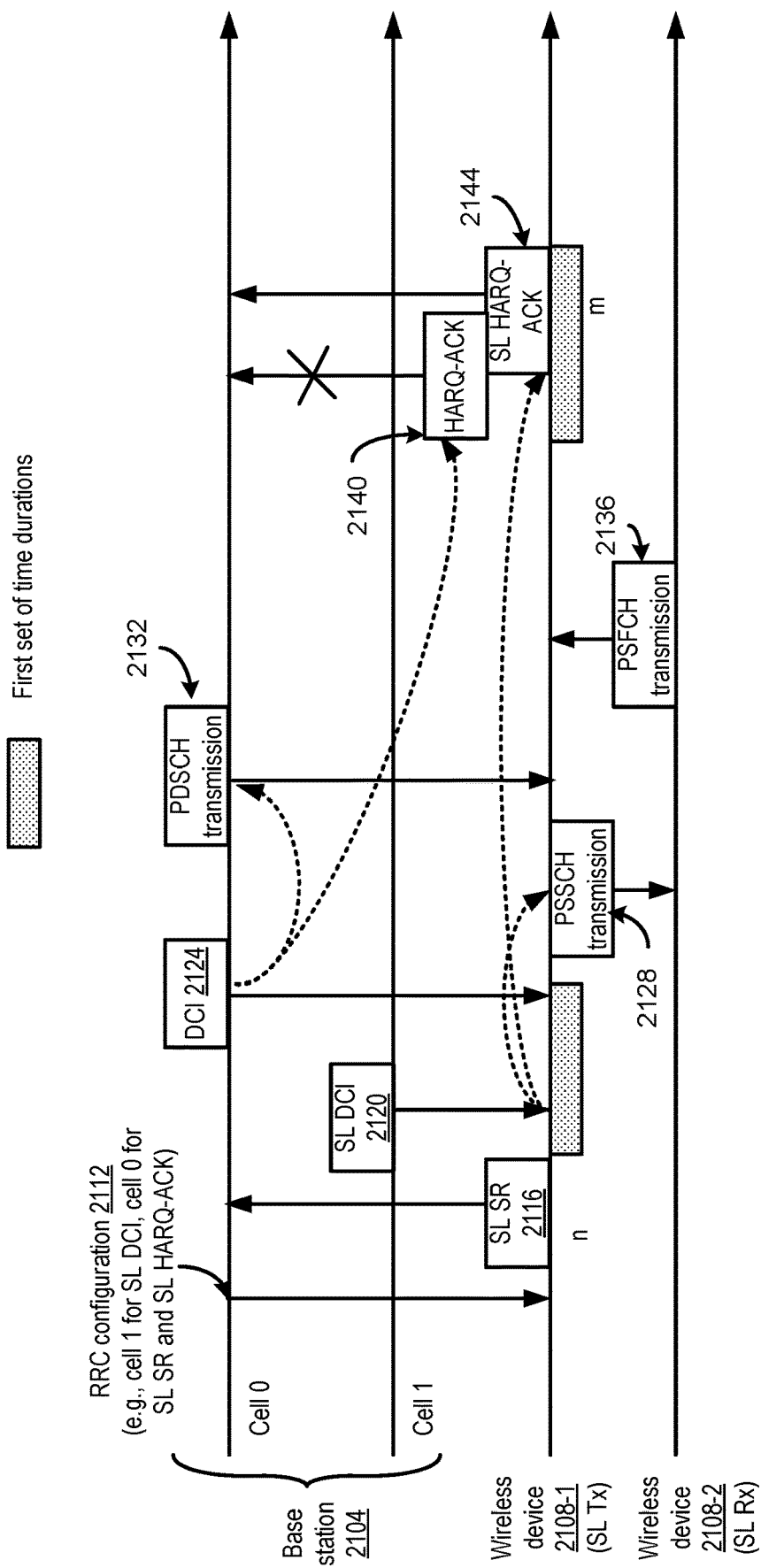
FIG. 21 shows example communication comprising sidelink operation and uplink/downlink operation.

FIG. 21 shows example communication for sidelink operation and uplink/downlink operation. A wireless device (e.g., wireless device 2108-1) may prioritize SL HARQ-ACK over HARQ-ACK (e.g., corresponding to downlink transmissions) based on an overlap between PUCCHs corresponding to the SL HARQ-ACK and the HARQ-ACK. Downlink/uplink UCI transmissions and sidelink UCI transmissions may be time division multiplexed (TDM-ed). A base station 2104 may configure (e.g., via RRC configuration messages 2112) a first cell (cell 0) for sending/transmitting HARQ-ACK, SL HARQ-ACK, SR and/or SL SR, and a second cell (cell 1) for sending/transmitting SL DCI. An SL SR 2116, SL DCI 2120, DCI 2124, a PSSCH transmission 2128, a PDSCH transmission 2132, a PSFCH transmission 2136, a HARQ-ACK 2140, and/or an SL HARQ-ACK 2144 may be similar (or substantially similar) to the SL SR 2016, the SL DCI 2020, the DCI 2024, the PSSCH transmission 2028, the PDSCH transmission 2032, the PSFCH transmission 2036, the HARQ 2040, and/or the SL HARQ-ACK 2044 as described with reference to FIG. 20. The base station 2104, a first wireless device 2108-1, and/or a second wireless device 2108-2 may perform one or more operations described with reference to the base station 2004, the first wireless device 2008-1, and/or the second wireless device 2008-2 as described with reference to FIG. 20. Various operations described with reference to FIG. 21 may be similar to those described above with reference to FIG. 20 except that a first PUCCH transmission (e.g., HARQ-ACK 2040) and a second PUCCH transmission (e.g., SL HARQ-ACK 2044) may collide.

The first wireless device 2108-1 may drop a first PUCCH transmission (comprising HARQ-ACK 2140 for downlink/uplink operation) and send/transmit a second PUCCH transmission (comprising SL HARQ-ACK 2144 for sidelink operation) via the first cell at a time m. The first wireless device 2108-1 may drop the first PUCCH transmission and send/transmit the second PUCCH transmission via the first cell at time m, for example, if the first PUCCH transmission and the second PUCCH transmission may collide at time m. The first wireless device 2108-1 may drop the first PUCCH transmission and send/transmit the second PUCCH transmission at the time m, for example, if a first PUCCH resource for the first PUCCH transmission overlaps a second PUCCH resource for the second PUCCH transmission at the time m. The wireless device may prioritize the second PUCCH transmission (e.g., the SL HARQ-ACK 2144), for example, if the time m overlaps with a first set of time durations. The wireless device may drop the first PUCCH transmission (e.g., HARQ-ACK 2140) overlapping with the SL HARQ-ACK transmission.

A wireless device may be scheduled with a first PUSCH on a first cell. The wireless device may be scheduled with a second PUCCH on a second cell. A first PUSCH may be used for sending/transmitting uplink data. The second PUCCH may be used for sending/transmitting SL HARQ-ACK feedbacks corresponding to sidelink resources of one or more sidelink cells. The first PUSCH and the second PUCCH may overlap (e.g., partially or fully) in time domain (e.g., in a slot). The wireless device may not piggyback UCI of the second PUCCH on the first PUSCH, for example, regardless of a wireless device capability for supporting simultaneous transmissions via a PUCCH and a PUSCH. The wireless device may send/transmit via the first PUSCH and the second PUCCH simultaneously, for example, if the wireless device supports simultaneous transmissions via a PUCCH and a PUSCH. The wireless device may perform UCI piggybacking on the PUSCH even if the wireless device supports simultaneous transmissions via a PUSCH and a PUCCH), for example, if the wireless device has a conflict between a PUCCH comprising UCI for downlink/uplink operation and a PUSCH (e.g., if the PUSCH and the PUCCH overlap).

A wireless device may have a first wireless device capability supporting simultaneous PUSCH transmission and a first PUCCH transmission (e.g., comprising UCIs for downlink/uplink). The wireless device may have a second wireless device capability supporting simultaneous PUSCH transmission and a second PUCCH transmission (e.g., comprising UCIs for sidelink). The first wireless device capability may determine/define whether the wireless device may perform UCI piggybacking on a PUSCH, for example, if a collision between the PUSCH transmission and the first PUCCH transmission occurs. The second wireless device capability may determine/define whether the wireless device may perform simultaneous transmission (e.g., of the PUSCH transmission and the second PUCCH transmission) or select one or fewer than all scheduled/configured transmissions (e.g., of the PUSCH transmission and the second PUCCH transmission), for example, if a collision between the PUSCH transmission and the second PUCCH transmission occurs.

Figure 22:
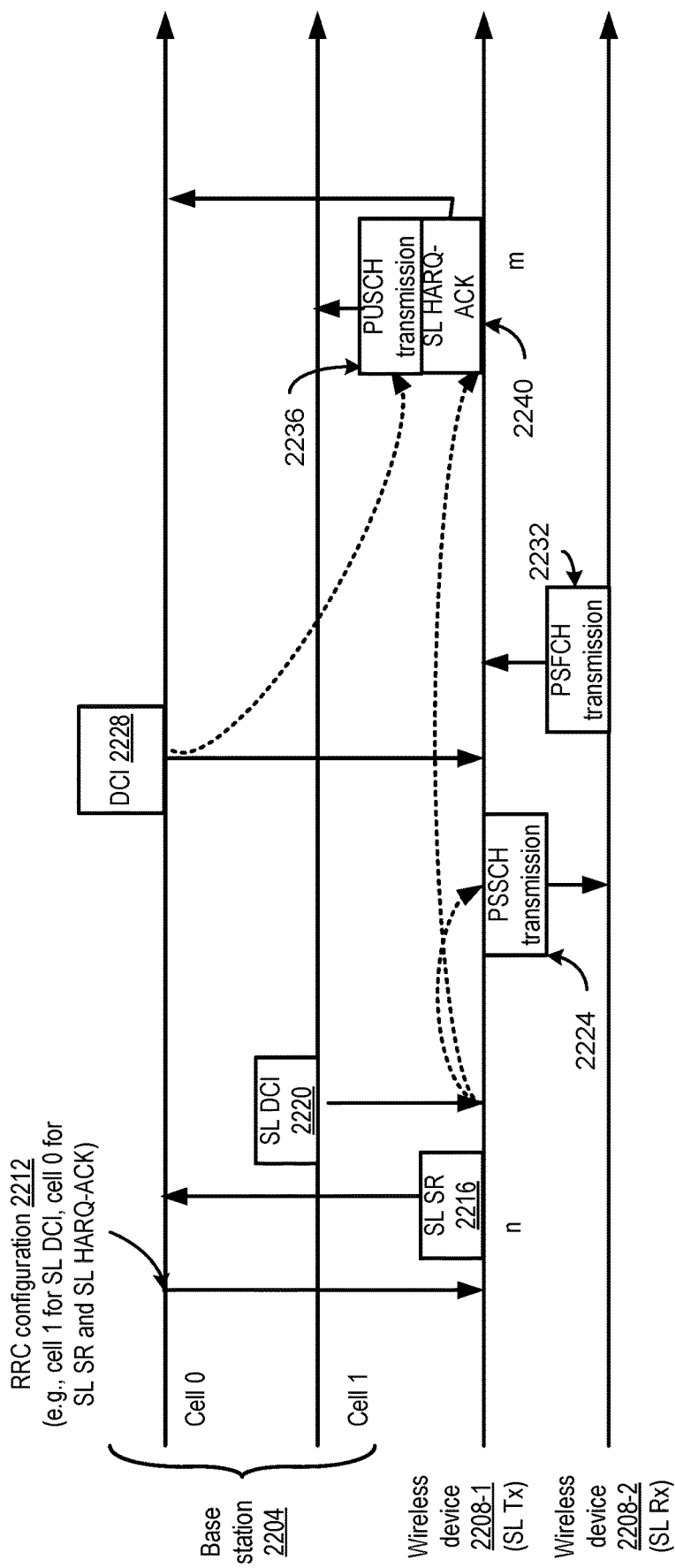
FIG. 22 shows an example of simultaneous physical uplink scheduled channel (PUSCH) transmission and physical uplink control channel (PUCCH) transmission.

FIG. 22 shows an example of a simultaneous PUSCH transmission and a PUCCH transmission. The PUCCH transmission may comprise UCI for sidelink operation. A wireless device may simultaneously perform a PUSCH transmission and a PUCCH transmission, for example, if the PUSCH transmission and the PUCCH transmission are via different cells. A base station 2204 may configure (e.g., via RRC configuration messages 2222) a first cell (cell 0) for sending/transmitting SL HARQ-ACK and SL SR, and a second cell (cell 1) for sending/transmitting SL DCI. An SL SR 2216, SL DCI 2220, a PSSCH transmission 2224, and/or a PSFCH transmission 2232, may be similar (or substantially similar) to the SL SR 2016, the SL DCI 2020, the PSSCH transmission 2028, and/or the PSFCH transmission 2036, respectively, as described with reference to FIG. 20. The base station 2204, a first wireless device 2208-1, and/or a second wireless device 2208-2 may perform one or more operations described with reference to the base station, the first wireless device, and/or the second wireless device as described with reference to FIGS. 19-21.

The first wireless device 2208-1 may receive first DCI (e.g., the SL DCI 2220) indicating a PUCCH transmission (e.g., UCIs for sidelink, such as an SL HARQ-ACK 2240) via a PUCCH (e.g., at or after time m). The first wireless device 2208-1 may receive second DCI 2228 (e.g., an uplink grant) indicating a PUSCH transmission 2236 (e.g., at or after time m) via a PUSCH. The first wireless device 2208-1 may send/transmit the PUSCH transmission 2236 and the PUCCH transmission (e.g., an SL HARQ-ACK 2240) simultaneously (e.g., at or after time m). The PUSCH transmission 2236 may be sent/transmitted via a second cell (cell 1). The PUCCH transmission (e.g., the SL HARQ-ACK 2240) may be sent/transmitted via a first cell (cell 0).

A wireless device may perform UCI piggybacking on a PUSCH, for example, regardless of a purpose of UCI. The wireless device may perform UCI piggybacking for UCIs corresponding to downlink/uplink operations only, sidelink operations only, and/or both downlink/uplink and sidelink operations. The wireless device may support simultaneous transmission of a first PUCCH transmission via a first cell and a second PUSCH transmission via a second cell. The first PUCCH transmission may comprise UCI for sidelink operation. The first cell and the second cell may be different. The wireless device may support the simultaneous transmission, via a plurality of cells, of the first PUCCH transmission (e.g., comprising SL UCIs) and the second PUSCH. The wireless device may or may not be able to perform the first PUCCH transmission and the second PUSCH transmission simultaneously (e.g., or substantially simultaneously), for example, if the first PUCCH transmission and the second PUSCH transmission are scheduled on a same cell. The wireless device may piggyback the SL UCIs (corresponding to the first PUCCH transmission) on the second PUSCH transmission, for example, if the wireless device is not able to perform the first PUCCH transmission and the second PUSCH transmission simultaneously.

SL UCI piggybacking on a PUSCH transmission may be used, for example, if a wireless device is scheduled with a first PUCCH transmission (e.g., comprising the SL UCIs) on a first cell and scheduled with a second PUSCH transmission on a second cell. A wireless device may be scheduled with a first PUCCH transmission (e.g., comprising SL UCI) via a first cell. The wireless device may be scheduled with a second PUSCH transmission via a second cell. The first PUCCH transmission and the second PUSCH transmission may overlap in time (e.g., partially or fully in a time domain). The first cell and the second cell may be different or the same. The wireless device may be scheduled with a third PUSCH transmission via a third cell wherein the third PUSCH transmission may overlap with the first PUCCH transmission partially or fully in a time domain. The wireless device may determine/select/identify a PUSCH transmission to perform a piggybacking operation, for example, if the wireless device is scheduled with a plurality of PUSCH transmissions, over/via a plurality of cells, that overlap with the first PUCCH transmission. The wireless device may determine/select a PUSCH transmission among one or more overlapping PUSCH transmissions with an earliest starting OFDM symbol/slot index. The wireless device may determine/select the second PUSCH transmission for the piggybacking, for example, if the second PUSCH transmission starts at an OFDM symbol k and the third PUSCH transmission starts at an OFDM symbol k+N (e.g., N=1, 2, etc.).

The wireless device may determine/select, for SL UCI piggybacking, a PUSCH transmission with an earliest scheduling timing. A scheduling timing of a PUSCH transmission may be determined based on a corresponding uplink grant scheduling the PUSCH transmission. A fixed timing (e.g., K2, a minimum processing time between an uplink grant and a PUSCH transmission) may be assumed/determined, for example, for a PUSCH transmission based on a configured grant. The wireless device may select a PUSCH transmission scheduled at the earliest timing. The wireless device may select a PUSCH transmission that is to a cell with a lowest cell index among cells among the one or more overlapping PUSCHs transmissions. The wireless device may select/determine a PUSCH transmission based on an uplink grant (if any). The wireless device may use/apply a cell indicator/index for selecting a PUSCH transmission, for example, if there are multiple PUSCH transmissions based on uplink grants. The wireless device may select/determine a configured grant PUSCH transmission based on a cell index, for example, if there is no uplink grant-based PUSCH transmission among the one or more overlapping PUSCH transmissions.

The wireless device may perform piggybacking procedure, for example, based on the selecting/identifying/determining a target PUSCH transmission for the piggybacking. The wireless device may determine a quantity of resource elements (REs) used for the piggybacked SL UCIs. The base station may configure a beta-offset used for determining the quantity of REs for the piggybacking. The wireless device may determine positions of the REs and may place the SL UCIs at the selected positions across a target PUSCH.

Figure 23:
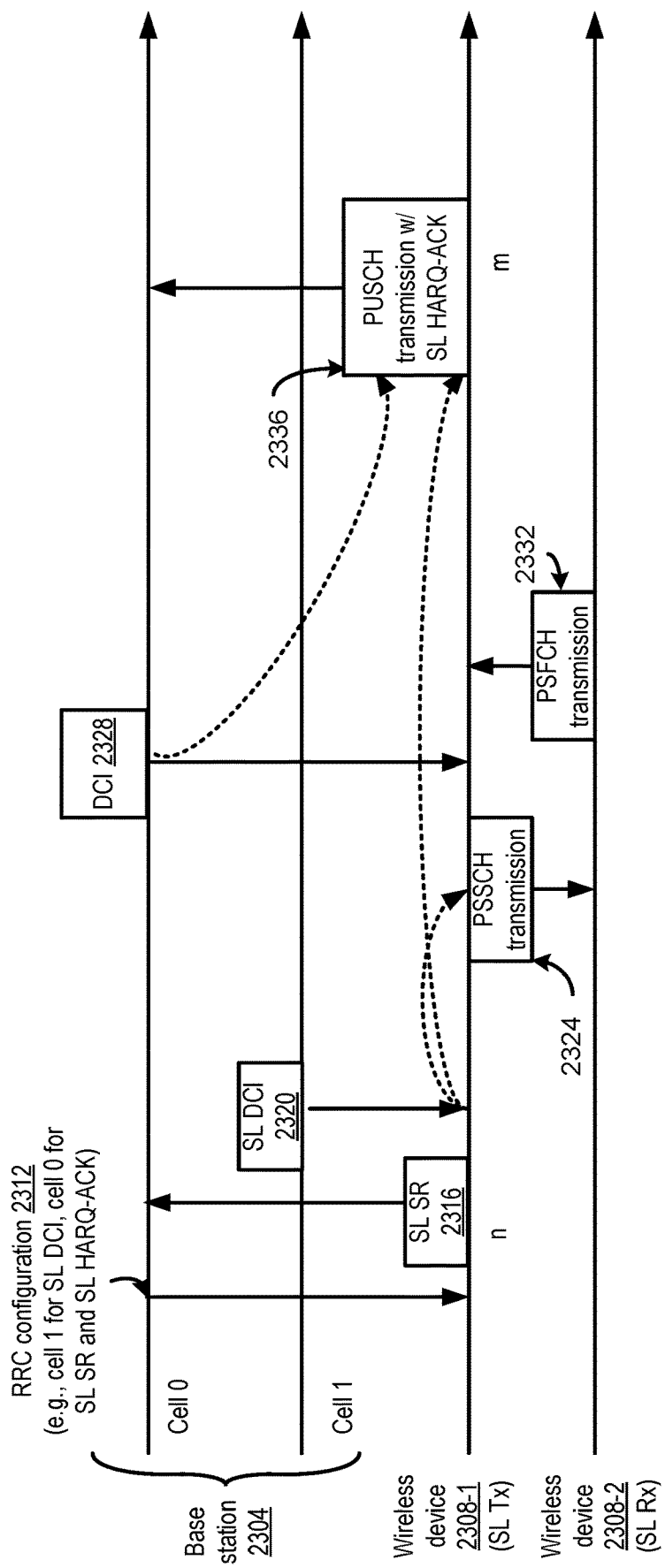
FIG. 23 shows an example PUSCH transmission with piggybacked sidelink information.

FIG. 23 shows an example PUSCH transmission with piggybacked sidelink information. The piggybacked sidelink information may comprise SL UCI (e.g., SL HARQ-ACK). A wireless device may piggyback the SL UCIs on a PUSCH transmission, for example, if the PUSCH transmission and a PUCCH transmission (comprising the SL UCIs) are scheduled on a same cell or on different cells. A base station 2304 may configure (e.g., via RRC configuration messages 2312) a first cell (cell 0) for sending/transmitting SL HARQ-ACK and SL SR, and a second cell (cell 1) for sending/transmitting SL DCI. An SL SR 2316, SL DCI 2320, a PSSCH transmission 2324, and/or a PSFCH transmission 2332, may be similar (or substantially similar) to the SL SR 2216, the SL DCI 2220, the PSSCH transmission 2228, and/or the PSFCH transmission 2236, respectively, as described with reference to FIG. 22. The base station 2204, a first wireless device 2208-1, and/or a second wireless device 2208-2 may perform one or more operations described with reference to the base station, the first wireless device, and/or the second wireless device as described with reference to FIGS. 19-21.

The first wireless device 2308-1 may receive first DCI (e.g., the SL DCI 2320) indicating a PUCCH transmission (e.g., UCIs for sidelink, such as an SL HARQ-ACK) via a PUCCH (e.g., at or after time m). The first wireless device 2308-1 may receive second DCI 2328 (e.g., an uplink grant) indicating a PUSCH transmission 2336 (e.g., at or after time m) via a PUSCH. The first wireless device 2308-1 may not be able to send/transmit the PUCCH transmission and the PUSCH transmission 2336 simultaneously (e.g., the PUCCH transmission and the PUSCH transmission 2336 may be scheduled on the same cell). The first wireless device 2308-1 may piggyback the UCIs for sidelink on the PUSCH transmission 2336 and send/transmit the piggybacked PUSCH transmission 2336 (e.g., at or after time m).

A first wireless device may receive SL DCI comprising a plurality of resource assignments for a plurality of PSSCH transmissions. Multiple transmission opportunities for PSSCH transmissions may allow improved reliability of a sidelink data transmission and/or allow flexible scheduling by the first wireless device. The first wireless device may be able to select/determine one or more resources from the plurality of resource assignments for PSSCH transmission (s). The first wireless device may determine a HARQ-ACK resource (e.g., a timing offset and/or frequency information of a PUCCH transmission comprising SL HARQ-ACK) based on a last resource assignment scheduled by the SL DCI, for example, based on receiving the plurality of resource assignments.

Figure 24:
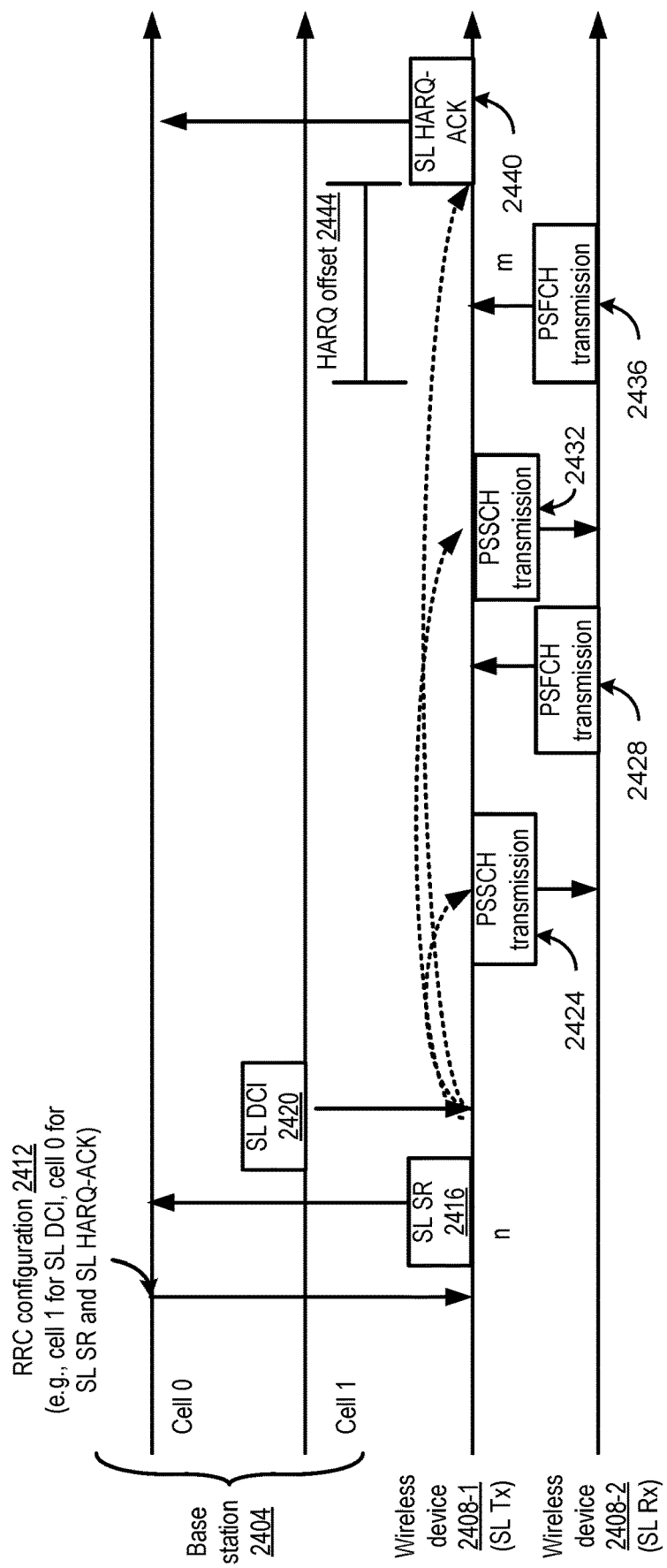
FIG. 24 shows example communication for sidelink operations.

FIG. 24 shows example communication for sidelink operations. A wireless device (e.g., first wireless device 2408-1) may use a HARQ offset (e.g., a PSFCH-to-HARQ_feedback_timing_indicator, timing offset) to determine HARQ-ACK resources for transmission of an SL HARQ-ACK corresponding to one or more PSSCH transmissions. A base station 2404 may send RRC configuration messages 2412 to the first wireless device 2408-1. The RRC configuration messages 2412 may be similar or substantially similar to the RRC configuration messages as described with reference to FIGS. 19-22. The first wireless device 2408-1 (e.g., SL Tx) may send/transmit (e.g., at or after time n) an SL SR 2416 indicating arrival of new sidelink data. The first wireless device 2408-1 may receive SL DCI 2420 indicating at least two resources, such as a first resource for a first PSSCH transmission 2424 and a second resource for a second PSSCH transmission 2432. The SL DCI 2420 may indicate resources for a first PSFCH transmission 2428 and a second PSFCH transmission 2436 from a second wireless device 2408-2 (e.g., SL Rx). The first PSFCH transmission 2428 and the second PSFCH transmission 2436 may comprise ACK/NACK indications corresponding to the first PSSCH transmission 2424 and the second PSSCH transmission 2432, respectively. The SL DCI 2420 may indicate a HARQ-ACK resource (for transmission of an SL HARQ-ACK 2440). The HARQ-ACK resource may be indicated by a timing offset (e.g., HARQ offset 2444). The first wireless device 2408-1 may determine the HARQ-ACK resource based on the timing offset. The first wireless device 2408-1 may determine a time of transmission of the SL HARQ-ACK 2440 by applying the timing offset starting from a last PSSCH resource (e.g., the second resource for the second PSSCH transmission 2432) indicated by the SL DCI 2420. The first wireless device 2408-1 may determine a time of transmission of the SL HARQ-ACK 2440 by applying the timing offset starting from a last PSFCH resource (e.g., a resource for the second PSFCH transmission 2436). The first wireless device 2408-1 may send/transmit the SL HARQ-ACK 2440 corresponding to a plurality of PSSCH resources (e.g., the first resource and the second resource) or corresponding to a plurality of PSFCH resources (e.g., a first resource for the first PSFCH transmission 2428 and a second resource for the second PSFCH transmission 2436) regardless of actual PSSCH transmissions via the plurality of PSSCHs resources or regardless of actual PSFCH transmissions via the plurality of PSFCHs resources.

The first wireless device 2408-1 may stop transmission of the second PSSCH transmission 2432, for example, based on (e.g., in response to) receiving an ACK from the second wireless device 2408-2 in the PSFCH transmission 2428. The first wireless device 2408-1 may release the second resource for the second PSSCH transmission 2432 and stop utilizing the second resource, for example, if the second wireless device 2408-2 successfully receives a sidelink TB (e.g., the first PSSCH transmission 2424). The first wireless device 2408-1 may send/transmit the SL HARQ-ACK 2440 corresponding to the plurality of allocated resources, for example, following/after a last occasion of PSSCH and/or a last occasion of PSFCH, for example, regardless of actual transmission of one or more PSSCH transmissions via a plurality of allocated resources. The base station 2404 and/or the first wireless device 2408-1 may perform uplink/downlink operations as described with reference to the base station and the first wireless device in FIGS. 19-23.

Sending/transmitting an SL HARQ-ACK feedback message corresponding to a plurality of PSSCH resources may lead inefficient resource utilization, for example, if a quantity of allocated PSSCH resources is not small (e.g., larger than K, K=3, or any other quantity). A base station may configure one or more HARQ-ACK resources corresponding to one or more PSSCH resources allocated via SL DCI. A wireless device may send a single HARQ-ACK bit corresponding to one or more sidelink transmissions of transport block(s). Using a single bit HARQ-ACK bit for multiple sidelink transmissions may reduce of uplink resource usage for SL HARQ-ACK feedbacks and mitigate unnecessary rescheduling by the base station (e.g., based on a NACK feedback corresponding to an intermediate sidelink transmission).

Figure 25:
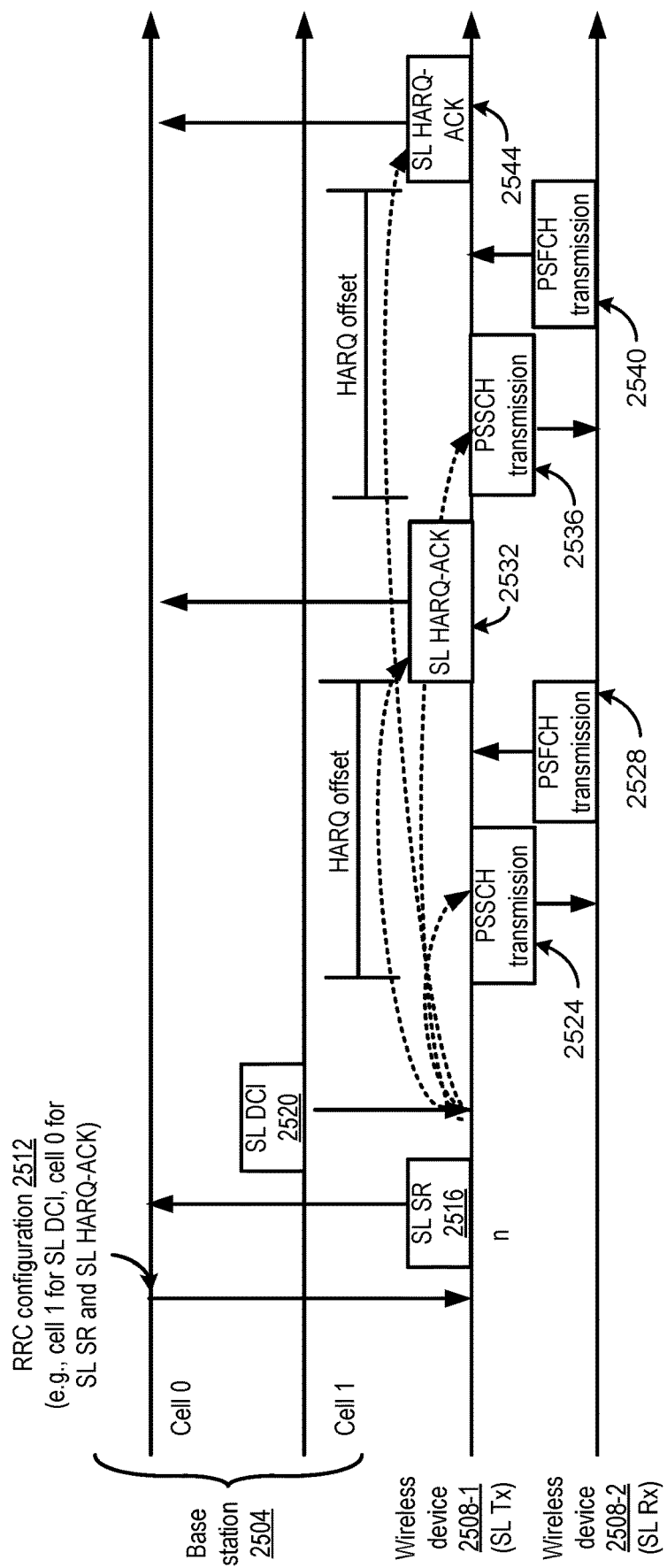
FIG. 25 shows example communication for sidelink operation.

FIG. 25 shows example communication for sidelink operation. A wireless device may use HARQ offset(s) to determine HARQ-ACK resources for transmission of SL HARQ-ACK(s) corresponding to one or more PSSCH transmissions. Various operations corresponding to FIG. 25 may be similar to operations described above with reference to FIG. 24, for example, except that a first wireless device 2508-1 may be assigned a plurality of HARQ-ACK resources (e.g., corresponding to a plurality of PSSCH resources indicated in SL DCI). RRC configuration messages 2512, an SL SR 2516, SL DCI 2520, a first PSSCH transmission 2524, a first PSFCH transmission 2528, a second PSSCH transmission 2536, and a second PSFCH transmission 2544 may be similar, or substantially similar to the RRC configuration messages 2412, the SL SR 2416, the SL DCI 2420, the first PSSCH transmission 2424, the first PSFCH transmission 2428, the second PSSCH transmission 2432, and/or the second PSFCH transmission 2436, respectively, as described with reference to FIG. 24. The base station 2504 and/or the first wireless device 2508-1 may perform uplink/downlink operations as described with reference to the base station and/or the first wireless device in FIGS. 19-23.

The base station 2504 may configure a single HARQ-ACK resource (e.g., PUCCH resource, HARQ resource, SL HARQ-ACK resource) for a plurality of PSSCH transmissions/occasions (e.g., as described with reference to FIG. 24) or may configure a plurality of HARQ-ACK resources for the plurality of PSSCH transmissions/occasions. Configured HARQ-ACK resource(s) may be for transmission of SL HARQ-ACK(s). The first wireless device 2508-1 may determine one or more HARQ timing offsets based on the SL DCI 2520, for example, if a plurality of HARQ-ACK resources are configured for a plurality of PSSCH transmissions/occasions. The SL DCI 2520 may indicate a single HARQ timing offset value. The first wireless device 2508-1 may apply the single HARQ timing offset for each PSSCH transmission/occasion (or each PSFCH transmission/occasion). The first wireless device 2508 may apply the HARQ timing offset to determine a HARQ-ACK resource in a time domain. The HARQ-ACK resource may follow a corresponding PSSCH occasion, separated in time by the HARQ timing offset. For example, a start of the HARQ-ACK resource may be HARQ timing offset after a start of the corresponding PSSCH occasion. The first wireless device 2508-1 may apply, to each PSSCH occasion of multiple PSSCH occasions, the HARQ offset to determine corresponding HARQ-ACK resources. For example, a HARQ-ACK resource for the SL HARQ-ACK 2532 may correspond to the PSSCH transmission 2524 and a HARQ-ACK resource for the SL HARQ-ACK transmission 2544 may correspond to the PSSCH transmission 2536.

Configuring a corresponding HARQ-ACK resource for each PSSCH occasion may allow an early HARQ-ACK feedback for one or more PSSCH/PSFCH resources. The early HARQ-ACK feedback may allow the base station 2504 to terminate or release one or more allocated resources. The first wireless device 2508-1 may send an ACK as a feedback to the base station at a first HARQ-ACK resource (e.g., via an SL HARQ-ACK 2532), for example, if the second wireless device 2508-1 (UE2, SL Rx) indicates an ACK in the first PSFCH transmission 2428. The base station 2504 may release a second PSSCH (corresponding to the second PSSCH transmission 2536) and/or a second PSFCH resource/occasion (corresponding to the second PSFCH transmission 2540) and may use the resources for other wireless devices.

A base station may configure a set of SL HARQ-ACK resources in a time domain. The base station may configure a bitmap of a plurality of slots with a period and a periodicity. A wireless device may be allowed to send/transmit a PUCCH transmission comprising one or more SL HARQ-ACK feedbacks in one of the set of SL HARQ-ACK resources. The wireless device may apply a HARQ offset indicated in SL DCI for determining the set of SL HARQ-ACK resources. A HARQ offset of 0 may indicate a next SL HARQ-ACK resource since receiving the SL DCI. Using a HARQ offset of 0 may allow better multiplexing between first SL HARQ-ACK resources for SL HARQ-ACK feedbacks and second HARQ-ACK resources for HARQ-ACK feedbacks for downlink/uplink. The wireless device may utilize the set of SL HARQ-ACK resources for transmitting an SL SR. The base station may additionally configure a bitmap of slots (with a period and a periodicity) to configure SL HARQ-ACK resources in time domain in addition to one or more PUCCH resources/resource sets for resources in a frequency domain.

A wireless device may aggregate one or more SL HARQ-ACK feedback bits in a PUCCH transmission and/or a PUSCH transmission. The wireless device may receive first SL DCI scheduling one or more resource assignments for first PSSCH transmissions for a first sidelink session (e.g., a unicast transmission to a second wireless device, a groupcast transmission, a broadcast transmission). The wireless device may receive second SL DCI scheduling one or more resource assignments for second PSSCH transmissions for a second sidelink session (e.g., a unicast transmission to a third wireless device, a groupcast transmission, a broadcast transmission). The first SL DCI and the second SL DCI may indicate a same SL HARQ-ACK resource corresponding to the first PSSCH transmissions and the second PSSCH transmissions. The wireless device may aggregate a first SL HARQ-ACK feedback for the first PSSCH transmissions and a second SL HARQ-ACK feedback for the second PSSCH transmissions on the same SL HARQ-ACK resource.

A wireless device may send/transmit HARQ-ACK feedback for one or more PSSCH transmissions based on a configured grant resource configuration. A base station may configure a wireless device to send HARQ-ACK feedback corresponding to the one or more PSSCH transmissions. The base station may configure HARQ-ACK resources for the one or more PSSCH transmissions on the configured grant resource configuration. A HARQ timing offset may be configured on the configured grant resource configuration, where the HARQ timing offset may be applied for each PSSCH transmission of the one or more PSSCH transmissions or for a last PSSCH transmission of the one or more PSSCH transmissions. The wireless device may determine a time of transmission of the HARQ-ACK feedback for the one or more PSSCH transmissions based on the HARQ timing offset configuration. The wireless device may transmit one or more TBs via one or more PSSCHs. A quantity of the one or more PSSCH transmissions may be determined based on a repetition/retransmission number/quantity configured/indicated for the one or more TBs. The repetition/retransmission number may be determined based on a configuration on a resource pool. The repetition/retransmission number may be determined based on SL DCI activating a configured grant resource configuration. The repetition/retransmission number and/or a quantity of PSSCH transmissions configured by dynamic SL DCI may be indicated in the dynamic SL DCI, for example, for a PSSCH resource allocated by the dynamic SL DCI.

Figure 26:
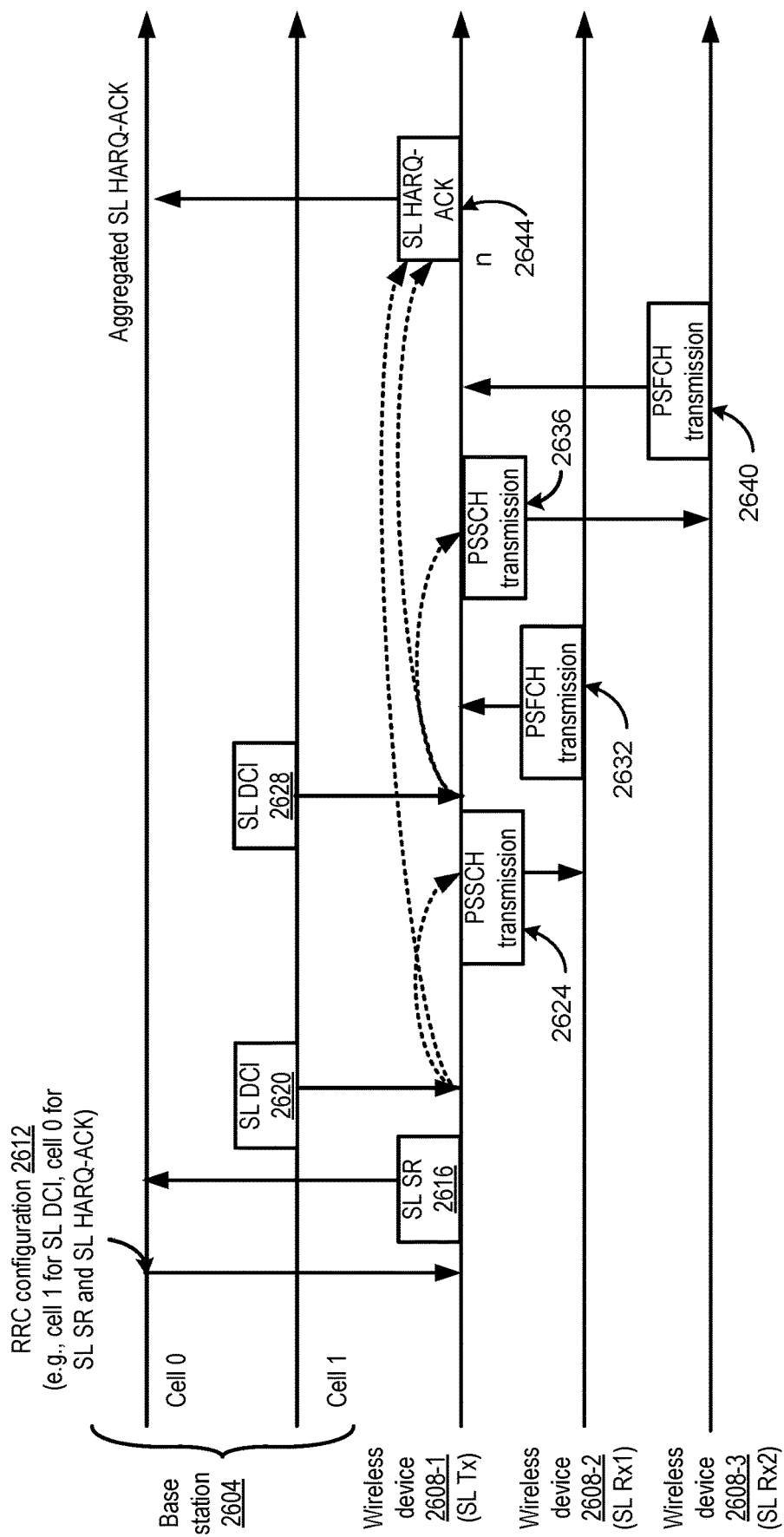
FIG. 26 shows example communication for sidelink operation comprising aggregated acknowledgment feedback.

FIG. 26 shows an example communication for sidelink operation comprising aggregated acknowledgment (e.g., SL HARQ-ACK) feedback. A wireless device may aggregate SL HARQ-ACK feedback bits for transmission in a single uplink transmission (e.g., PUCCH transmission or PUSCH transmission). Various operations described with reference to FIG. 26 may be a similar to operations described with reference to FIG. 25, for example, except that a first wireless device (SL Tx) may receive first SL DCI scheduling a first PSSCH transmission to a second wireless device (SL Rx)

and may receive second SL DCI scheduling a second PSSCH transmission to a third wireless device (UE3, SL Rx2).

A base station 2604 may configure a first cell (cell 0) and a second cell (cell 1). The base station 2604 may configure a first wireless device 2608-1 to send/transmit a PUCCH transmission comprising SL HARQ-ACK feedbacks and/or SL SR via the first cell. The base station 2604 may configure the first cell for monitoring SL DCIs for one or more sidelink cells. RRC configuration messages 2612 and SL SR 2620 may be similar (or substantially similar) to the RRC configuration messages and the SL SR as described with reference to FIGS. 24 and 25.

A first wireless device 2608-1 may receive first SL DCI 2620 comprising a resource assignment for a first PSSCH transmission 2624. The first SL DCI 2620 may indicate a resource assignment for a first PSFCH transmission 2632. The first wireless device 2608-1 may receive second SL DCI 2628 indicating a resource assignment for a second PSSCH transmission 2636. The second SL DCI 2628 may indicate resource assignment for a second PSFCH transmission 2640. The first SL DCI 2620 and the second DL SCI 2628 may indicate a same SL HARQ-ACK resource. For example, a first HARQ offset indicated by the first SL DCI may be larger than a second HARQ offset in the second SL DCI. The first SL DCI and the second DL SCI may refer to a same slot (e.g., using a slot indicator/index). The first SL DCI 2620 and the second SL DCI 2628 may indicate a same SL HARQ-ACK time resource indicator/index, and/or the like. The first wireless device 2644 may send/transmit an aggregated SL HARQ-ACK feedback (e.g., SL HARQ-ACK 2644) comprising a first SL HARQ-ACK feedback for the first PSSCH transmission 2624 and a second SL HARQ-ACK feedback for the second PSSCH transmission 2636. In various examples, the first PSSCH transmission 2624 and the second PSSCH transmission 2636 may be to a same wireless device, and the first PSFCH transmission 2632 and the second PSFCH transmission 2640 may be from the same wireless device.

The first SL DCI 2620 and the second SL DCI 2628 may indicate a same SL HARQ-ACK resource (e.g., SL HARQ-ACK resource at a time n). The first wireless device 2608-1 may send/transmit the first PSSCH transmission 2624 to the second wireless device 2608-2, and/or may receive the first PSFCH transmission 2632. The first PSFCH transmission 2632 may comprise an ACK/NACK indication indicating whether the first PSSCH transmission 2624 was successfully received at the second wireless device 2608-2. The first wireless device 2608-1 may send/transmit the second PSSCH transmission 2636 to the third wireless device 2608-3 and may receive the second PSFCH transmission 2640. The second PSFCH transmission 2640 may comprise an ACK/NACK indication indicating whether the second PSSCH transmission 2636 was successfully received at the third wireless device 2608-3. The first wireless device 2608-1 may send (e.g., at or after time n) a PUCCH transmission comprising a first SL HARQ-ACK feedback corresponding to the first PSSCH transmission 2624 and/or a second SL HARQ-ACK feedback corresponding to the second PSSCH transmission 2636. The second wireless device 2608-2 and the third wireless device 2608-3 may (or may not) be a same wireless device. The base station 2604 and/or the first wireless device 2608-1 may perform uplink/downlink operations as described with reference to the base station and/or the first wireless device in FIGS. 19-23.

A wireless device may receive one or more RRC messages. The one or more RRC messages may indicate one or more PUCCH resource sets. A PUCCH resource set may be associated with one or more PUCCH formats. The PUCCH resource set may comprise one or more PUCCH resources. The wireless device may be configured a quantity of UCI bits for the PUCCH resource set. The quantity of UCI bits may determine a maximum (or a largest) bit size of the UCI that may be sent via a PUCCH resource of the PUCCH resource set. The quantity of UCI bits may be configured as a range (e.g., between a first quantity and a second quantity). The range may indicate a smallest UCI bit size and a largest UCI bit size that may be sent via a PUCCH resource of the PUCCH resource set. The quantity of UCI bits may be configured as an exact quantity of UCI bits that may be sent via a PUCCH resource of the PUCCH resource set.

A wireless device may be configured with a PUCCH resource set for supporting SL HARQ-ACK feedback and/or SL SR transmission. The PUCCH resource set may be configured independently from one or more PUCCH resource sets for UCIs for downlink/uplink operation. The PUCCH resource set may comprise one or more PUCCH resources. SL DCI scheduling resource(s) for one or more PSSCH transmissions may indicate a PUCCH resource index/indicator. The PUCCH resource index may indicate a PUCCH resource among the one or more PUCCH resources of the PUCCH resource set. A base station may configure, for each PUCCH resource, a PUCCH format used on the each PUCCH resource and/or a quantity of UCI bits that may be sent via the PUCCH resource. The base station may indicate, via the PUCCH resource index, a PUCCH format (e.g., a small sized PUCCH format, such as PUCCH format 0, 1, 2; or a large sized PUCCH format, such as PUCCH format 3, or 4) and a quantity of UCI bits that may be sent via the PUCCH resource. The quantity of UCI bits may correspond a largest (or a maximum) UCI bit size that may be sent via a PUCCH resource or may correspond to an exact UCI bit size that may be sent via the PUCCH resource. A quantity of UCI bits may be configured for a PUCCH resource set (e.g., instead of separately for each PUCCH resource). A common PUCCH format may be used for one or more PUCCH resources of the PUCCH resource set for SL UCI transmission.

A base station may not always utilize a feedback (e.g., an SL HARQ-ACK feedback) corresponding to sidelink transmissions for further scheduling. For example, the wireless device may not receive any feedback from one or more receiver wireless devices for broadcast sidelink transmissions. An SL HARQ-ACK feedback based on the broadcast sidelink transmission may not be necessary in such a scenario. An SL HARQ-ACK feedback for the sidelink transmission may or may not be useful for the base station based on a cast type of the sidelink transmissions (e.g., broadcast, multicast, or unicast). For example, the SL HARQ-ACK feedback may not be useful at the base station because the base station may not (or need not) schedule retransmission resources for the broadcast sidelink transmissions. A first PUCCH resource for SL HARQ-ACK feedback may collide with a second PUCCH resource for HARQ-ACK feedback (e.g., Uu HARQ-ACK feedback) corresponding to downlink transmissions. The wireless device may drop the HARQ-ACK feedback for downlink transmissions, which may not be desirable given that the base station may not necessarily utilize the SL HARQ-ACK feedback for further scheduling.

Various examples described herein may allow a base station to enable/disable SL HARQ-ACK feedback corresponding to a sidelink transmission. For example, the base station may indicate enabling/disabling SL HARQ feedback corresponding to a sidelink transmission. The base station may indicate, in sidelink DCI, whether SL HARQ-ACK feedback is disabled. The base station may indicate disabling the SL HARQ-ACK feedback based on a first DCI field of sidelink DCI and second DCI field of the sidelink DCI. For example, the first field may be set to a first pre-defined value and the second field may be set to a second pre-defined value. The first field and the second field may be DCI fields related to SL HARQ-ACK feedback (e.g., a HARQ feedback frequency resource, a HARQ feedback time resource/timing offset). The base station may dynamically enable/disable the SL HARQ-ACK feedback based on a necessity of the SL HARQ-ACK feedback and potential collision with other uplink transmissions. Dynamically enabling/disabling the SL HARQ-ACK feedback may avoid unnecessary transmissions of SL HARQ-ACK feedback and avoid potential collisions.

A wireless device may determine a quantity of SL HARQ-ACK bits for a PUCCH transmission. The wireless device may determine the quantity of SL HARQ-ACK bits for the PUCCH transmission using one or more of the following approaches. The wireless device may determine the quantity of SL HARQ-ACK bits based on one or more fields in one or more SL DCIs, wherein the one or more SL DCIs may indicate a same HARQ-ACK resource in a time domain and/or a frequency domain. The wireless device may or may not generate a SL HARQ-ACK bit for a resource of a configured grant resource configuration. The wireless device may generate SL HARQ-ACK bits for resources allocated via dynamic SL DCIs that indicate activation of the configured grant resource configuration.

A first wireless device may expect/determine to receive a feedback from a second wireless device for a unicast sidelink transmission or a groupcast sidelink transmission. The first wireless device may or may not expect/determine to receive a feedback from the second wireless device for a broadcast sidelink transmission. The first wireless device may or may not expect/determine to receive a HARQ-ACK feedback from the second wireless device, for example, for the unicast and/or groupcast sidelink transmission, depending on a configuration. The wireless device may skip transmission of an SL HARQ-ACK feedback to a base station, for example, if the first wireless device does not receive a HARQ-ACK feedback from the second wireless device. The first wireless device may, to avoid any ambiguity, send/transmit/indicate a DTX state, for example, based on/in response to not receiving a HARQ-ACK feedback from the second wireless device.

A base station may indicate, via SL DCI, whether HARQ-ACK feedback (e.g., SL HARQ-ACK) by a first wireless device is needed or not. The base station may indicate a cast type (e.g., unicast, groupcast, or broadcast) of PSSCH transmissions. The first wireless device may use, for a PSSCH transmission, allocated resources for a sidelink session corresponding to the indicated cast type. The first wireless device may have a first sidelink session (e.g., unicast session) and a second sidelink session (e.g., a broadcast session) sharing a same resource pool (e.g., assisted by the base station for resource allocation). The first wireless device may use allocated resources for the first sidelink session, for example, based on receiving SL DCI indicating a unicast PSSCH transmission. The first wireless device may determine whether or not a HARQ-ACK feedback is needed for the allocated resources based on the cast type indicated in the SL DCI.

The base station may indicate, in SL DCI, a pre-defined HARQ-ACK resource (e.g., a pre-defined PUCCH resource) in a time domain (e.g., via a PSFCH-to-HARQ_feedback timing indicator field in the SL DCI, a HARQ offset) and/or a frequency domain (e.g., via a PUCCH resource indicator field in the SL DCI, HARQ-ACK resource indicator (ARI)). The pre-defined HARQ-ACK resource may not correspond to one or more PUCCH resources/one or more PUCCH resource sets for the wireless device. For example, the SL DCI may comprise a first predetermined value for the PSFCH-to-HARQ_feedback_timing_indicator_field and/or a second predetermined value for the PUCCH resource indicator field (e.g., HARQ offset=0 and ARI=15). A wireless device may be assigned/receive one or more PUCCH resources that may not comprise the pre-defined HARQ-ACK resource or the pre-defined PUCCH resource. For example, the base station may not configure a PUCCH resource, for the wireless device, with an index value that is equal to the second predetermined value (e.g., e.g., ARI=15). The wireless device may not be able to determine/identify a valid PUCCH resource, for example, if the SL DCI indicates the second predetermined value. For example, the PSFCH-to-HARQ_feedback_timing_indicator may indicate the first predetermined value (e.g., 0). The wireless device may determine that a timing offset, indicated by the first predetermined value, is smaller than a processing time for generating HARQ-ACK feedback. The pre-defined (e.g., reserved state) values (e.g., the first pre-determined value and/or the second pre-determined value) may be used to indicate that a HARQ-ACK feedback is not needed for the corresponding PSSCHs scheduled by the SL DCI. The wireless device may use the pre-defined (e.g., reserved state) values to determine that a HARQ-ACK feedback is not needed for the corresponding PSSCHs scheduled by the SL DCI. SL DCI may comprise a DCI field indicating whether or not an SL HARQ-ACK corresponding to resource allocation/PSSCHs is to be sent/transmitted by a wireless device.

SL DCI may indicate a first HARQ-ACK resource (in time and/or frequency). A first wireless device may determine a quantity of HARQ-ACK bits based on a first DCI field (e.g., a field indicating total quantity of PSSCH transmissions, total packet indicator (TPI) field, etc.) of the SL DCI. The SL DCI may comprise a second DCI field (e.g., a current PSSCH transmission indicator/index field, current packet indicator (CPI) field, etc.) which may indicate a position of a HARQ-ACK bit, among the determined quantity of HARQ-ACK bits, corresponding to PSSCH(s) scheduled by the SL DCI. The first DCI field may be same among one or more SL DCIs indicating a same HARQ-ACK resource in time/frequency domain. The second DCI field may be incremented for each SL DCI comprising one or more DCI fields/values that indicate transmission of a HARQ-ACK feedback to the base station.

Figure 27:
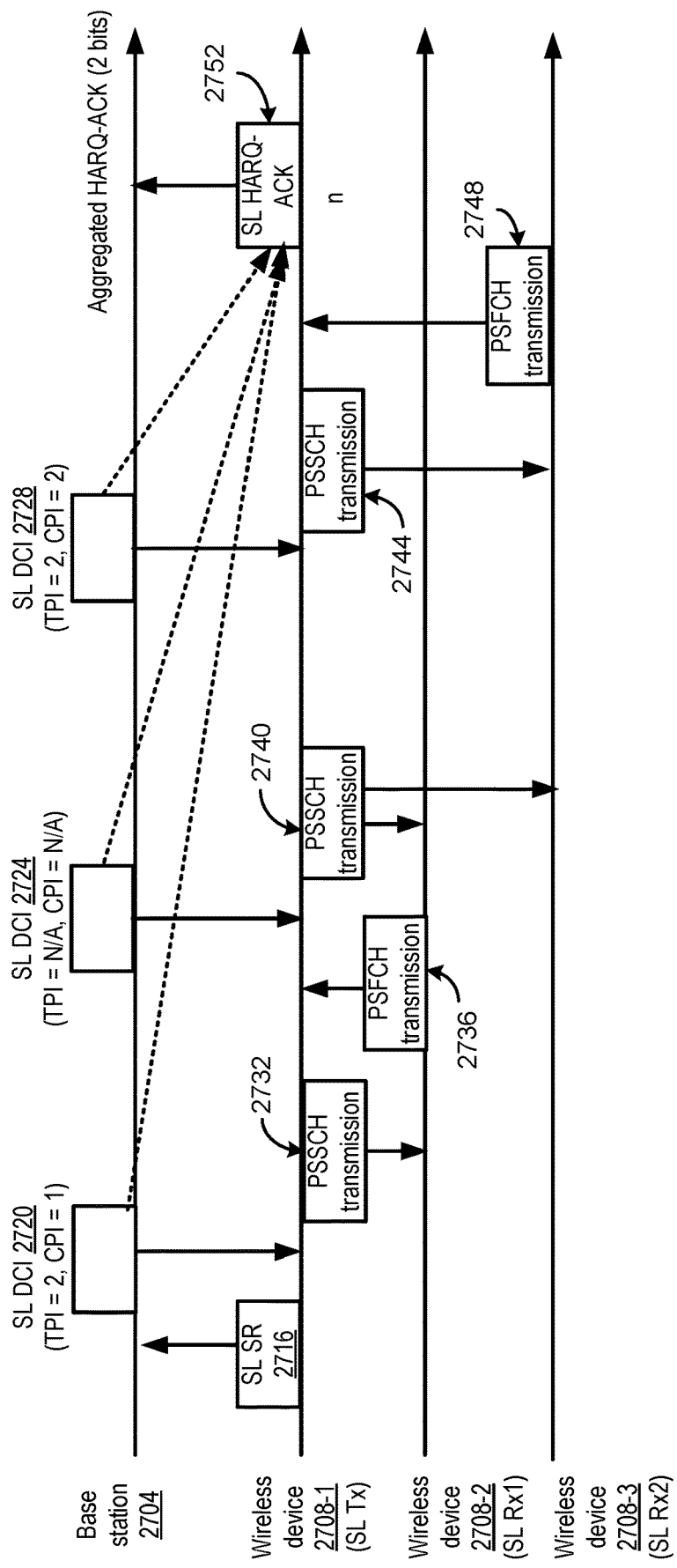
FIG. 27 shows example communication for sidelink operation comprising aggregated acknowledgment feedback.

FIG. 27 shows example communication for sidelink operation comprising aggregated acknowledgment (e.g., SL HARQ-ACK) feedback. A wireless device may drop one or more SL HARQ-ACK feedbacks bits (e.g., in an aggregated SL HARQ-ACK feedback) based on various criteria. A first wireless device 2708-1 may send, to a base station 2704, an SL SR 2716 requesting a resource assignment for sidelink transmissions. The base station 2704 may schedule first SL DCI 2720 for a sidelink unicast transmission (e.g., PSSCH transmission 2732) between a first wireless device 2708-1 (SL Tx) and a second wireless device 2708-2 (SL Rx). The base station 2704 may schedule second SL DCI 2724 for a sidelink broadcast transmission (e.g., PSSCH transmission 2740) between the first wireless device 2708-1 and other wireless devices (e.g., the second wireless device 2708-2 and a third wireless device 2708-3). The base station 2704 may schedule third SL DCI 2728 for a sidelink groupcast transmission (e.g., PSSCH transmission 2744) between the first wireless device 2708-1 and a group comprising the third wireless device 2708-3. The base station 2704-1 may receive an SL HARQ-ACK feedback 2752 for the unicast transmission and the groupcast transmission via an indicated SL HARQ-ACK resource. The first SL DCI 2720 and the third SL DCI 2728 may indicate the same SL HARQ-ACK resource.

The first SL DCI 2720 may comprise a first DCI field (e.g., a field indicating total quantity of PSSCH transmissions, TPI field, etc.) and a second DCI field (e.g., a current PSSCH transmission indicator/index field, CPI field, etc.). For example, the first SL DCI 2720 may indicate a total of two PSSCH transmissions requiring SL HARQ-ACK feedback and may indicate that the PSSCH transmission 2732 is a first PSSCH transmission of the two PSSCH transmissions (TPI=2, CPI=1). The TPI being 2 and the CPI being 1 may indicate that the base station 2704 may configure a maximum of two SL DCIs requiring SL HARQ-ACK feedback via the indicated SL HARQ-ACK resource with the current SL DCI (e.g., the first SL DCI 2720) scheduling a first resource for the PSSCH transmission 2732.

The base station 2704 may not indicate TPI and CPI in the second SL DCI 2724. The second SL DCI 2724 may indicate (e.g., based on not indicating the TPI and the CPI in the second SL DCI 2724) that the second SL DCI 2724 does not require an SL HARQ-ACK feedback. The first wireless device 2708-1 may ignore a first DCI field and/or a second DCI field based on receiving the second SL DCI 2724 not requiring an SL HARQ-ACK feedback. The first wireless device 2708-1 may determine that the second SL DCI 2724 does not require an SL HARQ-ACK feedback based on the second SL DCI 2724 corresponding to a broadcast transmission.

The third SL DCI 2728 may indicate the total of two (or any other quantity) PSSCH transmissions requiring SL HARQ-ACK feedback and may indicate that the PSSCH transmission 2744 is a second PSSCH transmission of two (or any other quantity) PSSCH transmissions (TPI=2, CPI=2). The TPI being 2 and the CPI being 2 may indicate that the third SL DCI 2728 may schedule a last resource for the PSSCH transmission 2744 requiring SL HARQ-ACK feedback (e.g., via the indicated SL HARQ-ACK resource). The first wireless device 2708-1 may send/transmit in the SL HARQ ACK 2752, via the indicated SL HARQ-ACK resource, aggregated SL HARQ-ACK bits (e.g., 2 bits) for the first PSSCH transmission 2732 and the third PSSCH transmission 2744. The aggregated HARQ-ACK bits may be an aggregation of information (e.g., ACK/NACK indications) from a first PSFCH transmission 2736 and a second PSFCH transmission 2748. The base station 2704 and/or the first wireless device 2708-1 may perform uplink/downlink operations as described with reference to the base station and/or the first wireless device in FIGS. 19-23.

Figure 28:
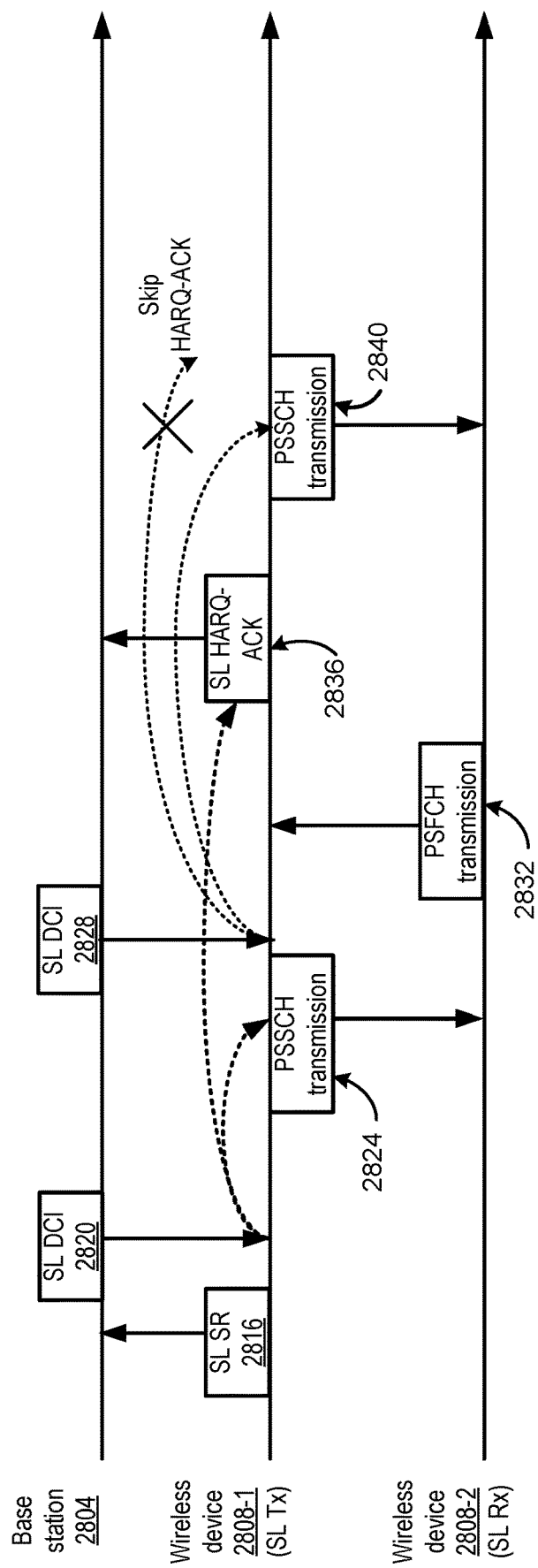
FIG. 28 shows example communication for sidelink operation.

FIG. 28 shows example communication for sidelink operation. A wireless device may drop one or more SL HARQ-ACK feedback (e.g., in an aggregated SL HARQ-ACK feedback) based on various criteria. A first wireless device 2808-1 may send, to a base station 2804, an SL SR 2816 requesting a resource assignment for sidelink transmissions. The base station 2804 may send first SL DCI 2820 for a sidelink transmission (e.g., PSSCH transmission 2824) between the first wireless device 2808-1 (UE1, SL Tx) and a second wireless device 2808-2 (UE2, SL Rx). The base station 2804 may send second SL DCI 2828 for a sidelink transmission (e.g., PSSCH transmission 2840) between the first wireless device 2808-1 and the second wireless device 2808-2.

The base station 2804 may indicate (e.g., in the SL DCI 2828) a pre-defined value for a HARQ-ACK resource (e.g., a PUCCH resource) in a time domain and/or a frequency domain. The pre-defined value for the HARQ-ACK resource may be used to indicate that a HARQ-ACK feedback is not needed for the PSSCH transmission 2840 and/or that no HARQ-ACK resource is defined for the PSSCH transmission 2840.

The first wireless device 2808-1 may send/transmit an SL HARQ-ACK 2836 for the first PSSCH transmission 2824, for example, based on receiving a PSFCH transmission 2832. The first wireless device 2808-1 may send/transmit an SL HARQ-ACK 2836 via a HARQ-ACK resource indicated in the SL DCI 2820. The first wireless device 2808-1 may not send/transmit (e.g., refrain from sending/transmitting) an SL HARQ-ACK for the second PSSCH transmission 2840. The first wireless device 2808-1 may not send/transmit an SL HARQ-ACK for the second PSSCH transmission 2840, for example, based on the pre-defined HARQ-ACK resource indicated in the SL DCI 2828. The base station 2504 and/or the first wireless device 2508-1 may perform uplink/downlink operations as described with reference to the base station and/or the first wireless device in FIGS. 19-23.

A wireless device may determine/select a PUCCH resource set, for example, if a quantity of SL HARQ-ACK bits is dynamically determined based on one or more SL DCIs. Each PUCCH resource set may be configured with a minimum/maximum (or lowest/highest) quantity of UCI bits that may be sent via a PUCCH resource in the PUCCH resource set. The wireless device may apply a PUCCH resource indicator/index to determine a PUCCH resource from the selected PUCCH resource set. The wireless device may determine (e.g., for determining the PUCCH resource set) a PUCCH format to carry the quantity of SL HARQ-ACK bits for SL HARQ-ACK feedback. The wireless device may determine/select a PUCCH format based on a determined quantity of SL HARQ-ACK bits. The wireless device may determine a PUCCH resource of a PUCCH resource set based on one or more SL DCIs indicating a same SL HARQ-ACK resource.

Dynamic determination of a quantity of HARQ-ACK bits may reduce unnecessary overhead of HARQ-ACK feedback by allocating only a necessary quantity of bits. Dynamic determination may limit or complicate HARQ-ACK feedbacks for one or more configured grant resources in at least some scenarios. For example, a base station may use HARQ-ACK feedbacks on the one or more configured grant resources for adjusting one or more configured grant configurations. A wireless device may use a resource of a configured grant resource configuration for a unicast PSSCH transmission, a groupcast PSSCH transmissions and/or a broadcast PSSCH transmission. A feedback (e.g., a PSFCH transmission) may or may not be received from one or more receivers depending on a cast type. A transmitter wireless device may not be able to transmit HARQ-ACK feedback or may not efficiently be to transmit the HARQ-ACK feedback without having feedbacks from the one or more receivers. Reserving a HARQ-ACK bit for a resource of a configured grant may not be so efficient as there are many resources between a first HARQ resource and a second HARQ resource (in a time domain). An enhancement to allow HARQ feedback for one or more configured grant resource configurations without requiring a large quantity of HARQ-ACK bits may be needed.

A base station may configure a fixed quantity/size of HARQ-ACK bits for SL HARQ-ACK feedback sent/transmitted at a time. The fixed size of HARQ-ACK bits may be used for PSSCH transmissions scheduled by dynamic SL DCIs and/or configured grant resource configurations. The fixed size of HARQ-ACK bits may correspond to a configured quantity of HARQ processes indicated by SL DCI. For example, the base station may configure the quantity of HARQ processes being equal to K (e.g., K=8). The quantity of HARQ-ACK bits for a PUCCH transmission for SL UCIs may correspond to (e.g., may be equal to) the quantity of HARQ processes. A position of a HARQ-ACK among K bits may be indicated by a HARQ process indicator/ID (e.g., HARQP). The HARQP may be indicated in a SL DCI or may be determined by a wireless device for a resource of a configured grant resource configuration.

Figure 29:
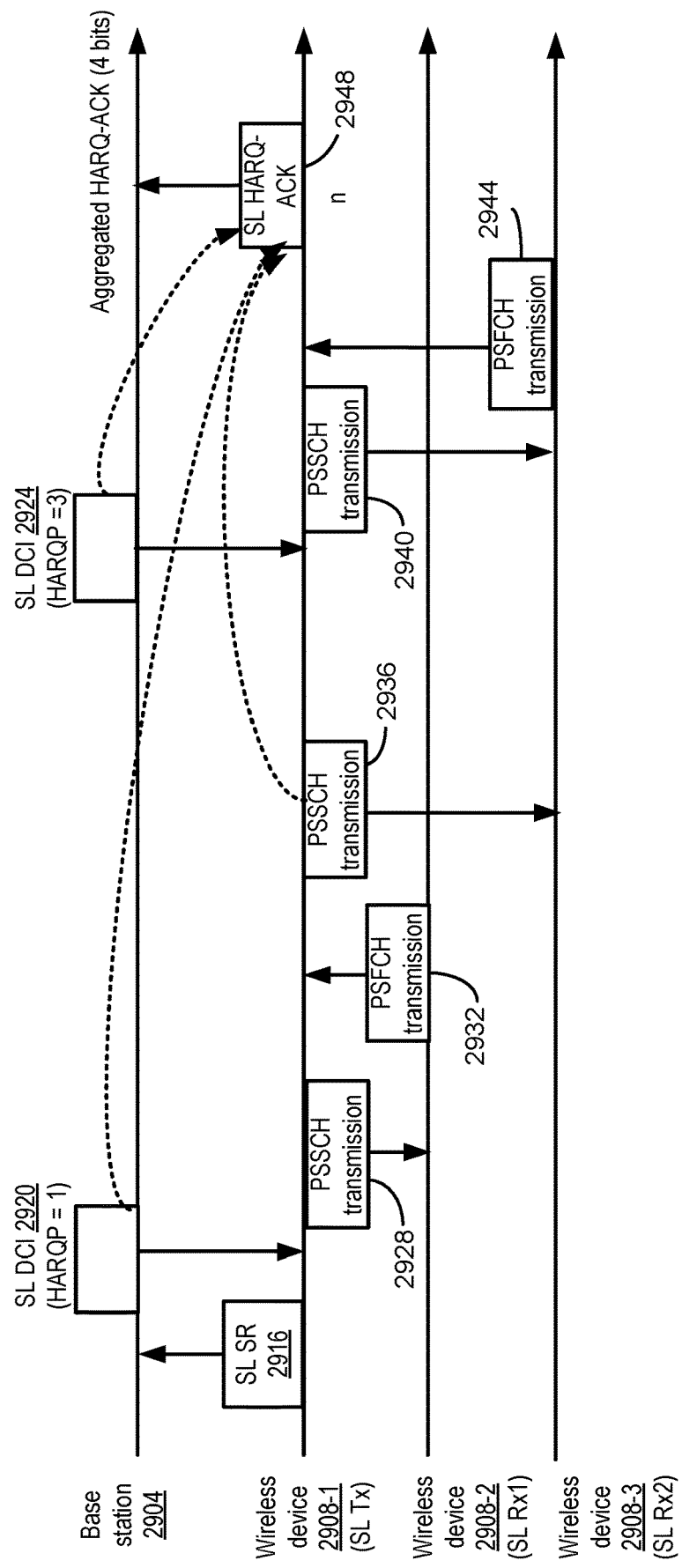
FIG. 29 shows example communication for sidelink operation comprising aggregated acknowledgment feedback.

FIG. 29 shows example communication for sidelink operation comprising aggregated acknowledgment (e.g., SL HARQ-ACK) feedback. A wireless device may determine a size of SL HARQ-ACK feedback (e.g., quantity of SL HARQ-ACK bits) based on a configured quantity of HARQ processes. A first wireless device 2908-1 may send, to a base station 2904, an SL SR 2916 requesting a resource assignment for sidelink transmissions. The base station 2904 may configure a quantity of HARQ processes K for sidelink operation (e.g., K=4, or any other quantity). The base station 2904 may send first SL DCI 2920 for a sidelink transmission (e.g., PSSCH transmission 2928) between the first wireless device 2908-1 (SL Tx) and a second wireless device 2908-2 (SL Rx). The base station 2904 may send second SL DCI 2924 for a sidelink transmission (e.g., PSSCH transmission 2940) between the first wireless device 2908-1 and the second wireless device 2908-2.

SL DCIs (e.g., the SL DCI 2916 and the SL DCI 2920) may indicate corresponding HARQ process IDs. The HARQ process IDs of the SL DCIs may be used to determine a HARQ-ACK bit of the K bits of SL HARQ-ACK bits for one or more first PSSCH transmissions scheduled by the SL DCI. For example, the SL DCI 2916 may indicate a HARQ process ID of 1 and the SL DCI 2920 may indicate a HARQ process ID of 3. The first wireless device 2908-1 may determine that a first bit and the third bit of an SL HARQ-ACK 2948 may correspond to the PSSCH transmission 2928 and the PSSCH transmission 2940, respectively, for example, based on the SL DCI 2916 indicating a HARQ process ID of 1 and the SL DCI 2920 indicating a HARQ process ID of 3. The first wireless device 2908-1 may send ACK/NACK indications, indicated by PSFCH transmissions 2932 and 2944, in the first bit and the third bit, respectively, of the SL HARQ-ACK 2948. Any other correspondence/association of HARQ-ACK bits and/or SL HARQ-ACK bits to a HARQ process ID may be used.

One or more second PSSCH transmissions (e.g., PSSCH transmission 2936, other PSSCH transmissions) may be scheduled based on one or more configured grant resource configurations. The one or more second PSSCH transmissions may not require PSFCH transmissions from the second wireless device 2908-2 or the third wireless device 2908-3. With reference to FIG. 28, HARQ process IDs of a configured grant resource configuration may be 2 and 4. The first wireless device 2908-1 may determine a HARQ process ID of the one or more second PSSCH transmissions based on a slot indicator/index of an earliest PSSCH transmission, of the one or more second PSSCH transmissions, and/or a HARQ process ID of the one or more second PSSCH transmissions. The HARQ process ID of a configured grant resource may be configured to the configured grant resource configuration. The PSSCH transmission 2936 using the configured grant resource configuration may use the configured HARQ process ID (e.g., 2). The first wireless device 2908-1 may determine that a second bit of the SL HARQ-ACK 2948 may correspond to the PSSCH transmission 2936, for example, based on the PSSCH transmission 2936 using the configured HARQ process ID of 2. The first wireless device 2908-1 may send an ACK/DTX indication in the second bit of the SL HARQ-ACK 2948. The first wireless device 2908-1 may similarly populate the fourth bit of the SL HARQ-ACK 2948 with an ACK/DTX indication. The base station 2504 and/or the first wireless device 2508-1 may (e.g., additionally) perform uplink/downlink operations as described with reference to the base station and/or the first wireless device in FIGS. 19-23.

The base station 2904 may schedule one or more HARQ process IDs via SL DCIs (e.g., which may not be overlapped with potential PSSCH transmissions) using one or more configured grant resources sharing a same HARQ-ACK resource (in a time domain). A HARQ-ACK resource of a configured grant resource may be determined based on one or more parameters on the configured grant resource configuration. For example, a HARQ offset may be configured on the configured grant resource configuration. The wireless device may send/transmit, for a PSSCH transmission using the configured grant resource, a corresponding HARQ-ACK after the HARQ offset (e.g., a time offset, a PSFCH-to-HARQ_feedback_timing_indicator), for example, if the PSSCH transmission is a unicast transmission and/or groupcast transmission, and/or if the PSSCH transmission is for a sidelink session and/or for a resource pool configured with a HARQ feedback.

A base station may configure a quantity of SL HARQ-ACK bits (e.g., K bits) at an each PUCCH transmission via one or more higher layer signals (e.g., RRC signaling and/or MAC CEs). A wireless device may generate the quantity of SL HARQ-ACK bits, for example, regardless of actual scheduled PSSCH transmissions and/or actual PSSCH transmissions. The wireless device may add 1 bit to indicate an SL SR, for example, if the wireless device may additionally have the SL SR transmission on the each PUCCH transmission. The wireless device may (e.g., to maintain a same UCI bit size regardless of negative SL SR (no new sidelink data) or positive SL SR (new sidelink data arrival)) generate K bits for HARQ-ACK UCI, for example, if a PUCCH resource may not overlap with one or more SR configurations for SL SR transmission. The wireless device may generate K+1 bits for UCI with HARQ-ACK and SR, for example, if the PUCCH resource may overlap with the one or more SR configurations for SL SR transmission. The wireless device may place the SR in the first bit which may represent a negative SR or a positive SR.

A wireless device may determine a bit indicator/index/order for a HARQ-ACK bit among a quantity of HARQ-ACK bits (e.g., for one or more PSSCH transmissions based on SL DCI and/or configured grant resource configuration). First SL DCI scheduling resources for one or more PSSCH transmissions of (e.g., one or two) transport blocks (e.g., dynamic SL DCI) may comprise a DCI field indicating a bit index/order. The DCI field may indicate the bit index directly. The DCI field may indicate a HARQ process ID and the bit index/order may be determined based on the HARQ process ID and a quantity of HARQ-ACK bits K (e.g., HARQ process ID % K), where % may refer to a modulo division operation. The DCI field may indicate a session indicator/index which is assigned to a sidelink session requiring a HARQ feedback, wherein the session indicator/ index may be used as the bit index or the bit index may be determined based on the session indicator/index and K (e.g., session index % K). The DCI field may indicate an offset and a wireless device may determine the bit index based on the offset, a slot index (e.g., corresponding to a slot in which a first PSSCH transmission scheduled by the DCI starts), and/or K (e.g., a function of the (slot index+offset) % K). Second SL DCI activating a configured grant resource configuration may indicate a bit index, a HARQ process ID, or an offset in a manner similar to dynamic DCI. A bit index, a group index/ID, an offset, or a HARQ process ID may be configured in the configured grant resource configuration.

Figure 30:
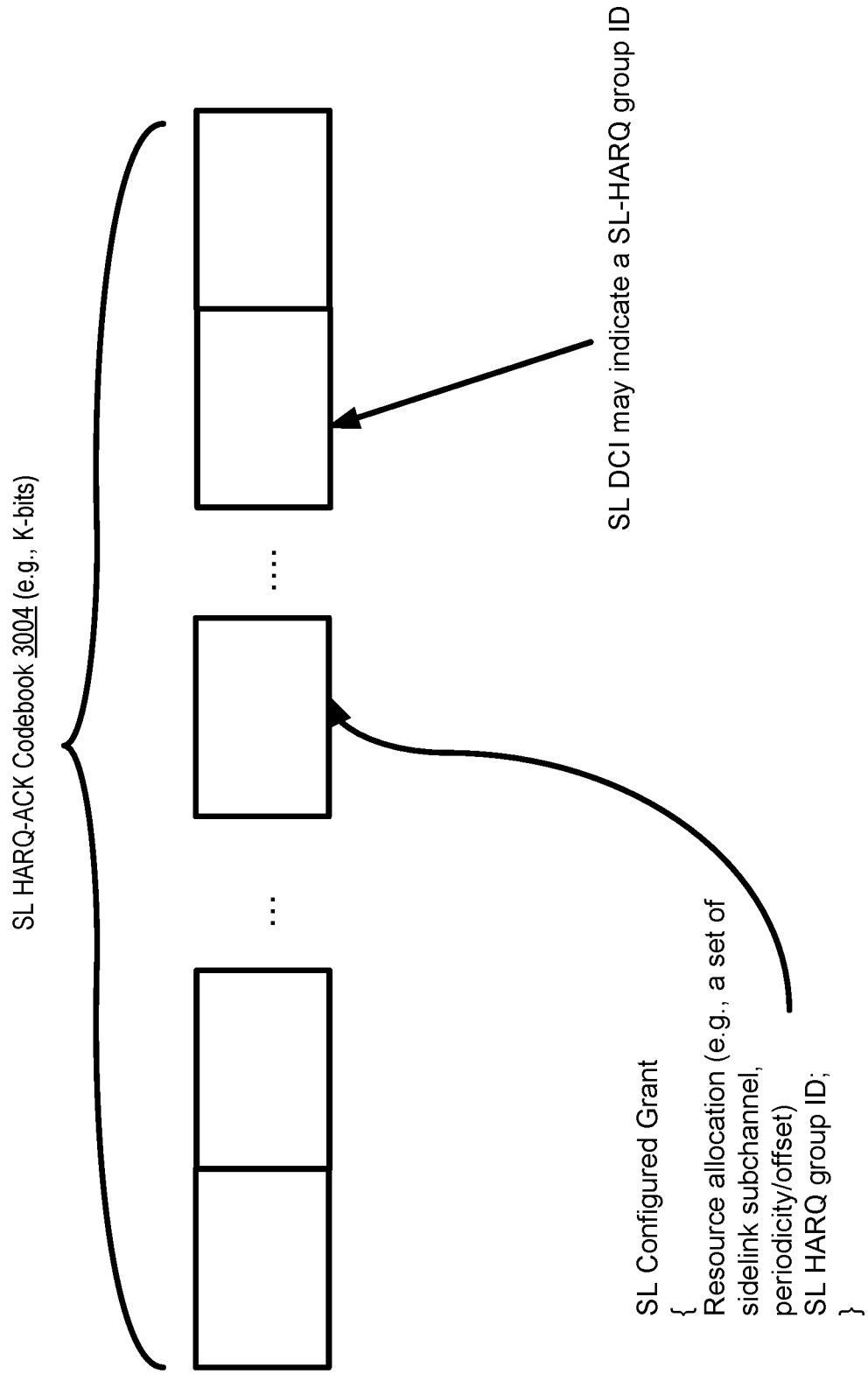
FIG. 30 shows an example configuration for an acknowledgment message.

FIG. 30 shows an example configuration for an acknowledgment. The configuration may show an example determination of SL HARQ-ACK bits. A base station may configure K bits for a SL HARQ-ACK transmission (e.g., SL HARQ-ACK codebook 3004) for a PUCCH comprising the SL HARQ-ACK transmission. A bit indicator/index of a bit (e.g., corresponding to a PSSCH transmission scheduled by dynamic SL DCI) in a HARQ-ACK may be determined based on the dynamic SL DCI. The SL DCI may indicate an SL-HARQ group indicator/ID, and the SL-HARQ group indicator/ID may be used to determine the bit index. A bit indicator/index of a bit (e.g., corresponding to a PSSCH transmission scheduled based on a configured grant) in a HARQ-ACK may be determined based on one or more parameters configured in a configured grant resource configuration. For example, an SL HARQ group ID parameter may be used to determine the bit index.

A base station may schedule one or more PSSCH transmissions that may be mapped to a same bit index of K HARQ-ACK bits. The base station may schedule first SL DCI to allocate resource for an initial transmission of a TB. The base station may schedule second SL DCI to allocate resource for a retransmission of the TB. The first SL DCI and the second SL DCI may indicate a same HARQ process ID and/or a same SL-HARQ group ID as the base station may need to receive a single bit for the initial transmission and retransmission. The wireless device may aggregate HARQ-ACK bits, of more than one PSSCH transmissions mapped to an bit of K HARQ-ACK bits of a PUCCH transmission, and generate a single bit HARQ-ACK bit that may be mapped to an bit of the K HARQ-ACK bits. The wireless device may use a last bit from the HARQ-ACK bits of the more than one PSSCH transmissions. A HARQ-ACK feedback, from a receiving wireless device, on the retransmission may be used for feedback to the base station. The wireless device may perform an AND operation on the HARQ-ACK bits. The wireless device may send/transmit an ACK to the base station, for example, if all HARQ-ACK bits are ACKs (e.g., rather than NACKs). The wireless device may send/transmit a NACK to the base station, for example, if one or more HARQ-ACK bits are NACKs. The wireless device may perform an OR operation on the HARQ-ACK bits. The wireless device may send/transmit an ACK to the base station, for example, if at least one ACK bit is present in the HARQ-ACK bits. The wireless device may send/transmit a NACK, for example, if all the HARQ-ACK bits are NACKs.

A base station may dynamically change SL HARQ-ACK feedback behavior, and/or may dynamically change a HARQ timing offset via SL DCI, for example, at least if a fixed bit size is used for an SL HARQ-ACK feedback. A first SL DCI may comprise a HARQ timing offset DCI field. The HARQ timing offset DCI field may indicate an offset between a scheduled PSSCH resource and a PUCCH resource for HARQ-ACK feedback corresponding to the PSSCH resource. A wireless device may determine that the base station may disable HARQ-ACK feedback for a PSSCH transmission (e.g., no HARQ-ACK transmission for the PSSCH transmission), for example, based on/in response to receiving the HARQ timing offset DCI field with a certain value (e.g., a predefined state/value, an RRC configured state/value, a fixed state/value, negative value, zero, etc.).

SL DCI may comprise a DCI field indicating SL HARQ-ACK suspension or SL HARQ-ACK transmission. A wireless device may hold SL HARQ-ACK feedback if sidelink HARQ-ACK suspension is enabled. The wireless device may send/transmit the SL HARQ-ACK feedback if the sidelink HARQ-ACK suspension is disabled and sidelink HARQ-ACK transmission is enabled. The wireless device may determine the SL HARQ-ACK suspension based on the DCI field and a HARQ timing offset field. The wireless device may assume/determine that HARQ-ACK feedback is suspended, for example, if the DCI field is not toggled (e.g., if the DCI field is kept a same value as in previously received SL DCI) and/or the HARQ timing offset is indicated with a predefined value/state. The wireless device may not send/transmit the HARQ-ACK feedback for the SL PSSCH/PSCCH resources. The wireless device may send/transmit the HARQ-ACK feedback on a PUCCH resource determined based on one or more DCI fields (including the HARQ timing offset), for example, if the DCI field is toggled (e.g., changed from a value in the previously received SL DCI) and/or the HARQ timing offset is indicated with a valid offset (e.g., non-predefined value/state). The wireless device may aggregate a plurality of HARQ-ACK bits to a single ACK or NACK bit, for example, if the HARQ-ACK feedback is suspended. The plurality of HARQ-ACK bits may share a same bit index (e.g., may correspond to a same HARQ process ID, a same group ID, or a same bit index, etc.).

A wireless device may use K bits of UCI on a PUCCH transmission to indicate either HARQ-ACK feedback or buffer status information of a sidelink data. The wireless device may use K bits to carry sidelink buffer status report (BSR) information instead of carrying HARQ-ACK bits, for example, if the wireless device has a positive SR on the PUCCH transmission. The wireless device may perform a PUCCH transmission comprising an SR and not comprising HARQ-ACK feedback. The wireless device may generate UCI with K+1 bits to indicate a positive SR and K bits of BSR information. The wireless device may drop K bits corresponding to HARQ-ACK and send K bits corresponding to BSR information, for example, if the wireless device needs to transmit K bits corresponding to the HARQ-ACK with a positive SR. The wireless device may drop K bits corresponding to HARQ-ACK and send K bits corresponding to BSR information if the SR is triggered for a LCH with a high priority (e.g., the priority of the LCH is higher than or equal to a priority threshold).

Ability to transmit a positive SR for a new sidelink data if a wireless device is configured with a base station-assisted sidelink operation may be essential for the base station-assisted sidelink operation. The wireless device may piggyback BSR of sidelink via a PUSCH, for example, if the wireless device is scheduled with the PUSCH (either based on an uplink grant or based on a configured grant).

A base station may configure first SR resources for SR transmissions corresponding to uplink data. The base station may configure second SR resources for SR transmissions corresponding to sidelink data. The first SR resources may partially or fully overlap with second SR resources. A wireless device may send/transmit an SR with a first bit size (e.g., 1 bit, or any other quantity of bits) for a negative SR for a sidelink data. The wireless device may perform a transmission corresponding to a second bit size (e.g., K+1 bits) for a positive SR for the sidelink data. The transmission may comprise an SR bit and potentially BSR information (e.g., reduced BSR information or a brief information of sidelink sessions/data). Difference between the first bit size and the second bit size may increase complexity at the base station. The different sizes may not be an issue if the wireless device may send/transmit a PUCCH transmission for sending sidelink UCIs (e.g., comprising SL HARQ-ACK, a positive SR) only. For example, the wireless device may not send/transmit any PUCCH transmission if the wireless device may have uplink signal comprising the negative SL SR without any SL HARQ-ACK bits. The different sizes may be an issue if the wireless device may multiplex a first PUCCH transmission for downlink/uplink operation and a second PUCCH transmission for sidelink operation. The wireless device may aggregate an SR bit and an SL SR bit in case of collision between the first PUCCH and the second PUCCH. The wireless device may send a positive SR if either SR is positive or SL SR is positive. The wireless device may not send/transmit a BSR of sidelink via the second PUCCH transmission. The wireless device may instead receive an uplink grant from the base station. The wireless device may send/transmit BSR for uplink and/or BSR for sidelink for example, based on receiving the uplink grant. A total quantity of UCI bits multiplexed between the first PUCCH transmission and the second PUCCH transmission may be known to the network. For example, the UCI bits multiplexed between the first PUCCH transmission and the second PUCCH transmission may comprise SR bit(s) (e.g., 1 bit, aggregated between SR and SL SR), HARQ-ACK bits corresponding to downlink transmissions, and/or SL HARQ-ACK bits. A positive SL SR may be sent/transmitted via the SR resource and the BSR for sidelink via the second PUCCH may be dropped, for example, if the first PUCCH transmissions and the second PUCCH transmissions may collide. The wireless device may multiplex SL HARQ-ACK bits in UCIs corresponding to the first PUCCH transmission, for example, if the wireless device has SL HARQ-ACK bits to transmit. The wireless device may need to change a PUCCH format to multiplex the first PUCCH transmission and the second PUCCH transmission. A wireless device may multiplex HARQ-ACK bits and a SL SR transmission on a PUCCH resource that is not configured as an SR resource for downlink/uplink or not configured for a SR resource for an LCH triggering the SL SR. The wireless device may add one or more bits to indicate the SL SR in addition to the HARQ-ACK bits and the SL SR may be sent regardless of whether the SL SR is negative or positive. A fixed size/quantity of the one or more bits for the SL SR may be used if the wireless device multiplexes the SL SR to the HARQ-ACK feedbacks for downlink data.

Figure 31:
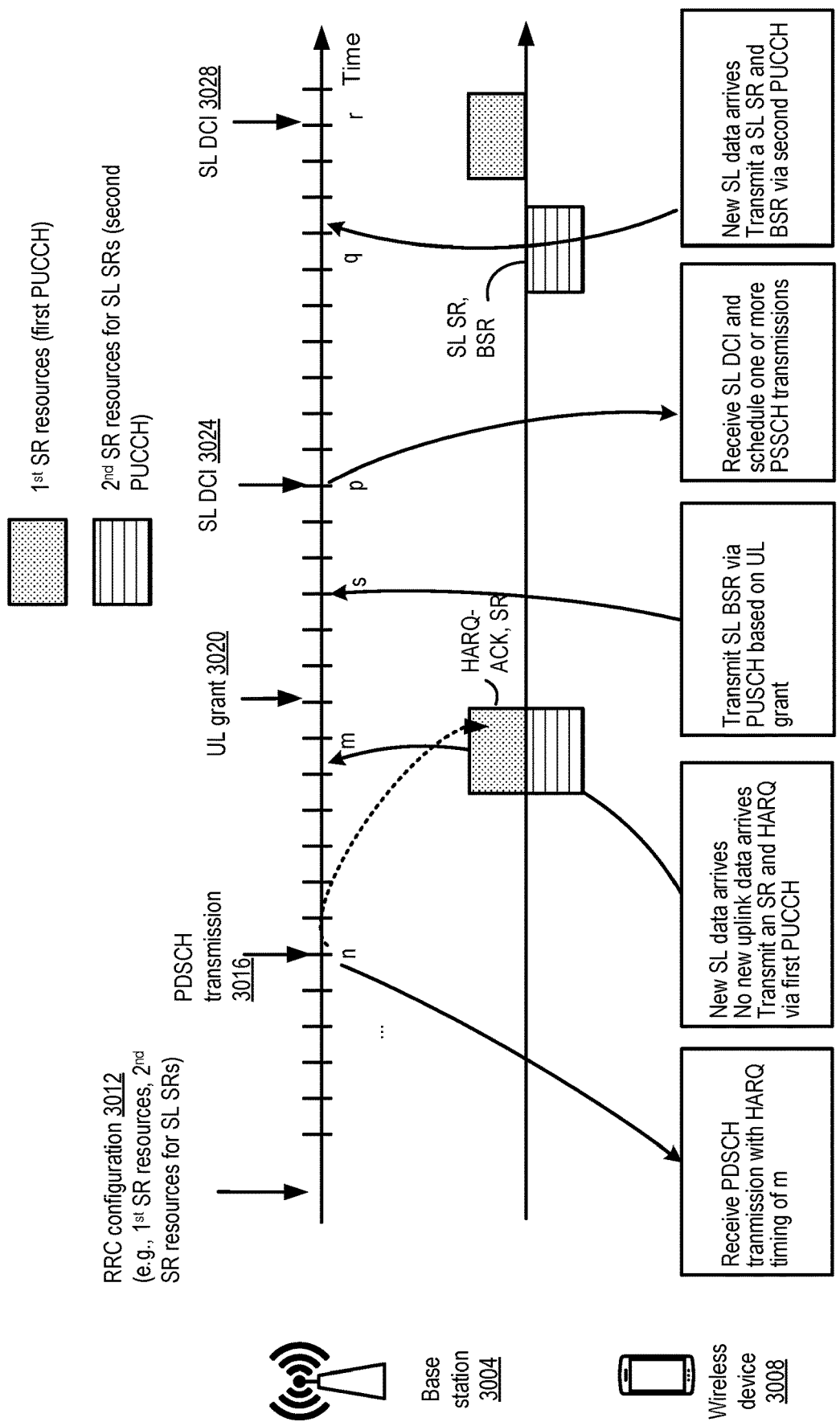
FIG. 31 shows example communication comprising a scheduling request (SR) and a sidelink SR.

FIG. 31 shows example communication comprising a scheduling request and a sidelink SR. The communication may comprise a collision between the SR and the SL SR. A wireless device may avoid sending an SL SR based on determining that a PUCCH corresponding to the SL SR overlaps with another PUCCH corresponding to an SR. A base station 3004 may configure (e.g., via RRC configuration messages 3012) first SR resources for SR transmissions that may be initiated by uplink data from a wireless device 3008. The base station 3004 may configure second SR resources for SL SR transmissions that may be initiated by sidelink data by the wireless device 3008.

The wireless device 3008 may receive (e.g., at or after time n) DCI and a corresponding PDSCH transmission 3016. The DCI may indicate a HARQ-ACK transmission time (e.g., time m). The wireless device 3008 may be configured with an SR resource of the second SR resources at the time m. The wireless device 3008 may be triggered with a SL SR at the time m. The wireless device may send/transmit (e.g., at or after time m) an SR instead of the SL SR to avoid ambiguity. The wireless device may send/transmit (e.g., at or after time m) an SR instead of the SL SR, for example, based on determining that a first PUCCH of the first SR resources overlaps (e.g., in time) with a second PUCCH of the second SR resources. The wireless device 3008 may send (e.g., at or after time m), via the first PUCCH of the first SR resources, the SR and HARQ-ACK feedback for the PDSCH transmission 3016. The first PUCCH may be a PUCCH used for sending UCIs for downlink/uplink.

The wireless device 3008 may receive an uplink grant 3020 based on (e.g., in response to) the SR. The wireless device may send/transmit (e.g., at or after time s) a BSR of sidelink, for example, based on (e.g, in response to) receiving the uplink grant 3020. The base station 3004 may send (e.g., at or after time p) SL DCI 3024 comprising resource assignments for one or more sidelink cells. The wireless device 3008 may send/transmit/schedule one or more PSSCH transmissions, for example, based on/in response to the SL DCI 3024.

The wireless device 3008 may send (e.g., at or after time q) SL SR via the second PUCCH of the second SR resources. The wireless device 3008 may send the SL SR via the second PUCCH based on determining that the second PUCCH does not overlap (e.g., in time) with the first PUCCH and/or based on determining that the wireless device 3008 does not have any UCI for downlink/uplink at the time q. The wireless device 3008 may send a BSR of the sidelink along with the SL SR. The base station 3004 may send (e.g., at or after time r) second SL DCI in response to receiving the sidelink SR.

A wireless device may share one or more SR configurations for uplink data for SL SR transmissions. The wireless device may only need a small resource block to transmit a BSR of the sidelink, in at least some scenarios. A base station may configure at least one sidelink-dedicated SR configuration to avoid excessive resource allocation based on a SR for a sidelink data. The wireless device may use the sidelink-dedicated SR configuration/resources based on having only new sidelink data and based on uplink buffer being empty. The wireless device may send SL SR transmissions via a first cell and send HARQ-ACK feedback for sidelink transmissions (e.g., for a sidelink cell/a sidelink resource pool) via a second cell, for example, if the wireless device may share one or more SR resources/configurations between SR transmissions and SL SR transmissions. The first cell and the second cell may be different or the same depending on configurations of PUCCH cell. A wireless device may send/transmit an SL SR via another PUCCH via the first cell (e.g., because the SR resources for SL SR transmissions may not be configured in the second cell), for example, if the wireless device is configured with the second cell as a PUCCH cell for sidelink HARQ-ACK feedback. The wireless device may use the second cell for sending/transmitting SL SR(s) if the second cell is configured with one or more SL SR resources. The wireless device may use the first cell for sending/transmitting SL SR(s) if the second cell is not configured with SR resources and the first cell is configured with SR resources shared for the SL SR transmissions.

A wireless device may or may not support simultaneous PUCCH transmission and PUSCH transmission over a plurality of cells regardless whether the PUCCH is sent/transmitted for downlink/uplink operation and/or sidelink operation. The wireless device may piggyback UCIs of the PUCCH on the PUSCH. The wireless device may send/transmit a first HARQ-ACK feedback for one or more PSSCH resources, for example, based on (e.g., in response to) transmitting at least one PSSCHs on the one or more PSSCH resources. A base station may schedule one or more PSSCH resources via first SL DCI for a retransmission. The wireless device may have succeeded a sidelink transmission and may not utilize the scheduled one or more PSSCH resources. The wireless device may not receive any feedback from any receiver as no new sidelink transmission occurs. The wireless device may not send/transmit HARQ-ACK feedbacks corresponding to the one or more PSSCH resources as no feedback has been received from the receiver. The wireless device may or may not have HARQ-ACK feedback on a PUCCH resource, for example, if the HARQ-ACK feedback may be generated based on actual PSSCH transmission. The wireless device may generate HARQ-ACK feedback corresponding to one or more configured grants if the wireless device may have scheduled/utilized configured grant resources for PSSCH transmission(s).

A wireless device may send (e.g., regardless of a cast type used) a HARQ-ACK feedback for a PSSCH resource (or one or more PSSCH resources) or allocated on the PSSCH resource (or the one or more PSSCH resources). A base station may not be aware of a cast type of a resource allocated by the base station. The wireless device may not receive a feedback from one or more receivers, for example, if the allocated resource(s) are used for sending/transmitting one or more broadcast PSSCH transmissions. The wireless device may send an ACK or NACK for the allocated resource. The wireless device may send an ACK if the wireless device may not retransmit or may not require any more resources for a same TB sent/transmitted using the allocated resources. The wireless device may send/transmit at most two (or any other quantity of) TBs (e.g., based on MIMO technique, if a single layer is assumed, a TB is assumed) based on the allocated resources by SL DCI. The wireless device may send a NACK to request more resources for retransmission of the same TB(s). A wireless device may send an ACK or a NACK for one or more resources of a configured grant resource configuration to indicate quality of the configured grant resource configuration. The wireless device may send an ACK, for example, if the configured grant resource has been successfully used in one or more PSSCH transmissions. The wireless device may send a NACK, for example, if the configured grant resource has not been successfully used due to one or more reasons. The wireless device may send a NACK, for example, if the configured grant resource is configured with a smaller TBs than needed by the wireless device. The wireless device may send a NACK, for example, if the configured grant resource experiences high collision among a plurality of devices. The wireless device may send a NACK, for example, if the configured grant resource is not configured with a sufficiently short periodicity, a sufficient quantity of repetitions, a sufficient quantity of PRBs, and/or a sufficient quantity of OFDM symbols, etc. A status report on a configured grant resource may be sent/transmitted via MAC CEs (e.g., instead of via a HARQ-ACK feedback). The wireless device may not send/transmit HARQ-ACK feedback for PSSCH transmissions utilizing one or more configured grant resources. The wireless device may send/transmit a status of each configured grant resource to the base station via one or more MAC CEs and/or RRC signaling.

A base station may configure a configured grant resource or one or more configured grant resource configurations for a sidelink session for a first wireless device. The sidelink session may be used for communications between the first wireless device and one or more receiver wireless device(s). The sidelink sessions may be determined/defined in different ways. The base station may configure a first configured grant configuration for a first sidelink session between the first wireless device and a second wireless device for an application with a first LCH mapping. The base station may configure a second configured grant configuration for a second sidelink session between the first wireless device and the second wireless device for a second application with a second LCH mapping. The base station may configure a sidelink session based on a pair of wireless devices (e.g., from the first wireless device and a receiver group) regardless of LCH mapping of one or more applications. The first wireless device may use a configured grant resource only for an associated sidelink session, for example, if a configured grant resource configuration is associated with the sidelink session. The sidelink session may be differentiated based on a HARQ process indicator/ID, a group indicator/ID, and/or a session indicator/ID. The first wireless device may send HARQ-ACK feedback to the base station for the configured grant resource configuration, for example, if the sidelink session (e.g., a unicast or a groupcast sidelink session) is configured with a feedback from one or more receivers. The base station may schedule retransmission resources based on/using SL DCIs, for example, based on/in response to receiving NACK for the configured grant resource configuration.

A base station may configure/determine a configured grant resource configuration. The configured grant resource configuration may comprise one or more of a session ID (e.g., sidelink destination ID, or a sidelink session ID, a sidelink session group ID, etc.), one or more LCH mappings, enabling/disabling of HARQ-ACK feedback, one or more resources used for PSSCH transmissions, one or more resources used for PSFCH transmissions (e.g., if receiver feedback is configured), a HARQ group ID, and/or a HARQ process ID. A wireless device may send/transmit assistance information to request a configured grant resource configuration. The assistance information may comprise one or more of an expected traffic pattern, a cast type, one or more receivers (or a sidelink destination indicator/ID), whether a receiver feedback resource is needed (if needed, a desired timing offset for the feedback from the receiver may be also indicated), a required quantity of repetitions, an indication of multi-slot scheduling necessity, a recommended configured grant type, and/or the like. A base station may configure/determine a type 2 configured grant resource configuration to a wireless device. The wireless device may send/transmit a SL SR and/or BSR information. The BSR information may comprise buffer status of a sidelink session associated with the type 2 configured grant resource configuration. The base station may activate the type 2 configured grant resource configuration in response to receiving the BSR. The base station may configure a type 1 configured grant resource configuration for a sidelink session. The wireless device may use the type 1 configured grant resource if new sidelink data for the associated sidelink session arrives without additional activation. The wireless device may send/transmit HARQ-ACK feedback even if the wireless device has not used the type 1 configured grant resource, for example, if the wireless device is configured to send/transmit HARQ-ACK feedback on the type 1 configured grant resource. The wireless device may send/transmit ACK or DTX, for example, if the wireless device has not used the type 1 configured grant resource.

A wireless device may map UCI for SL HARQ-ACK feedback (and/or SL SR) in a different location from one or more UCIs for downlink/uplink operation. The wireless device may send/transmit, to the base station via the one or more UCIs for downlink/uplink operation, an indication of a presence of the UCI for the SL HARQ-ACK feedback (and/or SL SR). A base station may perform blind detection on the UCI for SL HARQ-ACK feedback (and/or SL SR), for example, if the wireless device does not send the indication.

Figure 32:
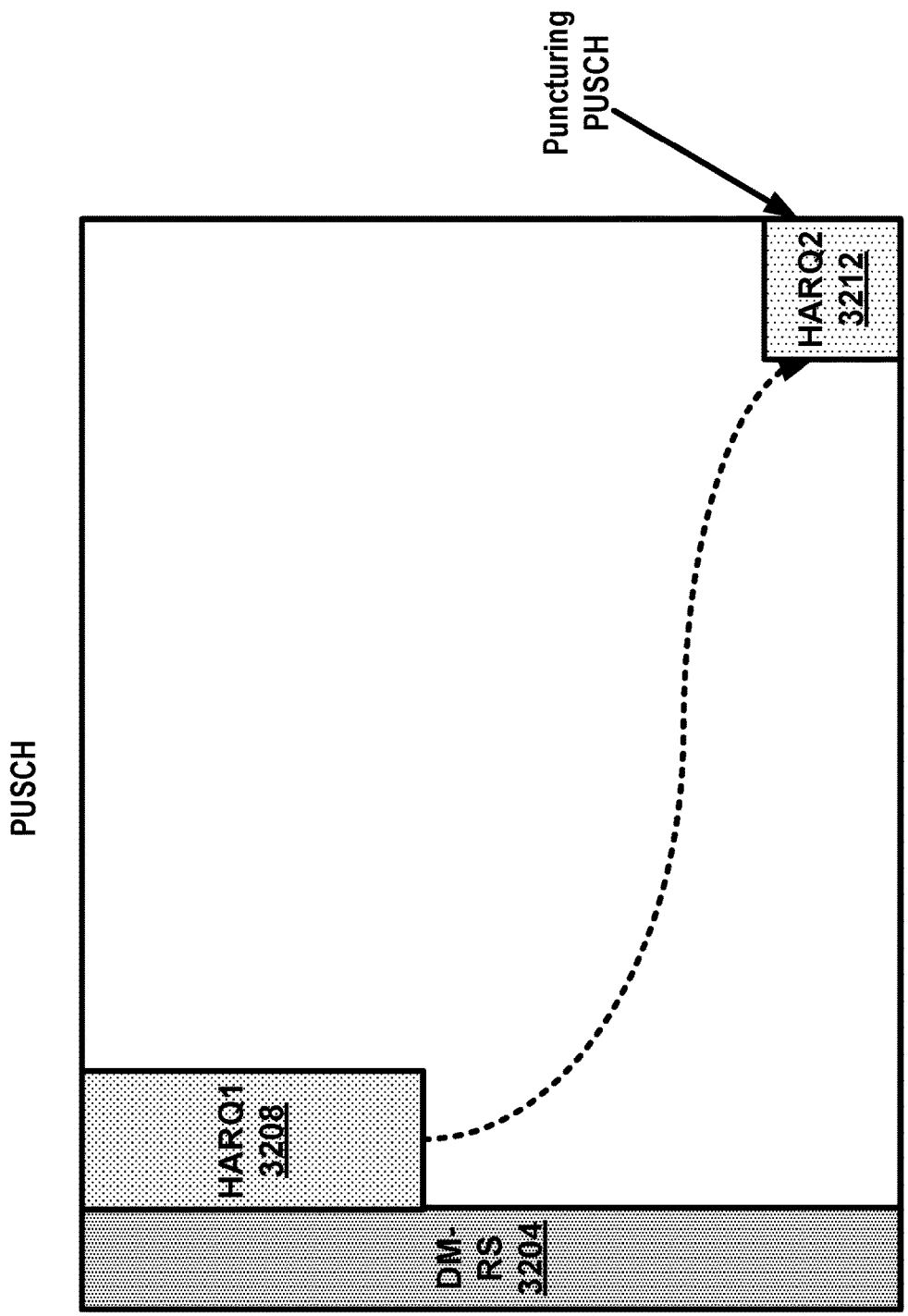
FIG. 32 shows an example allocation of resources in a PUSCH for acknowledgment feedback.

FIG. 32 shows an example allocation of resources in a PUSCH for acknowledgment (e.g., HARQ-ACK) feedback. The example allocation of resources may be used for sending HARQ-ACK feedback, such as described with reference to FIG. 23. A wireless device may use a first location (e.g., HARQ1 3208, near a DM-RS symbol) for a HARQ-ACK feedback for downlink data. The wireless device may use a second location (e.g., HARQ2 3212, at an end of PUSCH symbol) for SL HARQ-ACK feedback. The wireless device may indicate the presence of SL HARQ-ACK feedback via the HARQ-ACK feedback for downlink data. The wireless device, in mapping of the sidelink HARQ-ACK feedback, may not change a data mapping of the PUSCH regardless of the presence of the SL HARQ-ACK feedback to avoid any ambiguity. The wireless device may puncture (e.g., override, rewrite, preempt, overwrite) some of data REs for the mapping of the SL HARQ-ACK feedback.

Figure 33:
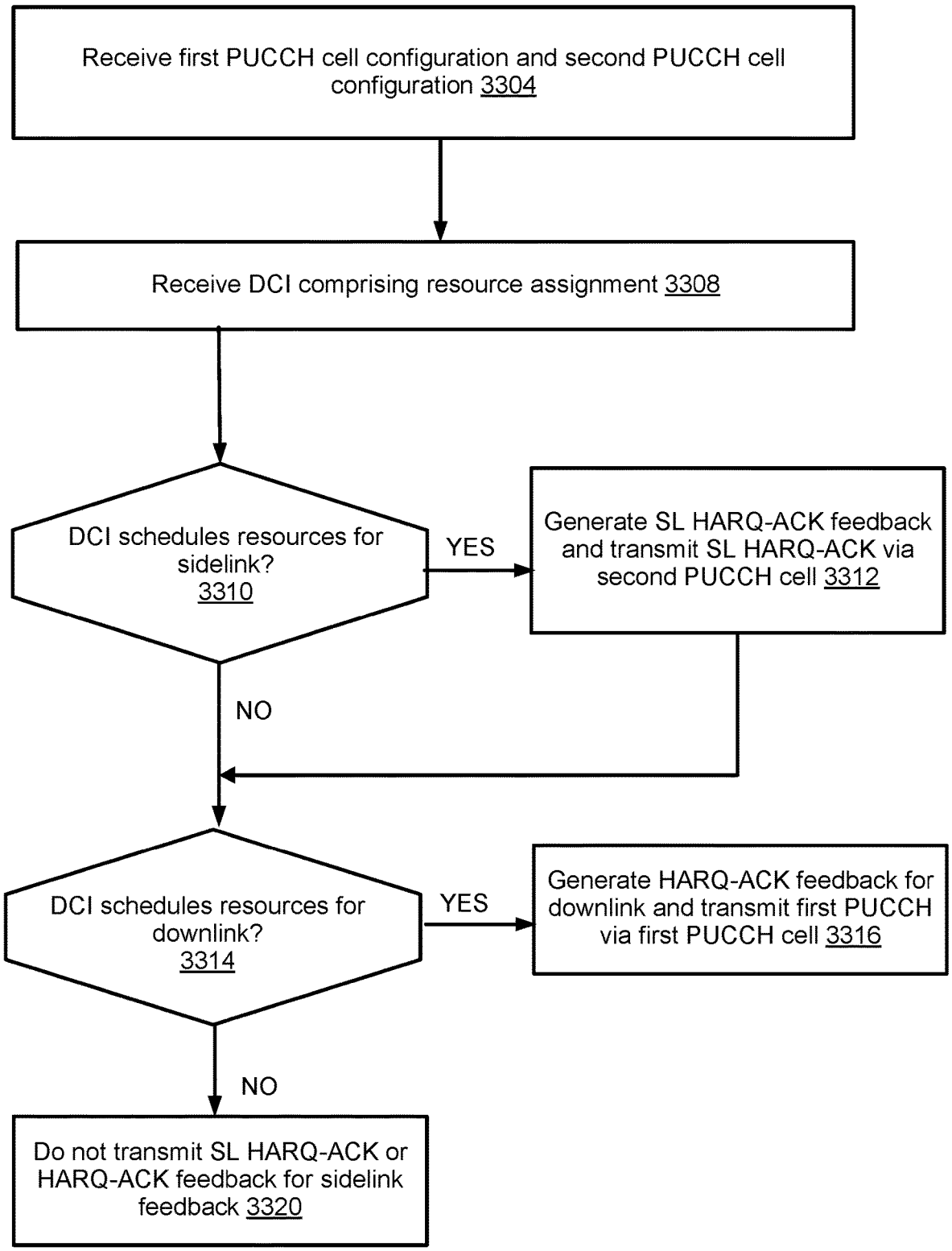
FIG. 33 shows an example method of acknowledgment feedback for downlink transmissions and sidelink transmissions.

FIG. 33 shows an example method of acknowledgment (e.g., HARQ-ACK) feedback for downlink transmissions and sidelink transmissions. The example method 3300 shown in FIG. 33 may be performed by, for example, a wireless device. A base station may configure a first PUCCH cell for a first PUCCH used for UCIs for downlink/uplink. The base station may configure a second PUCCH cell for a second PUCCH used for UCIs for sidelink. At step 3304, the wireless device may receive configuration corresponding to the first PUCCH cell and the second PUCCH cell.

At step 3308, the wireless device may receive DCI(s) comprising resource assignments. The wireless device may receive a first DCI comprising a resource assignment for a downlink transmission. The wireless device may receive a second SL DCI comprising resource assignment for a sidelink transmission. At step 3310, the wireless device may determine whether the first DCI scheduled resources for a sidelink transmission. At step 3314, the wireless device may determine whether the first DCI schedules resources for a downlink transmission. Steps 3310 and 3314 may be performed in any order (e.g., before, during, or after the other).

At step 3312, the wireless device may generate and send SL HARQ-ACK feedback via the second PUCCH cell (e.g., via the second PUCCH), for example, if the wireless device determines that the DCI (e.g., SL DCI) has scheduled resources for sidelink transmissions (e.g., via one or more PSSCHs). At step 3316, the wireless device may generate and send a HARQ-ACK feedback for downlink via the first PUCCH cell (e.g., via the first PUCCH), for example, if the wireless device determines that the DCI has scheduled resources for downlink transmissions (e.g., via one or more PDSCHs). Steps 3312 and 3316 may be performed in any order (e.g., before, during, or after the other), and/or may be performed based on a determination from steps 3310 and 3314, respectively. For example, steps 3314 and 3316 may be performed before, during, or after steps 3310 and 3312.

At step 3320, the wireless device may not send/transmit the SL HARQ-ACK feedback and the HARQ-ACK feedback for downlink), for example, if the wireless device determines that the DCI has not scheduled resources for downlink transmissions and sidelink transmissions.

Figure 34:
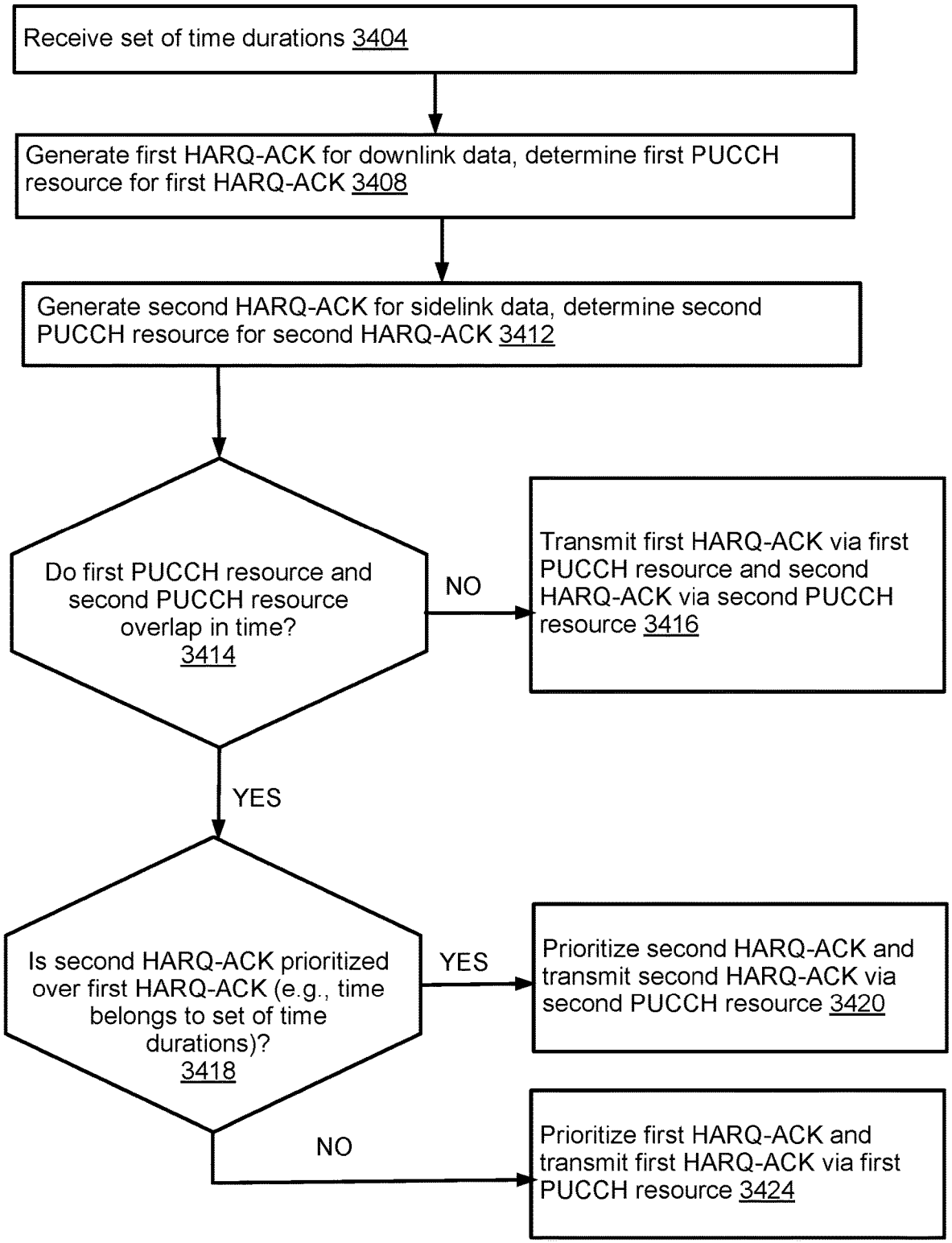
FIG. 34 shows an example method of acknowledgment feedback for downlink transmissions and sidelink transmissions.

FIG. 34 shows an example method of acknowledgment (e.g., HARQ-ACK) feedback for downlink transmissions and sidelink transmissions. At step 3404, a wireless device may receive, from a base station, configuration parameters indicating one or more time durations in which a wireless device may prioritize sidelink UCIs over UCIs for downlink/uplink (Uu UCIs).

At step 3408, the wireless device may generate a first HARQ-ACK for downlink data and determine a first PUCCH resource for transmission of the first HARQ-ACK. At step 3412, the wireless device may generate/determine a second HARQ-ACK for sidelink data (e.g., SL HARQ-ACK) and/or generate/determine a second PUCCH resource for transmission of the second HARQ-ACK. At step 3414, the wireless device may determine whether the first PUCCH resource and the second PUCCH resource overlap in time (e.g., partially or fully overlap in time). At step 3416, the wireless device may send/transmit first HARQ-ACK via first PUCCH resource and/or second HARQ-ACK via second PUCCH resource, for example, if the first PUCCH resource and the second PUCCH resource do not overlap in time.

At step 3418, the wireless device may determine a prioritization of the first HARQ-ACK and/or the second HARQ-ACK, for example, if the first PUCCH resource and the second PUCCH resource overlap in time. For example, the wireless device may determine whether the second HARQ-ACK is prioritized over the first HARQ-ACK (e.g., time of overlap belongs to a set of time durations in which the wireless device may prioritize transmission of the second HARQ-ACK over the first HARQ-ACK). At step 3420, the wireless device may prioritize the second HARQ-ACK and/or send/transmit the second HARQ-ACK via the second PUCCH resource, for example, if the wireless device determines that the second HARQ-ACK is prioritized over the first HARQ-ACK. At step 3424, the wireless device may prioritize the first HARQ-ACK and/or send/transmit the first HARQ-ACK via the first PUCCH resource, for example, if the wireless device determines that the first HARQ-ACK is prioritized over the second HARQ-ACK. The set of time durations may be configured by the base station.

A wireless device may receive one or more RRC messages. The one or more RRC messages may comprise a first PUCCH of a first cell. The one or more RRC messages may comprise a second PUCCH of a second cell. The wireless device may receive DCI from a base station. The wireless device may select the first PUCCH or the second PUCCH based on an RNTI of the DCI. The wireless device may send/transmit one or more feedback bits via the selected PUCCH.

The DCI may comprise a timing of the selected PUCCH. The DCI may comprise a HARQ timing offset that determines/indicates the timing of the selected PUCCH. The HARQ timing offset may be applied to a first time of a scheduled PDSCH and the selected PUCCH based on the DCI comprising resource assignment(s) for downlink data. The HARQ timing offset may be applied to a second time of a first scheduled PSSCH or a last scheduled PSSCH and the selected PUCCH based on the DCI comprising resource assignment(s) for sidelink data. The wireless device may determine the first PUCCH if the DCI is scrambled with the RNTI from one or more first RNTIs. The one or more first RNTIs may comprise C-RNTI, SPS-RNTI, and/or the like.

The wireless device may determine the second PUCCH if the DCI is scrambled with the RNTI from one or more second RNTIs. The one or more second RNTIs may comprise a sidelink RNTI (e.g., SL-C-RNTI, SL-CS-C-RNTI, SL-SPS-C-RNTI, etc.) used for SL DCI comprising resource assignments for one or more sidelink cells. The wireless device may receive one or more RRC messages. The RRC messages may indicate the one or more second RNTIs to activate a base station-assisted sidelink operation (e.g., mode 1 operation) for the one or more sidelink cells. The wireless device may receive one or more second RRC messages. The one or more second RRC messages may indicate one or more search spaces of one or more cells to monitor the SL DCIs based on the one or more second RNTIs.

The one or more second RRC messages may indicate enabling and/or disabling HARQ-ACK transmission by the wireless device corresponding to SL DCIs and/or sidelink resources allocated via the SL DCIs. The wireless device may drop the second PUCCH if the HARQ-ACK transmission corresponding to the SL DCIs and/or sidelink resources allocated via the SL DCIs is disabled. The first cell may be a PCell, an SPCell, or a PUCCH SCell. The second cell may be an SPCell, a PUCCH SCell, or an SCell, for example, at least if the wireless device does not support simultaneous transmission of the first PUCCH transmission and the second PUCCH transmission via the PCell. The second cell may be a PCell, for example, if the wireless device supports simultaneous transmission of the first PUCCH transmission and the second PUCCH transmission via the PCell.

The wireless device may support simultaneous transmission of the first PUCCH via the first cell and the second PUCCH via the second cell. The first cell and the second cell may be different (or the same). The wireless device may send/transmit one or more wireless device capabilities to the base station. The one or more wireless device capabilities may indicate a set of bands and/or band combinations in which the wireless device may support simultaneous transmission of the first PUCCH transmission via the first cell and the second PUCCH transmission via the second cell. The one or more wireless device capabilities may be independently sent/transmitted from the wireless device capabilities supporting PUCCH SCell. The supporting PUCCH SCell on a band combination may not imply that the wireless device may support the simultaneous transmission of the first PUCCH transmission and the second PUCCH transmission.

The DCI may comprise resource assignment(s) for a downlink cell or resource assignments for a sidelink cell. The DCI may be received via a scheduling cell which is active cell of a cell group, wherein the cell group may comprise the first cell and the second cell. A scheduling cell for SL DCI for the one or more sidelink cells may be different from or same as the second cell.

A wireless device may receive one or more RRC messages. The one or more RRC messages may indicate one or more first PUCCH resources, one or more second PUCCH resources, and a set of time durations. The wireless device may determine a first PUCCH resource from the one or more first PUCCH resources for a first PUCCH transmission (e.g., comprising one or more first UCIs for downlink and/or uplink operation such as HARQ-ACK feedback, SR, CSI feedback, etc). The wireless device may determine a second PUCCH resource from the one or more second PUCCH resources for a second PUCCH transmission (e.g., comprising one or more second UCIs for sidelink operation, such as SL HARQ-ACK feedback, SL SR, etc). The wireless device may determine whether the first PUCCH resource and the second PUCCH resource is partially or fully overlapped in a time domain. The wireless device may select/determine the first PUCCH resource or the second PUCCH resource based on (e.g., in response to) the overlapping between the first PUCCH resource and the second PUCCH resource in a time domain, and based on the set of time durations and the overlapping time. The wireless device may send/transmit a selected PUCCH transmission and drop a non-selected PUCCH transmission.

The wireless device may select the second PUCCH transmission based on (e.g., in response to) the overlapping if the overlapping time is in the set of time durations. The wireless device may select/determine the first PUCCH transmission based on (e.g., in response to) the overlapping, for example, if the overlapping time is not in a set of time durations. The wireless device may receive the one or more RRC messages indicating a priority associated with the set of time durations. The wireless device may select/determine the first PUCCH or the second PUCCH, in the overlapping time, based on the set of time durations and a priority of one or more second UCIs compared to the configured priority. The wireless device may select/determine the second PUCCH, for example, if the time duration belongs to the set of time durations and the priority of at least one UCI from the one or more second UCIs is higher than or equal to a configured threshold. The wireless device may determine the priority of the one or more second UCIs based on associated sidelink resources. The priority of an SR for a sidelink operation may be determined based on a priority associated with a resource pool triggering the SR or a priority of an LCH mapping triggering the SR transmission for the sidelink operation.

The priority of a HARQ-ACK feedback for a sidelink operation (SL HARQ-ACK) may be determined based on a priority of a corresponding PSSCH resource/transmission. The one or more first PUCCH resources and the one or more second PUCCH resources may be configured on a cell. The wireless device may or may not support a capability to send/transmit the HARQ-ACK and SL HARQ-ACK feedback via first PUCCH and the second PUCCH at a same time on the cell. The cell may be a PCell, a SPCell or a PUCCH SCell.

A wireless device may generate/determine a first HARQ-ACK codebook for a first HARQ-ACK resource. The first HARQ-ACK codebook may comprise one or more first ACK/NACK bits corresponding to PDSCH transmissions for one or more downlink cells. The wireless device may generate/determine a second HARQ-ACK codebook for the first HARQ-ACK resource. The second HARQ-ACK codebook may comprise one or more second ACK/NACK bits corresponding to one or more PSSCH transmissions for one or more sidelink cells. The wireless device may append/combine the first HARQ-ACK codebook and the second HARQ-ACK codebook. The wireless device may send/transmit the appended bits (e.g., combined codebook). The first HARQ-ACK codebook may be placed before the second HARQ-ACK codebook, or vice versa.

A wireless device may generate/determine a HARQ-ACK codebook comprising one or more first HARQ-ACK bits and one or more second HARQ-ACK bits. The one or more first HARQ-ACK bits may comprise ACK/NACK bits for downlink data. The one or more second HARQ-ACK bits comprise ACK/NACK bits for the sidelink data. The one or more second HARQ-ACK bits may be appended after the one or more first HARQ-ACK bits, or vice versa.

A wireless device may generate/determine a HARQ-ACK codebook for a PUCCH resource. The HARQ-ACK codebook may comprise one or more bits corresponding to one or more PSSCH transmissions for one or more sidelink cells. The wireless device may determine a quantity of bits of the HARQ-ACK codebook based on a quantity of sidelink resources between a time duration and a repetition factor used for a PSCCH transmission. The time duration may be a largest periodicity of one or more resource pools configured for the one or more sidelink cells. The one or more resource pools are assisted by the base station in terms of resource allocation.

A wireless device may perform a method comprising multiple operations. The wireless device may receive, from a base station, one or more messages comprising a priority threshold associated with sidelink acknowledgment feedback and with uplink control information (UCI). The wireless device may determine that a first physical uplink control channel (PUCCH) resource for sending sidelink acknowledgment feedback overlaps with a second PUCCH resource for sending UCI. The wireless device may send, based on a comparison of a priority of the sidelink acknowledgment feedback with the priority threshold, the sidelink acknowledgment feedback or the UCI. The wireless device may also perform one or more additional operations. Sending the sidelink acknowledgment feedback or the UCI may comprise sending, based on the priority of the sidelink acknowledgment feedback satisfying the priority threshold, the sidelink acknowledgment feedback. Sending the sidelink acknowledgment feedback or the UCI may comprise sending, based on the priority of the sidelink acknowledgment feedback not satisfying the priority threshold, the UCI. The sidelink acknowledgment feedback may comprise sidelink hybrid automatic repeat request-acknowledgment (HARQ-ACK) feedback associated with one or more sidelink transmissions. The wireless device may receive one or more sidelink downlink control information (DCI) messages indicating the first PUCCH resource. The wireless device may receive one or more DCI messages indicating the second PUCCH resource. The UCI may comprise at least one of hybrid automatic repeat request-acknowledgment (HARQ-ACK) feedback associated with one or more downlink transmissions, channel state information (CSI) feedback associated with a downlink carrier, or a scheduling request for uplink data. The wireless device may send, to one or more second wireless devices, one or more sidelink messages. The wireless device may determine, based on one or more priority values associated with the one or more sidelink messages, the priority of the sidelink acknowledgment feedback. The wireless device may send, to one or more second wireless devices, one or more sidelink messages. The wireless device may receive, from the one or more second wireless devices, one or more feedback messages associated with the one or more sidelink messages. Sending the sidelink acknowledgment feedback or the UCI may comprise sending, based on the one or more feedback messages, the sidelink acknowledgment feedback. The one or more messages may indicate first PUCCH resources of a first cell for the sidelink acknowledgment and second PUCCH resources of a second cell for the UCI, wherein the first PUCCH resources may comprise the first PUCCH resource and the second PUCCH resources may comprise the second PUCCH resource. The first cell may be the same as the second cell. The first cell may be a primary cell and the second cell may be a PUCCH secondary cell. The first cell may be a PUCCH secondary cell and the second cell may be a primary cell. The wireless device may receive one or more sidelink downlink control information (DCI) messages scheduling resources for one or more sidelink transmissions. The wireless device may receive one or more downlink control information (DCI) messages scheduling resources for one or more downlink transmissions. Determining that the first PUCCH resource overlaps with a second PUCCH resource may comprise determining that the first PUCCH resource overlaps with the second PUCCH resource in a time slot. The one or more messages may comprise one or more radio resource configuration (RRC) messages. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more messages. A computer-readable medium may store instructions that, when executed, cause performance of the described method, additional operations and/or include the additional elements.

A wireless device may perform a method comprising multiple operations. The wireless device may, based on a first physical uplink control channel (PUCCH) resource, associated with sending a sidelink acknowledgment feedback, overlapping in time with a second PUCCH resource associated with sending uplink control information (UCI), determine a priority of the sidelink acknowledgment feedback. The wireless device may send, to a base station, based on the priority of the sidelink acknowledgment feedback, the sidelink acknowledgment feedback or the UCI. The wireless device may also perform one or more additional operations. The wireless device may receive one or more radio resource control (RRC) messages comprising a priority threshold indicating whether a sidelink acknowledgment feedback is prioritized over UCI, wherein sending the sidelink acknowledgment feedback or the UCI may be based on a comparison of the priority of the sidelink acknowledgment feedback with the priority threshold. The wireless device may send, to one or more other wireless devices, one or more sidelink transmissions, wherein the sidelink acknowledgment feedback may comprise sidelink hybrid automatic repeat request-acknowledgment (HARQ-ACK) feedback associated with the one or more sidelink transmissions. The wireless device may receive one or more sidelink downlink control information (DCI) messages indicating the first PUCCH resource; and receiving one or more DCI messages indicating the second PUCCH resource. The UCI may comprise at least one of hybrid automatic repeat request-acknowledgment (HARQ-ACK) feedback associated with one or more downlink transmissions, channel state information (CSI) feedback associated with a downlink carrier, or a scheduling request for uplink data. Sending the sidelink acknowledgment feedback or the UCI may comprise sending the sidelink acknowledgment feedback based on the priority of the sidelink acknowledgment feedback satisfying a priority threshold. Sending the sidelink acknowledgment feedback or the UCI may comprise sending the UCI based on the priority of the sidelink acknowledgment feedback not satisfying a priority threshold. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the sidelink acknowledgment feedback or the UCI. A computer-readable medium may store instructions that, when executed, cause performance of the described method, additional operations and/or include the additional elements.

A wireless device may perform a method comprising multiple operations. The wireless device may determine, based on one or more feedback messages associated with one or more sidelink messages, a sidelink acknowledgment feedback. The wireless device may, based on determining that a first physical uplink control channel (PUCCH) resource associated with sidelink acknowledgment feedback overlaps in time with a second PUCCH resource associated with uplink control information (UCI): determine a highest priority among priorities of the one or more sidelink messages; and send, to a base station based on a comparison of the highest priority with a priority threshold, the sidelink acknowledgment feedback or the UCI. The wireless device may also perform one or more additional operations. Sending the sidelink acknowledgment feedback or the UCI may comprise sending the sidelink acknowledgment feedback based on the highest priority being higher than a priority threshold. The wireless device may receive, from the base station, one or more radio resource control (RRC) messages indicating a priority threshold. The wireless device may receive one or more sidelink downlink control information (DCI) messages indicating the first PUCCH resource. The wireless device may receive one or more DCI messages indicating the second PUCCH resource. The UCI may comprise at least one of hybrid automatic repeat request-acknowledgment (HARQ-ACK) feedback associated with one or more downlink transmissions, channel state information (CSI) feedback associated with a downlink carrier, or a scheduling request for uplink data. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the sidelink acknowledgment feedback or the UCI. A computer-readable medium may store instructions that, when executed, cause performance of the described method, additional operations and/or include the additional elements.

A wireless device may perform a method comprising multiple operations. The wireless device may receive, from a base station, sidelink downlink control information (DCI) comprising: one or more resource allocations indicating the sidelink resources for one or more sidelink transmissions; a first field indicating a feedback resource in frequency domain; and a second field indicating the feedback resource in time domain. The wireless device may send, to a second wireless device and via sidelink resources, the one or more sidelink transmissions. The wireless device may skip transmission, to the base station, of an acknowledgment feedback corresponding to the one or more sidelink transmissions based on: a first value of the first field being set to a first predetermined value; and a second value of the second field being set to a second predetermined value. The wireless device may also perform one or more additional operations. The first predetermined value may be zero or a constant value. The second predetermined value may be zero or a constant value. The sidelink DCI may be scrambled with a radio network traffic identifier (RNTI) of one or more first RNTIs. The one or more first RNTIs may comprise sidelink cell RNTI (SL-C-RNTI) or sidelink configured grant cell RNTI (SL-CS-C-RNTI). The one or more first RNTIs may or may not comprise cell RNTI (C-RNTI) or configured grant RNTI (CS-RNTI). The wireless device may receive second DCI comprising: one or more second resource allocations indicating downlink resources for one or more downlink messages; a third field indicating a second feedback resource in frequency domain; and a fourth field indicating a second feedback resource in time domain. The wireless device may determine the second feedback resource based on the third field and the fourth field. The wireless device may transmit, via the second feedback resource, a second acknowledgment feedback corresponding to the one or more downlink messages. The wireless device may receive one or more radio resource control (RRC) messages indicating physical uplink control channel (PUCCH) resources of a cell for the acknowledgment feedback. The wireless device may receive second sidelink DCI scheduling one or more second sidelink transmissions. The wireless device may determine a first PUCCH resource based on the first field of the second sidelink DCI and the second field of the second sidelink DCI in response to: a third value of the first field of the second sidelink DCI being different from the first predetermined value; and a fourth value of the second field of the second sidelink DCI being different from the second predetermined value. The wireless device may transmit, via the first PUCCH resource, a third acknowledgment feedback corresponding to the one or more second sidelink transmissions. The wireless device may transmit, via a physical uplink shared channel (PUSCH), a third acknowledgment feedback corresponding to the one or more second sidelink transmissions, wherein transmitting the third acknowledgment feedback may be based on a PUSCH transmission overlapping, in a slot, with a PUCCH transmission via the first PUCCH resource. The wireless device may determine that a resource for an acknowledgment feedback is not provided based on: the first value of the first field being set to the first predetermined value; and the second value of the second field being set to the second predetermined value. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the sidelink DCI. A computer-readable medium may store instructions that, when executed, cause performance of the described method, additional operations and/or include the additional elements.

A wireless device may perform a method comprising multiple operations. The wireless device may receive, from a base station, one or more radio resource control (RRC) messages indicating: first physical uplink control channel (PUCCH) resources for first uplink control information (UCI) for one or more downlink data, second PUCCH resources for second UCI for one or more sidelink transmissions, and a priority threshold used for the second UCI. The wireless device may select a UCI among the first UCI and the second UCI based on: a first PUCCH resource, determined from the first PUCCH resources for the first UCI, and a second PUCCH resource, determined from the second PUCCH resources for the second UCI, being overlapped; a priority of the second UCI; and the priority threshold. The wireless device may transmit the selected UCI. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more RRC messages. A computer-readable medium may store instructions that, when executed, cause performance of the described method, additional operations and/or include the additional elements.

A wireless device may perform a method comprising multiple operations. The wireless device may generate first uplink control information (UCI) comprising a first hybrid automatic repeat request (HARQ) codebook corresponding to one or more downlink transport blocks via one or more downlink serving cells. The wireless device may generate second UCI comprising a second HARQ codebook corresponding to one or more sidelink transport blocks via one or more sidelink cells. The wireless device may determine: a first HARQ feedback resource, from a first plurality of HARQ feedback resources, for the first UCI; and a second HARQ feedback resource, from a second plurality of HARQ feedback resources, for the second UCI. The wireless device may, in response to the first HARQ feedback resource and the second HARQ feedback resource being non-overlapped: transmit the first UCI via the first HARQ feedback resource; and transmit the second UCI via the second HARQ feedback resource. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to receive the first UCI and the second UCI. A computer-readable medium may store instructions that, when executed, cause performance of the described method, additional operations and/or include the additional elements.

A wireless device may perform a method comprising multiple operations. The wireless device may receive, from a base station, one or more radio resource control (RRC) messages indicating: a first plurality of physical uplink control channel (PUCCH) resources for first hybrid automatic repeat request (HARQ) feedback corresponding to one or more downlink data; a second plurality of PUCCH feedback resources for second HARQ feedback corresponding to one or more sidelink transmissions; and a priority threshold used for the second HARQ feedback. The wireless device may determine: a first PUCCH resource, from a first plurality of PUCCH feedback resources, for the first HARQ feedback; and a second PUCCH resource, from the second plurality of PUCCH resources, for the second HARQ feedback. The wireless device may transmit one of the first HARQ feedback and the second HARQ feedback, wherein the one of the first HARQ feedback and the second HARQ feedback is selected based on: the first PUCCH resource and the second PUCCH resource being overlapped; a priority of the second HARQ feedback; and the priority threshold. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send the one or more RRC messages. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
    determining, by a wireless device based on one or more feedback messages associated with one or more sidelink messages, a sidelink acknowledgement feedback; and
    based on determining that a first physical uplink control channel (PUCCH) resource associated with the sidelink acknowledgement feedback overlaps in time with a second PUCCH resource associated with uplink control information (UCI):
        determining a highest priority among priorities of the one or more sidelink messages; and
        sending, to a base station based on a comparison of the highest priority with a priority threshold, the sidelink acknowledgment feedback or the UCI.

2. The method of claim 1, wherein sending the sidelink acknowledgment feedback or the UCI comprises sending the sidelink acknowledgement feedback based on the highest priority being higher than the priority threshold.

3. The method of claim 1, further comprising receiving, by the wireless device from the base station, one or more radio resource control (RRC) messages indicating the priority threshold.

4. The method of claim 1, further comprising:
    receiving one or more sidelink downlink control information (DCI) messages indicating the first PUCCH resource; and
    receiving one or more DCI messages indicating the second PUCCH resource.

5. The method of claim 1, wherein the UCI comprises at least one of:
    hybrid automatic repeat request-acknowledgment (HARQ-ACK) feedback associated with one or more downlink transmissions,
    channel state information (CSI) feedback associated with a downlink carrier, or
    a scheduling request for uplink data.

6. A wireless device comprising:
    one or more processors; and
    memory storing instructions that, when executed by the one or more processors, cause the wireless device to:
        determine, based on one or more feedback messages associated with one or more sidelink messages, a sidelink acknowledgement feedback; and
        based on determining that a first physical uplink control channel (PUCCH) resource associated with the sidelink acknowledgement feedback overlaps in time with a second PUCCH resource associated with uplink control information (UCI):
            determine a highest priority among priorities of the one or more sidelink messages; and
            send, to a base station based on a comparison of the highest priority with a priority threshold, the sidelink acknowledgment feedback or the UCI.

7. The wireless device of claim 6, wherein the instructions, when executed by the one or more processors, cause the wireless device to send the sidelink acknowledgment feedback or the UCI based on the highest priority being higher than the priority threshold.

8. The wireless device of claim 6, wherein the instructions, when executed by the one or more processors, further cause the wireless device to receive, from the base station, one or more radio resource control (RRC) messages indicating the priority threshold.

9. The wireless device of claim 6, wherein the instructions, when executed by the one or more processors, further cause the wireless device to:
   receive one or more sidelink downlink control information (DCI) messages indicating the first PUCCH resource; and
   receive one or more DCI messages indicating the second PUCCH resource.

10. The wireless device of claim 6, wherein the UCI comprises at least one of:
    hybrid automatic repeat request-acknowledgment (HARQ-ACK) feedback associated with one or more downlink transmissions,
    channel state information (CSI) feedback associated with a downlink carrier, or
    a scheduling request for uplink data.

11. A non-transitory computer-readable medium storing instructions that, when executed, configure a wireless device to:
    determine, based on one or more feedback messages associated with one or more sidelink messages, a sidelink acknowledgement feedback; and
    based on determining that a first physical uplink control channel (PUCCH) resource associated with the sidelink acknowledgement feedback overlaps in time with a second PUCCH resource associated with uplink control information (UCI):
      determine a highest priority among priorities of the one or more sidelink messages; and
      send, to a base station based on a comparison of the highest priority with a priority threshold, the sidelink acknowledgment feedback or the UCI.

12. The non-transitory computer-readable medium of claim 11, wherein the instructions, when executed, configure the wireless device to send the sidelink acknowledgment feedback or the UCI based on the highest priority being higher than the priority threshold.

13. The non-transitory computer-readable medium of claim 11, wherein the instructions, when executed, further configure the wireless device to receive, from the base station, one or more radio resource control (RRC) messages indicating the priority threshold.

14. The non-transitory computer-readable medium of claim 11, wherein the instructions, when executed, further configure the wireless device to:
    receive one or more sidelink downlink control information (DCI) messages indicating the first PUCCH resource; and
    receive one or more DCI messages indicating the second PUCCH resource.

15. The non-transitory computer-readable medium of claim 11, wherein the UCI comprises at least one of:
    hybrid automatic repeat request-acknowledgment (HARQ-ACK) feedback associated with one or more downlink transmissions,
    channel state information (CSI) feedback associated with a downlink carrier, or a scheduling request for uplink data.

16. A system comprising:
    a wireless device; and
    a base station,
    wherein the wireless device is configured to:
      determine, based on one or more feedback messages associated with one or more sidelink messages, a sidelink acknowledgement feedback; and
      based on determining that a first physical uplink control channel (PUCCH) resource associated with the sidelink acknowledgement feedback overlaps in time with a second PUCCH resource associated with uplink control information (UCI):
        determine a highest priority among priorities of the one or more sidelink messages; and
        send, based on a comparison of the highest priority with a priority threshold, the sidelink acknowledgment feedback or the UCI, and
    wherein the base station is configured to receive the sidelink acknowledgement feedback or the UCI.

17. The system of claim 16, wherein the wireless device is configured to send the sidelink acknowledgment feedback or the UCI based on the highest priority being higher than the priority threshold.

18. The system of claim 16, wherein the wireless device is further configured to receive, from the base station, one or more radio resource control (RRC) messages indicating the priority threshold.

19. The system of claim 16, wherein the wireless device is further configured to:
    receive one or more sidelink downlink control information (DCI) messages indicating the first PUCCH resource; and
    receive one or more DCI messages indicating the second PUCCH resource.

20. The system of claim 16, wherein the UCI comprises at least one of:
    hybrid automatic repeat request-acknowledgment (HARQ-ACK) feedback associated with one or more downlink transmissions,
    channel state information (CSI) feedback associated with a downlink carrier, or
    a scheduling request for uplink data.

* * * * *